US00RE45097E

(19) United States
(12) Reissued Patent
Iyer et al.

(10) Patent Number: US RE45,097 E
(45) Date of Reissued Patent: Aug. 26, 2014

(54) HIGH SPEED MEMORY AND INPUT/OUTPUT PROCESSOR SUBSYSTEM FOR EFFICIENTLY ALLOCATING AND USING HIGH-SPEED MEMORY AND SLOWER-SPEED MEMORY

(75) Inventors: Sundar Iyer, Palo Alto, CA (US); Nick McKeown, Portola Valley, CA (US)

(73) Assignee: Cisco Technology, Inc., San Jose, CA (US)

(21) Appl. No.: 13/365,136

(22) Filed: Feb. 2, 2012

Related U.S. Patent Documents

Reissue of:

(64) Patent No.: 7,657,706
Issued: Feb. 2, 2010
Appl. No.: 11/016,572
Filed: Dec. 17, 2004

U.S. Applications:

(60) Provisional application No. 60/531,043, filed on Dec. 18, 2003, provisional application No. 60/544,883, filed on Feb. 14, 2004.

(51) Int. Cl.
*G06F 13/00* (2006.01)

(52) U.S. Cl.
USPC ..... 711/117; 711/118; 711/109; 711/170; 711/202; 711/221; 709/250; 710/15; 710/36; 710/56; 710/57; 712/34; 712/36; 718/102

(58) Field of Classification Search
USPC ..... 711/117, 118, 109, 170, 202, 221; 709/250; 710/15, 36, 56, 57; 712/34, 712/36; 718/102
See application file for complete search history.

(56) References Cited

U.S. PATENT DOCUMENTS 6,072,741 A 6/2000 Taylor
6,392,950 B2 5/2002 Ayukawa et al.
6,427,173 B1 7/2002 Boucher et al.

(Continued)

OTHER PUBLICATIONS

"U.S. Appl. No. 11/016,572, Final Office Action mailed Sep. 4, 2007", 14 pgs.

(Continued)

*Primary Examiner* — Hong Kim
(74) *Attorney, Agent, or Firm* — Schwegman Lundberg & Woessner, P.A.

(57) ABSTRACT

An input/output processor for speeding the input/output and memory access operations for a processor is presented. The key idea of an input/output processor is to functionally divide input/output and memory access operations tasks into a compute intensive part that is handled by the processor and an I/O or memory intensive part that is then handled by the input/output processor. An input/output processor is designed by analyzing common input/output and memory access patterns and implementing methods tailored to efficiently handle those commonly occurring patterns. One technique that an input/output processor may use is to divide memory tasks into high frequency or high-availability components and low frequency or low-availability components. After dividing a memory task in such a manner, the input/output processor then uses high-speed memory (such as SRAM) to store the high frequency and high-availability components and a slower-speed memory (such as commodity DRAM) to store the low frequency and low-availability components. Another technique used by the input/output processor is to allocate memory in such a manner that all memory bank conflicts are eliminated. By eliminating any possible memory bank conflicts, the maximum random access performance of DRAM memory technology can be achieved.

18 Claims, 21 Drawing Sheets

(56) References Cited

U.S. PATENT DOCUMENTS

| | | | | |
|---|---|---|---|---|
| 6,437,789 | B1 | 8/2002 | Tidwell et al. | |
| 6,470,415 | B1 * | 10/2002 | Starr et al. | 711/104 |
| 6,847,573 | B2 | 1/2005 | Lee et al. | |
| 6,885,591 | B2 | 4/2005 | Nong | |
| 7,657,706 | B2 | 2/2010 | Iyer et al. | |
| 2002/0004881 | A1 * | 1/2002 | Iijima et al. | 711/105 |
| 2003/0206478 | A1 | 11/2003 | Ayukawa et al. | |
| 2004/0044916 | A1 | 3/2004 | Matsunaga | 713/322 |

OTHER PUBLICATIONS

"U.S. Appl. No. 11/016,572, Non Final Office Action mailed May 1, 2009", 7 pgs.
"U.S. Appl. No. 11/016,572, Non Final Office Action mailed Aug. 14, 2006", 13 pgs.
"U.S. Appl. No. 11/016,572, Notice of Allowance mailed Sep. 14, 2009", 8 Pgs.
"U.S. Appl. No. 11/016,572, Response filed Jan. 30, 2009 to Final Office Action mailed Sep. 4, 2007", 9 pgs.
"U.S. Appl. No. 11/016,572, Response filed Jun. 5, 2007 to Non Final Office Action mailed Mar. 2, 2007", 11 pgs.
"U.S. Appl. No. 11/016,572, Response filed Jun. 30, 2009 to Non Final Office Action mailed May 1, 2009", 8 pgs.
"U.S. Appl. No. 11/016,572, Response filed Oct. 17, 2008 to Final Office Action mailed Sep. 4, 2007", 9 pgs.
Garcia, Jorge, et al., "A Conflict-Free Memory Banking Architecture for Fast Packet Buffers", Interim Report UPC-DAC-2002-50, (Jul. 2002), 12 pgs.
Garcia, Jorge, et al., "Design and Impl. of High-Perf Memory Systems for Future Packet Buffers", Proc. of the 36th Intl Symp on Microarchitecture (MICRO-36 2003), (2003), 12 pgs.
Iyer, S., et al., "Analysis of a memory architecture for fast packet buffers", in IEEE Workshop on High Performance Switching and Routing 2001, Dallas, TX, (2001), 368-373.
Iyer, Sundar, et al., "Analysis of a packet switch with memories running slower than the line-rate", Proceedings. IEEE INFOCOM 2000. Nineteenth Annual Joint Conference of the IEEE Computer and Communications Societies., (Mar. 2000), 529-537.
Iyer, Sundar, et al., "Analysis of the Parallel Packet Switch Architecture", IEEE/ACM Transactions on Networking, 11(2), (Apr. 2003), 314-324.
Iyer, Sundar, et al., "Designing Packet Buffers for Router Linecards", Stanford HPNG Technical Report TR02-HPNG-031001, (2002), 16 pgs.
Iyer, Sundar, et al., "Making Parallel Packet Switches Practical", IEEE INFOCOM 2001. Twentieth Annual Joint Conference of the IEEE Computer and Communications Societies. Proceedings, vol. 3, (Mar. 2001), 1680-87.
Iyer, Sundar, et al., "Routers with a Single Stage of Buffering", ACM SIGCOMM, Pittsburgh, USA, vol. 32, Also in Computer Communication Review, (Aug. 2002), 14 pgs.
Iyer, Sundar, et al., "Techniques for Fast Shared Memory Switches", Stanford University HPNG Technical Report—TR01-HPNG-081501, Stanford, CA, (Aug. 2001), 12 pgs.
Prakash, A., et al., "An O(log2 N) parallel algorithm for output queuing", IEEE IFOCOM 2002. Twenty-First Annual Joint Conference of the IEEE Computer and Communications Societies. Proceedings, vol. 3, (Jun. 2002), 1623-1629.
Shah, Devavrat, et al., "Analysis of a statistics counter architecture", Hot Interconnects, 9, (Aug. 22-24, 2001), 107-111.
Shrimali, Gireesh, et al., "Designing Packet Buffers with Statistical Guarantees", Proceedings. 12th Annual IEEE Symposium on High Performance Interconnects, 2004., (Aug. 2004), 54-60.
Devavrat Shah (Shah); Sundar Iyer; Balaji Prabhakar; McKeown, N.; Analysis of a statistics counter architecture, Hot Interconnects 9, 2001, Aug. 22-24, 2001 pp. 107-111.*
Sundar Iyer, Amr Awadallah, and Nick McKeown; "Analysis of a packet switch with memories running slower than the line-rate"; IEEE INFOCOM Mar. 2000, Tel-Aviv, Israel, pp. 529.
Sundar Iyer and Nick McKeown; "Making Parallel Packet Switches Practical"; IEEE INFOCOM, Alaska, USA, Mar. 2001, vol. 3, pp. 1680-1687.
Sundar Iyer, Rui Zhang, and Nick McKeown;"Routers with a Single Stage of Buffering"; ACM SIGCOMM Aug. 2002, Pitsburgh, USA. Also in Computer Communication review, vol. 21, n.
Sundar Iyer and Nick McKeown ; "Analysis of the Parallel Packet Switch Architecture", IEEE/ACM Transactions on Networking, pp. 314-324, Apr. 2003.
Gireesh Shrimali, Issac Keslassy, and Nick McKeown, Designing Packet Buffers with Statistical Gurantees, Proceedings of Hot Interconnects, Stanford, CA, Aug. 2004.

* cited by examiner

HIGH SPEED MEMORY AND INPUT/OUTPUT PROCESSOR SUBSYSTEM FOR EFFICIENTLY ALLOCATING AND USING HIGH-SPEED MEMORY AND SLOWER-SPEED MEMORY

Matter enclosed in heavy brackets [ ] appears in the original patent but forms no part of this reissue specification; matter printed in italics indicates the additions made by reissue.

RELATED APPLICATIONS

The present patent application claims the benefit of the previous U.S. Provisional Patent Applications entitled "High Speed Memory Control and I/O Processor System" filed on Dec. 18, 2003 having Ser. No. 60/531,043 and entitled "High Speed Packet Buffering System" filed on Feb. 14, 2004 having Ser. No. 60/544,883.

FIELD OF THE INVENTION

The present invention relates to the field of memory control subsystems. In particular the present invention discloses high-speed memory control system and Input/Output (I/O) processor that can greatly increase the performance of a memory subsystem.

BACKGROUND OF THE INVENTION

Digital computer systems generally consist of a short-term memory system, a long-term memory system, a processor, and a set of input/output (I/O) devices for interacting with the outside world. The short-term memory system is generally a volatile memory such as a random access memory that provides for fast access to needed data while the computer system is being used. The long-term memory system is generally a larger and slower non-volatile memory system such as a hard disk drive that can store information while the computer system is not being used.

A computer system operates by having a processor read in a sequence of computer instructions from the short-term memory system and then sequentially executes that sequence of computer instructions. Conditional branch instructions within the computer instruction stream will determine any changes in the sequence of instructions that will be executed. Results from the processed computer instructions may be stored in the short-term memory for temporary storage. Processing results may also be stored in the long-term non-volatile memory system for permanent storage. Under the control of the computer instructions, the processor will access the input/output devices to interact with the humans and the outside world. There are limitless varieties of input/output devices including keyboards, video display systems, printers, networks, cursor control devices, audio generation system, etc.

When considering the performance of a digital computer system, many people tend to focus on the execution speed of the processor in the computer system. However, a high-speed computer processor without a matching high-speed memory system that supplies instructions and data just as fast as the processor executes the instructions will eventually become starved of the needed instructions and data. Thus, a high-performance computer system design requires both a high-speed processor for quickly executing instructions and a high-speed memory system to supply instructions and data to the high-speed processor.

One of the most popular techniques for providing high-speed memory services is to create a small high-speed cache memory system that is tightly integrated with (and sometimes created on the same die as) the computer processor. Typically, a high-speed cache memory system duplicates an area of a much larger but slower main memory system. Provided that the needed instructions or data are currently represented within the small high-speed cache memory system, the processor will be able to execute at full speed (or close to full speed since sometimes the cache runs slower than the processor, but much faster than the slow memory). When a cache 'miss' occurs (the required instruction or data is not available in the high-speed cache memory), then the computer processor must wait until the slower main memory system responds with the needed instruction or data.

Cache memory systems provide an effective means of creating a high-speed memory subsystem that can support high-speed processors. Conventional cache memory system may be implemented within a network device to improve performance. However, conventional high-speed cache memory systems typically require large amounts expensive low density memory technologies that consume larger amounts of power than standard dynamic random access memory (DRAM). For example, static random access memory (SRAM) technologies are often used to implement high-speed cache memory systems. Static random access memory (SRAM) integrated circuits typically cost significantly more than commodity DRAM, consume much more power than DRAM, and are much less dense (less bits per integrated circuit die area) than DRAM.

The most significant drawback of conventional cache memory systems in the context of network devices is that conventional cache memory systems do not guarantee high-speed access to desired information. Specifically, a conventional cache memory system will only provide a very fast response when the desired information is represented in the high-speed cache memory. If the desired information is not represented in the cache memory system, then the processor will need to access the main memory system.

With a good cache memory system design that incorporates clever heuristics that ensure that the desired information is very likely to be represented in the cache memory, a memory system that employs a high-speed cache will provide a very good response time on average. However, if the desired information is not represented in the cache memory, then a slow fetch to the main (slower) memory system will be required. In networking applications that require a guaranteed response time, a conventional cache memory system will not provide a satisfactory high-speed memory solution. Thus, other means of improving memory system performance must be employed.

One simple method that will provide a guaranteed response time is to construct the entire memory system from high-speed SRAM. However, this method is very expensive, occupies a large amount of board space, generates significant amounts of heat, and draws excessive amounts of power.

Due to the lack of a guaranteed performance from conventional cache memory systems and the very high cost of building entire memory systems from high-speed SRAM, it would be desirable to find other ways of creating high-speed memory systems. In particular, it would be desirable to create high-speed memory systems for network devices and other applications that require guaranteed performance. Ideally, such a high-speed memory system would not require large amounts of SRAM since SRAM is expensive, low-density, consumes a relatively large amount of power, and generates significant amounts of heat.

SUMMARY OF THE INVENTION

The present invention introduces the concept of an input/output processor. The key idea of an input/output processor is to functionally divide each task into a compute intensive part (which is handled by the processor) and an I/O intensive part which is handled by the input/output processor. The input/output processor exposes a library of I/O functions which can be used the processor to offload the I/O intensive parts of its tasks.

An input/output processor is designed by analyzing common input/output and memory access patterns and implementing methods tailored to efficiently handle those commonly occurring input/output and memory access patterns. The input/output processor may efficiently handle those common input/output and memory access patterns in a number of different ways.

One technique the input/output processor uses to efficiently handle certain memory access patterns is to off-load some of the processor's work in order to simplify a memory access task. For example, the incrementing of a counter normal requires a processor to read a counter value from memory, increment the counter value, and then write back the incremented counter value back the memory location. The input/output processor instead allows the main processor to issue a single increment counter command with an identifier that specifies a particular counter to increment. The main processor may then resume execution of other commands. The input/output processor will then handle reading the counter value, incrementing the counter, and writing back the counter. Thus, the input/output processor offloads work from the main processor in a manner that reduces the amount of memory accesses performed by the main processor such that its performance is improved.

Another technique used by the input/output processor is to divide memory storage tasks into high frequency or high-availability components and low frequency or low-availability components. After dividing a memory storage task in such a manner, the input/output processor then uses high-speed memory (such as SRAM) to store the high frequency and high-availability components and a slower-speed memory (such as commodity DRAM) to store the low frequency and low-availability components. For example, when storing a large First-In First-Out (FIFO) queue, the input/output processor stores the head of the queue (which is frequently read from) and the tail of the queue (which is frequently written to) in a high-speed memory and the remainder of the FIFO queue (the center portion) may be stored in a slower-speed memory since the center of the queue will not ever need to be accessed with critical speed. Note that the input/output processor must carefully monitor the status of the queue and perform required updates such that the current head of the queue and the current tail of the queue are always available in the high-speed memory. In this manner, the input/output processor is able to efficiently use memory such that a limited amount of expensive and power-hungry high-speed memory is used only for high-frequency and high-availability information and that low frequency and low availability information is stored in less expensive, higher density, less power-consuming slower-speed memory.

Another technique used by the input/output processor is to allocate memory storage tasks in such a manner that all memory bank conflicts are eliminated. By eliminating any possible memory hank conflicts, the maximum random access performance of DRAM memory technology can be achieved.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

Figure 1:
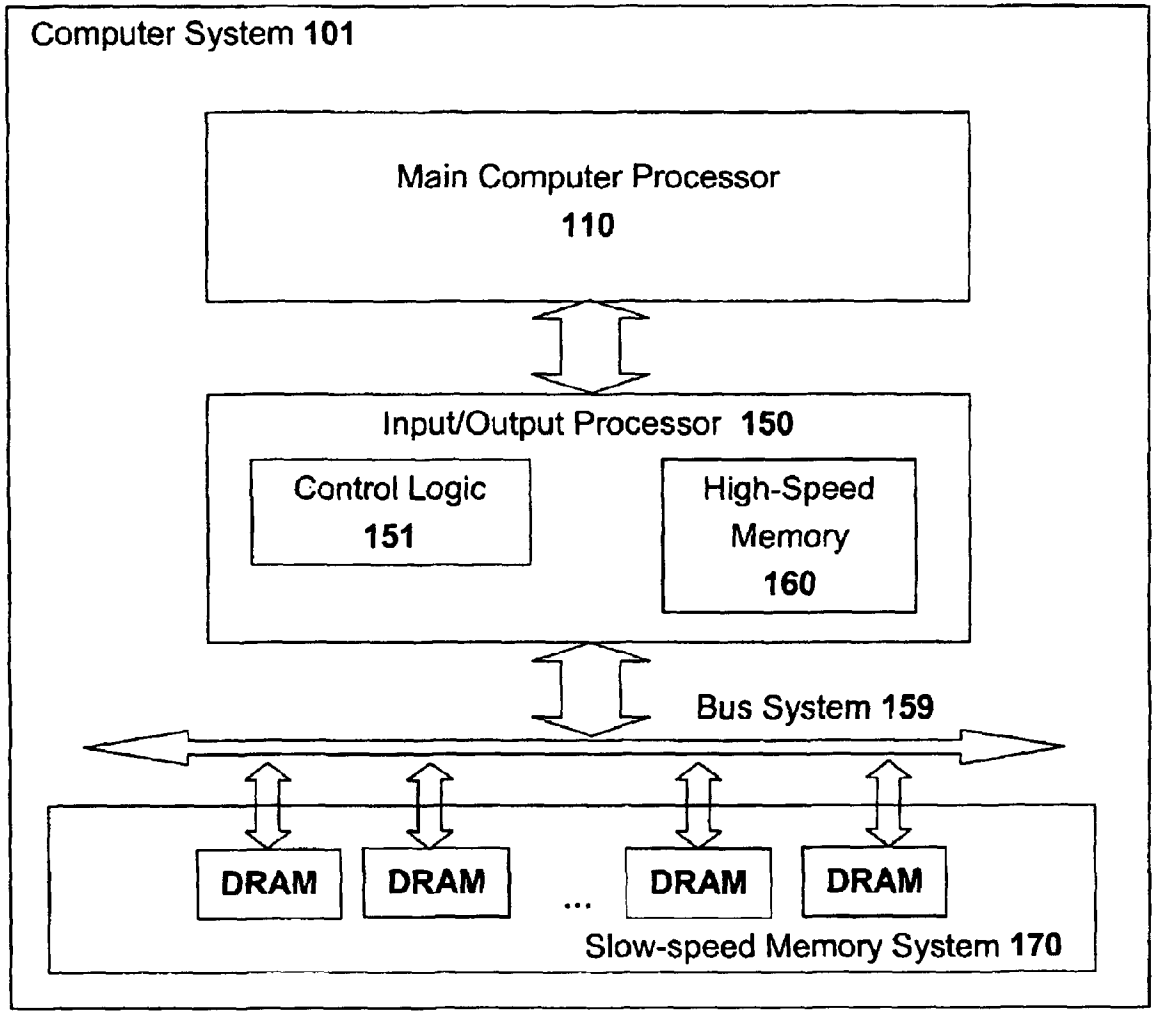
FIG. 1 illustrates a high-level block diagram of an input/output processor in a computer system.

A method and apparatus for implementing a high-speed memory control system and input/output (I/O) processor is disclosed. In the following description, for purposes of explanation, specific nomenclature is set forth to provide a thorough understanding of the present invention. However, it will be apparent to one skilled in the art that these specific details are not required in order to practice the present invention. For example, the teachings of the present invention have largely been described with reference to packet-switched network applications that need FIFO queue services, counter services, and other services needed by network applications. However, the same memory control and input/output techniques can easily be applied to other types of computer applications.

High-Speed Memory Control System and (I/O) Processor

To greatly improve the performance of input/output and memory subsystems for digital computers without significantly increasing the power consumption of the memory subsystem or cost of the memory subsystem, the present invention introduces a high-speed memory control and input/output system that is also known as an Input/Output (I/O) Processor (IOP). The input/output processor of the present invention is designed after closely examining the input/output and memory access patterns of a particular computer application. This ensures that the input/output processor will be designed in a manner that allows the input/output processor to provide high-performance input/output and memory services to that particular computer application. Specifically, the design of the input/output processor will be tailored to optimally handle the most frequent types of input/output and memory accesses of the particular examined computer application.

Cache memory systems have long been used to improve the performance of memory subsystems in computer systems. However, conventional cache memory systems generally operate in a relatively simplistic manner. Specifically, conventional cache memory systems use a heuristic that postulates that when a computer processor accesses a particular memory location then that computer processor will likely also access other nearby memory locations. This is known as 'spatial locality' since the other memory locations expected to be accessed will be in the same local memory space. Furthermore, conventional cache memory systems postulate that a computer processor will likely access the same memory location again soon. This is known as 'temporal locality' since the cache memory system expects that the same memory location will be accessed again in the near future.

To accomplish these goals, cache memory systems are generally organized into pages or rows such that when a cache miss occurs, the cache memory system will load in an entire page of memory from the region where the desired information is located. In this manner, the cache memory system will now also contain other nearby memory locations available for immediate access. When a cache memory subsystem is completely full (as is normally the case) then some information must be removed from the cache memory in order to make room for new information that is requested by the processor. In general, cache memory systems will remove the page of memory that has not been accessed for longest period of time.

The input/output processor system of the present invention takes a much more sophisticated approach to improving the performance of a memory subsystem. To construct the input/output (I/O) processor system of the present invention, the various different types of memory access patterns and the memory data structures have been far more carefully analyzed. The various different types of memory access patterns observed have been systematically categorized. Each different type of memory access pattern is then subjected to further analysis in order to determine what can be done to reduce the frequency of that type of memory access pattern and/or what can be done to improve the efficiency and speed of that type of memory access when it does occur. This technique of identifying specific methods to speed up specific identified memory access patterns has been labeled "memory access pattern aware caching". Memory access pattern aware caching also includes "application aware caching" since many computer applications use specific identifiable memory access patterns.

With regard to some types of the memory accesses patterns, the actual program instructions and processor operations have been carefully examined to determine if those operations may be offloaded from the main processor in the computer system to the input/output processor. When such off-loading is possible, then the processing requirements of the system's main processor are reduced for that type of memory access. An example of this off-loading of an operation can be provided with the memory accesses performed when updating a statistics counter.

In a conventional computer system, the traditional manner of incrementing a counter stored in memory is be to have the main processor read the contents of the memory location that contains the counter value into a register, increment the counter value in the register, and then write the incremented counter value from the register back to the same memory location. In one embodiment of the present invention, the entire process of incrementing a counter is performed by having the processor send an 'increment counter' instruction to the input/output processor along with an identifier specifying the particular counter to increment. In this manner, a memory read and subsequent memory write have been reduced into the simple transmission of a single instruction and counter identifier pair.

With regard to some of the memory accesses patterns, the input/output processor divides the memory storage task into high frequency or high-availability components and low frequency or low-availability components. The input/output processor then stores the high frequency and high-availability components of the memory access pattern into a high-speed memory (such as SRAM) such that those components may be accessed quickly. The input/output processor stores the low frequency and low-availability components of the memory access type in a slower-speed memory (such as commodity DRAM). This division of the different components of the memory access type is performed in order to use different memory types in an efficient manner. An example of this technique can be provided with reference to First-In First-Out (FIFO) queue types of memory access operations.

To efficiently store information in a large First-In First-Out (FIFO) queue, the input/output processor stores the head of the queue that is read from frequently and the tail of the queue that is written to frequently in a high-speed memory subsystem. The remainder of the FIFO queue, the center portion of the queue between the head and the tail, may be stored in a slower-speed memory subsystem. This is possible since the very center of a FIFO queue will not ever need to be accessed with critical speed. Note that the input/output processor must carefully monitor the status of the FIFO queue and perform required updates such that the current head of the FIFO queue and the current tail of the FIFO queue are always available in the high-speed memory subsystem. In this manner, the input/output processor is able to efficiently use memory such only high-frequency and high-availability information is stored in a limited amount of expensive and power-hungry high-speed memory and that low frequency and low availability information is stored in less expensive, higher density, less power-consuming slower-speed memory.

With regard to some of the memory accesses patterns, the input/output processor allocates slow-speed memory in a manner that prevents any memory bank conflicts from occurring that will degrade the performance of the memory device. In DRAM memory, a memory bank conflict occurs when there are two consecutive memory references to memory locations in different memory rows but within the same memory bank. Such a memory bank conflict causes the DRAM memory to respond with its worst-case latency period. To prevent such latency caused by memory bank conflicts, the input/output processor allocates DRAM memory in a manner that eliminates all memory bank conflicts when possible or significantly reduces the probability of memory bank conflicts. When the input/output processor is able to eliminate any possible memory bank conflict from occurring, then the maximum random access performance of DRAM memory technology can be achieved.

A Basic Input/Output Processor Block Diagram

FIG. 1 illustrates a high-level block diagram of an input/output processor 150 of the present invention implemented within the context a generic computer system 101. As illustrated in FIG. 1, the input/output processor 150 is situated between a main computer processor 110 and a computer bus system 159. The computer bus system 159 is coupled to memory system 170 that is used by the input/output processor 150. The computer bus system may also be coupled to input/output devices (not shown).

The input/output processor 150 provides the main computer processor 110 with input/output and memory access services such that the main computer processor 110 is able to achieve a higher level of performance since certain memory and input/output intensive operations are off-loaded to the input/output process 150. Furthermore, the input/output processor 150 uses its knowledge of various memory access patterns to allocate memory in an efficient manner that such that a combination of a small amount of high-speed memory 160 and a larger amount of slow-speed memory 170 can provide memory services that would normally require a large amount of high-speed memory if the input/output processor 150 were not present.

The input/output processor 150 includes control logic 151 that analyzes memory service and input/output service requests from the main computer processor 110 and then responds to those requests in an appropriate manner. Certain operations will require the use of a limited amount of high-speed memory 160 that is closely associated with the control logic 151 of the input/output processor 150. When designed properly, the control logic 151 of the input/output processor 150 will be able to respond to any request from the main computer processor 110 quickly using logic or using data in the local high-speed memory 160 area.

In addition to the high-speed memory 160, the control logic 151 will also use a much larger but slower-speed memory system 170 (that may be implemented with commodity DRAMs). The control logic 151 use the slow-speed memory system 170 to store any information from the main computer processor 110 that does not need to be read or updated frequently. With the proper design of intelligent control logic 151, the input/output processor 150 will make the small high-speed memory 160 and the large slow-speed memory system 170 (such as a DRAM memory system) appear to the main processor 110 as if it were a larger memory system constructed only using high-speed memory (such as SRAM). Thus, the input/output processor 150 is able to provide a memory subsystem with the speed of an SRAM-based memory subsystem but with the high-density, low-cost, and low-power consumption of a DRAM-based memory subsystem.

Key Features of the I/O Processor

The input/output processor of the present invention provides a large number of advantages to the designers of various different high-speed computer systems. These advantages make the input/output processor into a highly desirable memory architecture for future generations of many different high-speed computer systems. Computer systems that are dedicated to specific applications such as high-speed packet-switched network devices will particularly benefit from the input/output processor system since their frequently repeated memory operations can be efficiently optimized by the input/output processor.

Cost Advantages

One of the principle advantages of the input/output processor is that the input/output processor reduces the cost of high-speed computer systems. Specifically, the input/output methods of the input/output processor allow the input/output processor to provide the high-speed memory requirements of many demanding applications (such as on a network processor in a modem network device) using only inexpensive conventional DRAM memory devices. By eliminating the need for large amounts of expensive SRAM memories or other high-cost low-latency memories (such as RLDRAMs, FCRAMs, etc.) the input/output processor directly reduces the cost of a computer systems constructed with the input/output processor.

The input/output processor also indirectly reduces the cost of a computer system. The input/output processor offloads many input/output intensive tasks from the main processor in a high-speed computer system such that the amount of logic required in the main processor (for FIFO buffering, memory management, free and linked list management, table lookups, counter maintenance, queue, state management etc.) can be reduced. Furthermore, by providing a single interface for a wide variety of memory services, the pin count of the main processor may be reduced. Thus, by simplifying the requirements of the main processor, the input/output processor indirectly decreases the costs of designing and/or manufacturing a main processor for a high-speed computer system.

Speed and Efficiency

As set forth in the background, the memory design requirements of embedded high-speed computer systems such as those implemented in high-speed network devices have become extremely difficult to fulfill. However, the programmable memory features and input/output sequencer features of the input/output processor reduce the frequency of memory accesses that the main processor must make to the memory subsystem. For example, in a route lookup application, the main processor in a conventional memory device would normally require six accesses to the memory subsystem for each packet. In a system implemented with an input/output processor, the main processor only requires a single command to the input/output processor in order to offload route task. The input/output processor would then perform these six memory accesses normally required to perform the route lookup or it may implement a more efficient method of performing the route lookup.

In certain embodiments, a streaming command interface is implemented between a computer processor and the input/output processor. In such systems, the streaming command interface allows a huge reduction in the number of memory accesses from main processor to the memory subsystem. A streaming command interface also increases the bus efficiency between the processors and the input/output processor. Specifically, the streaming command interface allows for multiple input/output requests to be sent to or received from the input/output processor.

Simplified Development

The input/output processor of the present invention can simplify the task of designing high-speed computer systems. The input/output processor may simplify both the software development and the hardware design of dedicated computer systems such as network devices.

With regard to software development, the input/output processor simplifies the main processor's view of its associated memory. Specifically, the input/output processor presents an abstract and logical view of the associated memory subsystem and input/output. This abstraction allows the main processor's software to take advantage of a simplified view of memory. The software running on the main processor need not be aware of the actual locations and addresses of individual data entries in memory. Instead the main processor uses an abstracted view of its associated data. For example, logical addresses can be used to access statistics counters, netflow state, FIFO queues, and other commonly accessed state information. (Note that the main processor might be hard-coded as an ASIC, however the firmware that controls the ASIC will still enjoy a simplified view of state information maintained by the input/output processor.)

With regard to hardware development, the input/output processor may greatly simplify the memory system design for the computer processor, network processor, ASIC or other processing element that will interact with the input/output processor. The input/output processor may integrate some, most, or all of the off-chip memory requirements of multiple different applications into a single integrated circuit. Furthermore, no additional memory system design is required since the input/output processor handles all memory access including conventional raw memory accesses.

Input/Output Processor Applications

The input/output processor of the present invention may be used in many different computer applications that demand high-performance input/output and memory services. The input/output processor is best used when there is some type of recurring input/output or memory access pattern that may be optimized. The following Table 1 lists a set of computer system applications wherein an input/output processor may be used and the associated input/output and memory access patterns that may be optimized by the input/output processor.

TABLE 1

Applications for the Input/Output Processor

| Application | Common Input/Output or Memory Access Patterns |
|---|---|
| Network Routers | Data packet FIFO queues, statistics counters, route lookups |
| Graphics Processors | Scanline memory accesses, texture map access, transformations, repetitive pixel-based operations |
| Medical Equipment | Large Data Acquisitions, Image processing |
| Multimedia Servers | Large media accesses, stream buffering in FIFO queues |
| Image processing | Convolutions, repetitive pixel-based operations |

Note that not all memory and input/output accesses will neatly fit into the memory and input/output access patterns optimized in the input/output processor framework. However, once a number of memory tasks have been offloaded to an input/output processor, the designer might as well offload all memory access operations. The same might be said for a network processor that needs SRAM access speeds for packet buffers, but only needs DRAM access speeds for fetching computer instructions. In one preferred embodiment, the main processor will offload all the memory operations such that in addition to special optimized memory accesses (such as FIFO queues and statistics counters), the input/output processor operates as a kind of null device that simply reads and writes the slow-speed raw memory accesses to/from DRAM. The benefit of such an embodiment is that the processor then only requires a single memory interface. By offloading all memory accesses to the input/output processor, the input/output processor device allows the main processor to be completely independent of the underlying memory technology.

To best describe the input/output processor of the present invention, this document largely describes one specific example application of the input/output processor. Specifically, a number of implementation details about the input/output processor of the present invention will be disclosed in the context of a packet-switched network device such as a network line card for a network router. In such a packet-switched networking application, the described input/output processor will implement methods of efficiently performing the types of memory access patterns that frequently occur within the context of the network device applications. However, those skilled in the art will recognize that the teachings of the present invention can be applied to any digital computer application wherein consistent repeating patterns of input/output operations or memory accesses can be identified and optimized. For example. a specialized input/output processor could be tailored to handle any of the different applications described in Table 1.

Furthermore, it should be noted that although the packet-switched network device embodiments of the present invention are mainly designed to optimize memory accesses, the techniques of the present invention can also be applied to any applications have consistent input/output usage patterns. A network device embodiment may use the input/output processor in order to receive packets on incoming ports and send packets on outgoing ports and thus reduce the input/output tasks that must be performed by the main processor. In a multimedia server application that provides multimedia streams to a number of different client systems, the input/output processor may be used to efficiently service multiple streaming output ports.

I/O and Memory Demands in a Packet-Switched Networking Application

All packet-switched network routers, such as network routers for Internet Protocol (IP) or Asynchronous Transfer Mode (ATM) contain large amounts of memory. The memory in a network router is largely used to store data packets during times of network congestion, network lookup tables, pointer data for network queues, statistics on data streams, and other necessary network state information needed to operate the network router. Due to the memory intensive and input/output intensive nature of packet-switched network applications, designing the memory subsystem for network system devices has become very challenging.

Input/Output and Memory Demands for a Packet-Switched Network Device

Figure 2:
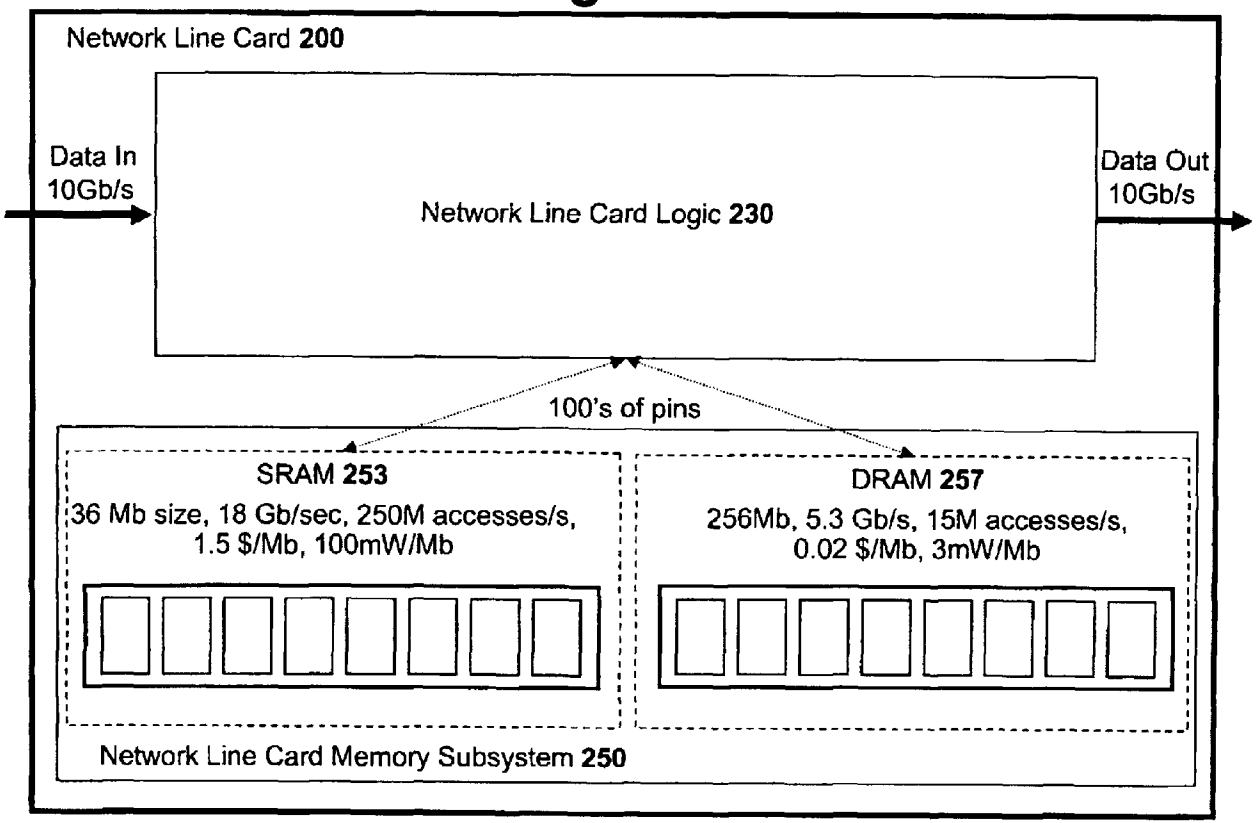
FIG. 2 illustrates a high-level block diagram of a typical network line card that may be used in an Internet core router wherein the memory system has been illustrated with two different possible memory subsystems.

Designing a memory subsystem for packet-switched network systems has become an increasingly difficult task due to the significant combined requirements of a large size memory system that operates at with fast memory access speeds. For example, a network line card in an Internet core router may need to perform packet-buffering for incoming lines that receive data at ten gigabit per second (10 Gb/s). FIG. 2 illustrates a high-level block diagram of such a ten gigabit per second network line card 200. The packet buffering task of the network line card 200 requires a high-performance memory subsystem that can support a memory input/output (I/O) bandwidth of at least 20 Gb/s (10 Gb/s in and 10 Gb/s out) in order to support both a memory write to the packet buffer memory and memory read from the packet buffer memory for every data packet that passes through the network line card 200.

In the worst-case scenario, the network line card 200 will receive a stream of minimum size 40 byte Internet Protocol (IP) data packets arriving at full speed. If the network line card 200 receives a 40 byte IP packet once every 32 nanoseconds (ns) then the packet buffer memory of the network device will be accessed every 16 nanoseconds (once for a write to the packet buffer memory and once for a corresponding read from the packet buffer memory). In general, an Internet core router should be able to buffer approximately 400 milliseconds of data packets. With 400 milliseconds of data packet buffering requirement, then the memory subsystem of a network line card must be about 4 Gigabit in size.

In addition to the demanding packet buffering task, the network device's memory subsystem must also support additional tasks such as network route look-ups, network statistics counter storage, packet scheduling, and network traffic policing. These additional network application tasks place additional demands on the network device's memory subsystem. For example, these additional tasks will affect the memory subsystem's size, bandwidth, and access rate. On network line cards that process data packets at a 10 Gb/s rate it is quite common to see 4 Gb of memory that is accessed at least once every 20 nanoseconds. As the amount of features on network routers grows and digital communication line-rates increase then significant memory size, memory bandwidth, and required memory access speeds only grow.

The two most popular types of conventional memory technology in the market today are static random access memories (SRAMs) and dynamic random access memories (DRAMs). SRAM memory technology has a relatively fast access time but has a low density (storage capacity per integrated circuit), a high cost, and high power requirements. DRAM memory technology has a much higher density, a far lower cost, and far lower power requirements than SRAM memory technology. However, DRAMs suffer from having a much slower access time.

Referring again to FIG. 2, the 10 Gb/s network line card 200 includes network line card logic 230 for receiving, processing, and sending packets; and a network line card memory subsystem 250 for temporarily storing network packets. FIG. 2 illustrates the network line card memory subsystem 250 implemented with two different possible memory subsystems surrounded by dotted lines. The first memory subsystem is a SRAM-based memory subsystem 253 and the second memory subsystem is a DRAM-based memory subsystem 257.

Referring to the SRAM-based memory subsystem 253, the largest available SRAM integrated circuit (IC) at the time of writing holds 36 Megabits of information, has a total of 111 pins, supports a per integrated circuit duplex input/output rate of 18 Gb/s, has an access time of 4 ns, consumes 100 mWatts per Megabit, and costs approximately $1.50 per Megabit. To implement a 10 Gb/s network line card that requires 8 Gb of packet buffer memory using only SRAM in memory subsystem 253 then one would need over two hundred and twenty SRAM integrated circuit devices. Such a large array would require a large printed circuit board. Furthermore, such a large array of individual SRAM integrated circuits would consume approximately 800 Watts of power! Obviously, a network line card with such excessive power consumption is energy inefficient. Rut furthermore, such a large SRAM-only array can also cause significant thermal problems in the overall network device design.

Referring to the alternative DRAM-based memory subsystem 257, the largest commodity DRAM at the time of writing holds 512 Megabits of information, has a total of 46 pins, supports a per-integrated circuit duplex input/output rate of 5.3 Gb/s, has a random access time of 57 nanoseconds, consumes approximately 3 mWatts per Megabit, and costs a mere $0.02 per Megabit. Although the energy efficiency, memory density, and cost aspects are very desirable, the performance aspects of DRAM memory are lacking. If a designer were to attempt to build network line card 200 with DRAM-based memory subsystem 257 having only DRAM integrated circuits, then system design would either provide sub-optimal performance or simply not work properly due to the memory and I/O bandwidth limitations. Specifically, in a network line card with network data packets arriving or departing every 20 nanoseconds then a standard DRAM only memory subsystem cannot be accessed fast enough to buffer the data packets at the desired 10 Gb/s in and 10 Gb/s out rate.

By comparing SRAM-based memory subsystem 253 and DRAM-based memory subsystem 257, it would appear that that a fully functional 10 Gb/s line card can only be constructed with expensive high-speed SRAM memory technology. However, the increased speed of SRAM memory devices needed to construct the fully functional network line card 200 comes at the expense only have a low memory density, high power consumption, and a high economic cost. Thus, a network line card 200 implemented with SRAM only would be very expensive and may have difficult thermal considerations due to the high power consumption.

Up until relatively recently when digital communication systems became extremely fast, standard DRAM memory devices had generally been the memory technology of choice by network router designers. The network router designers favored standard DRAM memory devices due to a number of attractive features such as high memory density (bits per integrated circuit), low power requirements, wide availability, support for various different sizes, different clock speeds, multiple sources, support for Dual In-line Memory Module (DIMM) packaging, and a very low per-bit cost.

However, standard DRAM access speeds do not meet the access speeds required to implement 10 Gb/s and faster packet-switched network equipment. Thus, designers of such high-speed network devices have been forced to either adopt much more costly memory technologies such as SRAM memory devices or find a means to deal with the inadequate performance of DRAM memory devices. This difficult dilemma forms the basis of the "input/output and memory problem" that is currently being faced by designers of high-speed network devices as well as by designers of other high-speed computer devices such as the applications set forth in Table 1.

This input/output and memory problem has grown particularly acute in the field of packet-switch network equipment. Packet-switched network routers are now commonly processing data packets at 10 Gb/s either on a single distributed 10 Gb/s line card or by aggregating multiple slower speed ports such as tens of gigabit Ethernet ports or hundreds of fast Ethernet ports (such as 100Base-T), or other aggregations of various slower speed network ports. Such high-speed packet-switched network applications present very challenging memory requirements in terms of both memory speed and memory capacity.

For such high-speed network systems, the cost of the accompanying high-speed memory subsystem has become a significant portion of the total cost of each network device. For example, many network line cards on large-scale routers have a total memory subsystem cost that can be anywhere from $500 to $1000 or more. Specifically, the requirements for large amounts of high-performance memory cause the cost of the memory subsystem to become a very large portion of the total bill of materials (BOM) for a network device. For example, the very significant memory subsystem cost (due to the use of costly SRAMs or other esoteric high-speed memory technology) may account for almost 25 to 40% of the bill of materials to construct a network line card. In some extreme cases, the cost of the memory subsystem on these network line cards is higher than the cost of the custom-designed network processor (NP) Application Specific Integrated Circuit (ASIC). Ideally, such high-speed network devices would be constructed with a significantly less expensive bill of materials if the high-speed esoteric memories such as SRAM memory devices could be replaced with inexpensive commodity DRAM memory devices.

Unfortunately, the problem of inadequate access speed performance provided by inexpensive DRAM memory devices is not going to be solved anytime soon. And furthermore, the need for higher speed memory devices will grow worse as network communication speeds continue to increase. DRAM integrated circuits are optimized for cost and memory size rather than for access speed. Although the memory capacity of DRAM memory devices has grown very rapidly over the last decade, the access speed of DRAM memory devices has only increased by approximately 10% every eighteen months. On the contrary, digital network communication line rates have increased by approximately 100% every eighteen months. Thus, the memory access speeds of DRAM memory devices will fall further and further behind the needed memory access speeds for network devices.

Over time, the memory access speed problem will become progressively worse in the packet-switched network communication field. Specifically, as digital communication link rates will increase in core routers, communication line cards will connect to more ports; and memories will need to be larger and faster. Thus, as digital networking systems process data packets at rates of 10 Gb/s and higher (either on distributed communication line cards or aggregated centralized processing cards), these digital packet-switch network systems will face the significant challenges presented by the "I/O and memory problem."

DRAM Memory Technology

The internal structure of a DRAM memory device is arranged as an array of rows and columns. A designated set of contiguous rows in a DRAM memory device is generally referred to as a memory 'bank'. The access time of a memory device is defined as the minimum amount of recovery time required between consecutive accesses to the memory array. The access time of a DRAM memory device is generally dependent on the particular sequence of memory accesses. Specifically, the access time will vary greatly depending upon which particular memory locations in the DRAM memory device are being accessed and the order of those memory accesses. Many DRAM memory devices have three distinct memory access modes that are dependent on the memory locations accessed. The three different memory access modes in many DRAM memory devices are burst mode access, random access without bank conflict, and random access with bank conflict.

Burst mode access is when two consecutive memory accesses to adjacent memory locations in the same memory bank occur. Specifically, the access time between two consecutive references to adjacent memory locations in the same row of the same bank is referred to as the burst mode access time. In burst mode access, the access time of a current conventional DRAM is approximately ten nanoseconds. This represents the best-case scenario for an access time in a DRAM device.

Random access without bank conflict occurs when there are two consecutive memory accesses to two different memory locations that are located in different memory banks. This refers to the access time between two consecutive memory accesses to memory rows situated in different memory banks. A random access without a bank conflict memory access usually requires no more than fifteen nanoseconds in a current conventional DRAM memory device and represents the best-case random access (non burst mode) time.

A random access with bank conflict occurs when there are two consecutive references to different memory rows that are in the same memory bank. This is generally referred to as the "random cycle" access time of the DRAM memory device and represents the worst-case memory access time for random accesses to a DRAM device. The random cycle access time is on the order of sixty nanoseconds for the currently available commodity DRAM devices. Obviously, it would be best to avoid such memory accesses that cause bank conflicts due to the very significant access time penalty.

There are a number of other factors that may also affect the access time of a DRAM memory device. For example, a memory read immediately followed by memory write or a memory write immediately followed by memory read on the DRAM may result in additional memory access time penalties. All of these intricacies of DRAM memory devices should be considered when designing a DRAM-based memory system for any digital computer system in order to optimize the performance of the computer system.

Memory Access Patterns in Network System Devices

Packet-switched network devices present many difficult memory access problems for a memory subsystem. In the creation of the input/output processor of the present invention, the different memory access patterns of network routers have be carefully categorized. The input/output and memory access for different network router functions have been classified into the following different types that are summarized in Table 2 that follows.

TABLE 2

Network Router Functions That Face the I/O and Memory Problem

| I/O and Memory Access Type | Router features & functions that access I/O and memory in this manner | Possible to design with SDRAM at 10 Gb/s |
|---|---|---|
| Predominantly Reads, Few Writes | MAC, MPLS and Route Lookup, Flow Lookups, MPLS or Route Load-Balancing, Next Hop (Adjacency) Table Mgmt. | No |
| Writes and Reads for FIFO queues | Packet Buffering | Yes-Poor Performance |
| Unpredictable combination of Reads and Writes | Memory Management-Maintaing Queue Linked Lists, Free List Management for all applications | No |
| Read, Modify, and Write Counter | Counters for Routes, MPLS Label, ACLs etc, Measurements, Netflow, IDS, RMON/SNMP, Stateful Firewall, Tracing NBAR | No |
| Read-Modify-Write | Policing-CAR, Token Bucket Algorithms; State Tables for NAI, Stateful Firewall, TCP Intercept, CBAC, SLB, URL Switching, etc. | No |
| Bulk or Predictable Reads/Writes | Netflow Packet Capture, Memory Polling, Flow Aging, Counter Reporting | Yes |
| Blind Writes | Updates to all of the above memories | Yes-Only if updates are slow |
| Scheduler Accesses | QOS Scheduling from FIFO | No |

As set forth in Table 2, the memory access patterns that are commonly seen within network router devices have been categorized into eight different memory access types. Each of the eight different memory access patterns listed in Table 2 will be individually discussed in detail.

Predominantly Memory Reads with Few Writes

The first type of memory access pattern for network router devices listed in Table 2 is the pattern of predominantly memory reads with only a few writes to memory. This type of memory access pattern occurs for all table look-ups wherein input data is used to index into a table in memory to obtain an output value. Examples of look-ups in network applications include Media Access Control (MAC), Multi-Protocol Label Switching (MPLS) and longest prefix match look-ups.

Each of the table look-ups operates by reading data structures contained in memory every time a new data packet arrives into the network device. This memory access pattern results in mainly read accesses to the look-up table information stored memory. Only rarely is the look-up table modified with a memory write to the look-up table. The memory location to be read from the look-up table in the memory subsystem depends on the information in the arriving packet and is thus not predictable. Therefore, the performance of a lookup into a table stored in DRAM is limited by DRAM random cycle time.

Memory Writes with Later Matched Memory Reads

The second type of memory access pattern for network router devices listed in Table 2 is the repeating pattern of a memory write followed by corresponding memory read at a later time. When data packets arrive into a packet-switched network device, the data packets are first written to a memory buffer and then later read from memory buffer in order to send the data packets to the switch fabric (on an input line card) or to the output line (on an egress line card).

The initial memory write caused by the incoming data packet is unconstrained since the incoming data packet may be written to any memory bank that is available for use. However, the corresponding later memory read of the incoming data packet is constrained since it will read from the same memory location that was previously used for the write. The sequence in which data packets are read from a data packet memory buffer is determined by a scheduling algorithm that selects the packet buffering FIFO queue that will be serviced next. Various different scheduling algorithms that may be implemented include a Weighted Fair Queuing (WFQ) scheduler, a First-Come First-Served (FCFS) scheduler, a strict priority scheduler, and by a switch fabric arbiter. Depending on the next data packet to be read from the packet buffering memory any location in the DRAM memory might need to be accessed. So, data packet buffering is also limited by DRAM random cycle time.

Unpredictable Memory Reads and Writes

The next type of memory access pattern occurring in network router devices listed in Table 2 is the pattern of unpredictable memory reads and memory writes. Computer memory systems that are maintained on DRAM generally have associated free memory lists known as 'free lists.' The free lists are usually maintained as a linked list of all the free (available for usage) memory locations in the memory system.

Depending on a computer system's application, many other types of linked lists may also be maintained. For example, packet-switched network devices such as network routers that perform packet buffering generally maintain multiple First-In First-Out (FIFO) queues for the data packets that are being routed. Such a packet-switched network device may either allocate or free memory depending on whether data packets arrive in the network device or depart from the network device, respectively. These memory allocations and releases of memory for maintaining these data packet queues can also result in unpredictable memory reads and memory writes to the linked list data structures.

Statistics Counters

The fourth type of memory access listed in Table 2 known to commonly occur in network router devices is access to statistic counters. Specifically, network router devices often exhibit a pattern of a read, a modification, and then a write to an individual counter value.

Many features on network router devices need to maintain a number integer counter values for tracking various network statistics. For example, counter values may be maintained for every Multi-Protocol Label Switch (MPLS) or network route prefix in order to measure the traffic on the network. Many data network monitoring & control applications such as Netflow, Intrusion detection systems (IDS), Access Control Lists (ACLs), Remote Management and Simple Network Management Protocol (RMON/SNMP), stateful firewall service, Network Tracing, and Network Based Application Recognition (NBAR) etc. also require counter values.

The most commonly occurring counter operation involves reading the value of the counter, updating the value of the counter, and then writing the counter value back to memory location associated with the counter value. With such counter operations both the read from memory and write access to memory are constrained (in contrast to packet buffering). However, the exact counter value memory addresses that will need to be accessed cannot be predicted.

Reads-Modify-Write Operations

The fifth type of network router device memory access pattern listed in Table 2 is the commonly occurring pattern of Read-Modify-Write. A number of network router features maintain a flow state, and thus need to perform read-modify-write accesses to memory. Examples of network device features that need read-modify-write accesses to memory to maintain a flow state include packet policing, network address translation (NAT), stateful firewall applications, TCP Offload and TCP Intercept, content-based application recognition (CBAC), server load balancing (SLB), and URL switching.

Flow state information is updated as follows. When a new data packet for a flow arrives in a network router, these applications read the current state of the flow, then update and modify that flow state, and finally write the updated flow state back to memory. Again, since the specific memory location that needs to be accessed is dependent on the particular data packet that arrives, the performance of such flow state operations is limited by DRAM random cycle time.

Predictable Bulk Memory Read or Write Operations

The sixth type of memory access listed in Table 2 known to commonly occur in network router devices is bulk or predictable read and writes. Certain network router features need to perform large memory reads or memory writes in bulk. One example of a feature that requires bulk memory accesses is "Netflow packet capture". In a Netflow packet capture operation, matching data packets are usually written to memory and later read back from memory in a round robin manner. Similarly, for certain background management tasks such as flow aging or polling, the memory access pattern is predictable since those memory accesses associated with flow aging and polling are performed in a round-robin manner. Since such bulk or predictable read and write memory accesses are very predictable, these types of network device features can continue to be implemented in conventional DRAMs in high-speed network devices without performance degradation.

Blind Writes to Memory

The seventh type of network router device memory access pattern listed in Table 2 is the commonly occurring pattern of blind writes to memory. All memories maintained by various applications need to be updated. On the memory and input/output interface these appear as writes to memory. By definition, the memory locations that are accessed by these blind memory updates is unpredictable thus making "memory updates" also dependent on DRAM random cycle time. However, some features require memory updates to be done at much slower rates and for such features DRAMs are adequate.

Scheduler Accesses

The eighth type of network router device memory access pattern listed in Table 2 is the memory access pattern associated with Quality of Service (QOS) scheduling of packets from different FIFO packet queues. In order to provide Quality of Service features, a packet-switched network router must select which packets will be serviced based upon the quality of service ratings of the various FIFO packet queues. Depending on the next data packet to be read from the memory buffer, any location in FIFO packet queue memory might need to be accessed. The data structures needed by the scheduler, such as queue statistics, linked lists, free lists etc, need to be accessed on a per packet basis. So the memory required to store these data structures is also limited by DRAM random cycle time.

It can be argued that, statistically speaking, the probability of accessing the same memory bank on a DRAM multiple times in succession is low such when a large number of input/output accesses are made to DRAM in a larger network device. One may wish to assume that the DRAM banks will be accessed in a more or less balanced manner. With such an assumption, an input/output processor could be designed to receive a large number of input/output requests and re-order the requests so as to interleave memory accesses to different banks. With a well-designed interleaved memory system then, statistically speaking one, could state that the DRAMs provide a statistical average access time of approximately 20 nanoseconds (the access time when there are no bank conflicts).

However, such a statistical average access time does not give a deterministic guarantee that is required for network operation without any packet loss. Furthermore, with such a system, the various memory accesses will have to be re-ordered using a very complex memory access re-ordering system. While such statistical average access times might be acceptable for a computer system design (in which cache misses, Translation look-aside buffer misses, and memory refreshes are common), it is not generally acceptable in a network router application where pipelines are deep, packet throughput is paramount, and in-order packet delivery is mandated by the Internet standards.

Additional Memory Problems in Network System Devices

In addition to the difficult memory access speed problem, there are a number of additional factors that must be considered when designing a memory system for a network system device such as a router. For example, the following system wide issues must be taken into consideration when designing a memory subsystem for a high-speed network router.

One straight forward physical limitation that can be problem when designing a memory system is the physical pin count limitations of memory devices. Depending on the exact values of the memory device size and access rate, a large number of I/O pins are required to interface the network processor in a network router to the memory subsystem. For example, on a 10 Gb/s network line card it is not uncommon for the network processor on the line card to have more than six hundred input/output pins to interface to memory devices. This memory interface pin count combined with the pins that the network processor needs to interface with the Phy/framer, the network switch fabric, other special purpose ASICs on the line card, plus the network processor's own power pins means that the number of pins required on the network processor becomes very large.

Another consideration to take into account is the dependence on the underlying memory technology. Different memory technologies vary widely in terms of physical input/output interface (High Speed Transistor Logic (HSTL), Solid State Track Link (SSTL), Low Voltage Differential Signaling (LVDS), etc.), data bus width, timing parameters, access latencies, burst lengths and DIMM capabilities. The network processor or network ASIC has specialized memory controller blocks that may only interface to a particular type of memory technology. This means that the network processor is unable to talk to two or more different memory technologies through a single memory interface. For example, the Intel IXP 12800 network processor is designed to interface only with RDRAM cannot be used with commodity DRAMs. Such memory technology limitations severely restrict design choice flexibility and directly impacts cost of making line cards.

Another design consideration that should be taken into account when designing a memory controller for a network processor is the future generations of the network processor and the network devices that will use it. When a specific memory controller block is selected, this means that as memory technologies change or evolve, the whole network processor or ASIC will have to be re-spun in order to interface with the new memory technology. This is true even if there is absolutely no change in the network processor's packet processing technology. It would be very desirable to eliminate such memory technology dependencies.

Network processors are often expected to perform a large number of concurrent tasks. For example, the network processor usually must perform data packet parsing, data packet processing, data packet editing, and data packet modification. This set of data packet related tasks are processor intensive. In addition to those processor intensive tasks, the network processor must also perform a number of input/output intensive tasks such as data packet queuing, memory management, maintaining network statistics counters, etc. By requiring the network processor to perform all these different tasks, the die area required to implement the network processor may grow quite large. This growth of the network processor requirements increases the power consumption of the network processor and increases both the design and manufacturing cost of the network processor.

Due to all these difficult design considerations, the designers of memory subsystems for network devices are forced to make difficult design tradeoff decisions. Sometimes the memory subsystem designers either compromise on the input/output throughput by giving only statistical guarantees of performance but no absolute guarantee of performance. Alternatively, the memory subsystem designers will create network devices with reduced feature sets that can be constructed with a smaller memory size and lower memory access speed requirements. Some network device designers create very high-performance network processors by ignoring cost and power considerations. This may be possible by using expensive memory technologies such as RLDRAMs, FCRAMs, SRAMs, etc. But the input/output processor of the present invention introduces a new design choice for network device designers. With the input/output processor of the present invention, a network designer may be able to create high-speed network device designs that provide an absolute performance guarantee yet are not exceedingly expensive.

An I/O Processor in a Computer Networking Application

To improve the design of packet-switched network devices such as packet routers (and other input/output intensive computer systems), the Input/Output Processor (IOP) of the present invention may be used. In one embodiment, the input/output processor of the present invention is a programmable Application Specific Integrated Circuit (ASIC) that has been designed to perform many of the memory and input/output intensive tasks for a network processor. Using a number of sophisticated methods for managing input/output and memory, the input/output processor allows network designers to significantly reduce or completely eliminate the usage of costly static RAMs (SRAMs) and special purpose RLDRAMs.

Figure 3A:
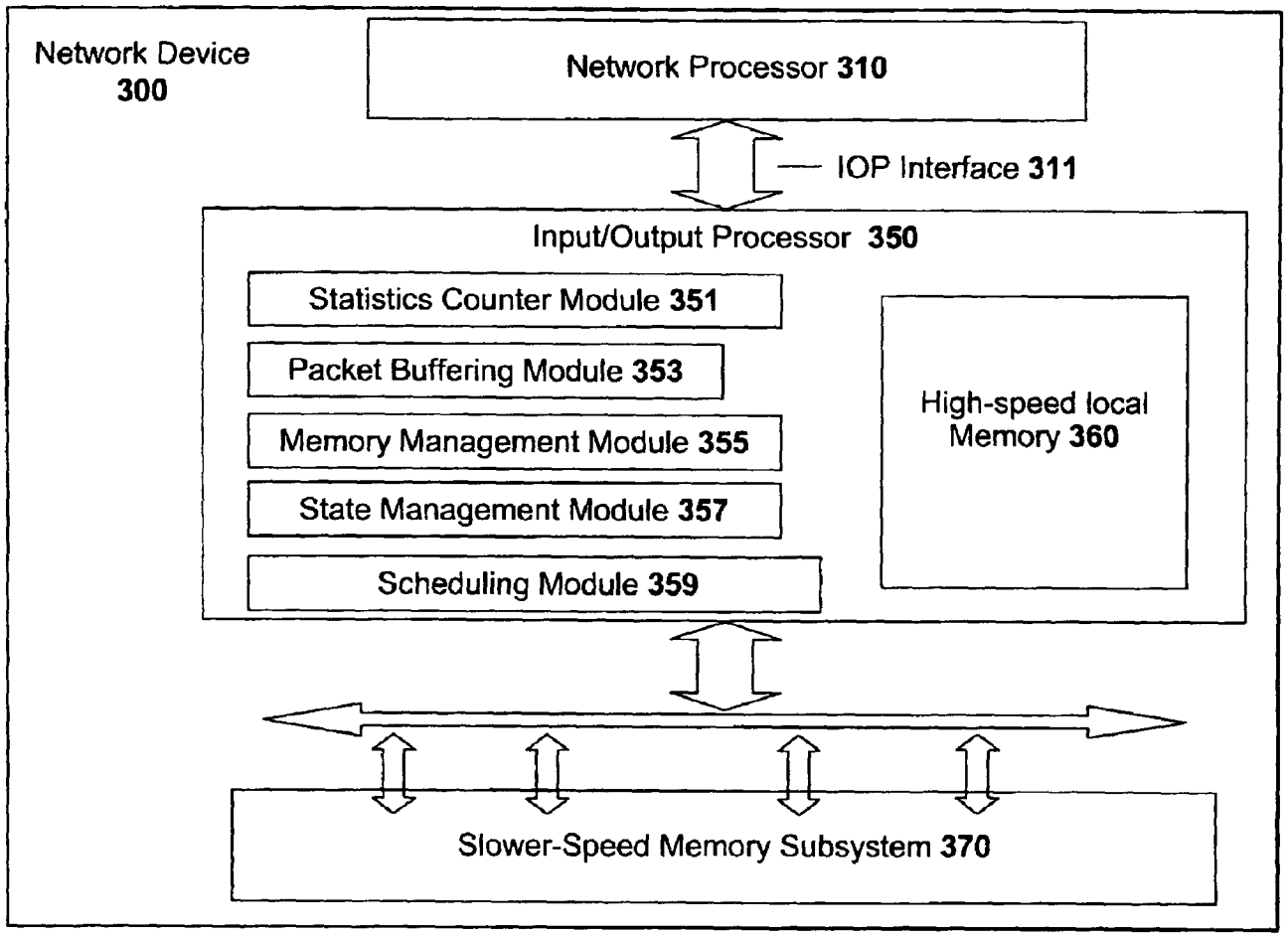
FIG. 3A illustrates an input/output processor that has been implemented for providing input/output and memory services to a network processor in a network application.

FIG. 3A illustrates a block diagram of a network device that has been implemented with an input/output processor 350. In the network device application, the input/output processor 350 is situated between the network processor 310 (or control ASIC) in the network device and a slower-speed memory subsystem 370 that may be implemented with inexpensive DRAM memories. With the aid of input/output processor 350 (and its associated high-speed memory 360), the network device 300 designed with a memory subsystem 370 that that only uses standard DRAM memories can provide the network processor 310 with a memory system having the advantages of high memory density and the inexpensive price of DRAM that also provides high-speed memory access rates equivalent to SRAM devices.

To provide such advantages, the input/output processor 350 offloads many of the input/output and memory accesses for all the network router features listed in column two of Table 2 such that the network processor 310 can focus on its core tasks. Specifically, FIG. 3A illustrates an input/output processor 350 that has been implemented for providing high-speed input/output and memory access services to network processor 310 in a network device application such as a packet-switched network router.

As illustrated in FIG. 3A, the input/output processor 350 contains a number of individual modules for handling a number of specific input/output and memory access problems that are commonly encountered in network devices. The input/output modules illustrated in FIG. 3A include a statistics counter module 351, a packet buffering module 353, a memory management module 355, a netflow state management module 357, and a packet scheduling module 359. Each of these modules provides efficient memory access services using a local high-speed memory 360 and a slower-speed memory subsystem 370.

The various modules 351 to 359 implement specific methods that have been developed to efficiently handle various specific input/output and memory access problems commonly experienced within a network device. The various different modules implement methods such as handling some processing that would normally be handled by the network processor, efficiently allocating and mapping the DRAM in the attached slower-speed memory subsystem 370 such that possible memory conflicts that could slow memory accesses are minimized or eliminated, and dividing storage tasks between a high-speed memory 360 and the slower-speed memory subsystem 370 (such as a DRAM-based memory system). Note that although FIG. 3A illustrates high-speed local memory 360 within the input/output processor 350, the high-speed local memory' may be implemented anywhere as long as the memory access speed requirements are met.

Interface Used by an Input/Output Processor

Referring to FIG. 3A, the network processor 310 communicates with the input/output processor 350 through an input/output processor (IOP) interface 311. The input/output processor interface 311 may be implemented in a number of different manners. To maintain compatibility with existing network processor designs, the input/output processor interface 311 may use one of the many existing memory interfaces that are commonly available and well understood. Possibly pre-existing memory interfaces that may be used include the QDR-SRAM interface, the FCRAM interface, the RDRAM® interface, and the RLDRAM interface.

Alternatively, the input/output processor interface 311 may be implemented with one of many different possible high-speed serial interface technologies. For example, the input/output interface 311 may implement the hypertransport serial interface in order to couple the input/output processor 350 to the network processor 310. The use of a high-speed serial interface would reduce the input/output pin count requirements on both the input/output processor integrated circuit 350 and the network processor integrated circuit 310. Furthermore, a serial interface eliminates the need for a specialized specific memory interface on the network processor 310. Thus, the network processor 310 becomes agnostic with respect to the memory technology that will be used to provide the needed memory requirements. Specifically, the main processor does not need to know whether the memory system is constructed with SRAMs, RLDRAMs, and DRAMs, or any other type of memory technology. Thus, the memory technologies used by the input/output processor 350 (in high-speed local memory 360 and slower-speed memory subsystem 370) may be changed without any direct effect on the design of the network processor 310.

Protocol Used by an Input/Output Processor

In certain embodiments, the network processor 310 communicates to the input/output processor 350 with a specialized memory access protocol that has been created to provide efficient methods of handling many commonly encountered memory access patterns. The memory access protocol allows the processor to access memory in a logical manner. Thus the physical intricacies of the memory, the physical arrangement of the memory, and other complexities are hidden from the main processor. For example, the memory access protocol supports instructions such as "Add 25 to counter number 80", or "read packet from queue 40".

The memory access protocol largely consists of a number of memory access instructions with associated instruction parameters. Most of the memory access instructions specify a specific type of memory access operation and is accompanied by associated instruction parameter information.

The memory access protocol largely consists of a number of specialized memory access instructions for performing specialized functions. The specialized memory access instructions include a set of instructions for handling statistics counters, linked lists, and First-In First-Out (FIFO) queuing.

To complement the specialized memory access instructions, the memory access protocol also provides instructions for performing a number of simple raw memory access methods. The raw memory access methods include simple memory reads that need an address parameter and simple memory writes that must specify a memory address and a data value to be written into memory. In addition to the simple raw memory access methods, the memory access protocol also provides a set of smart memory access methods. The smart memory access methods allow locations in memory to be incremented or decremented by specified amounts.

Finally, the memory access protocol also includes a few special instructions for implementing specific memory system management features. For example, specific memory access instructions may be provided for such as turning on or off features such as Error Correction Codes (ECC).

The memory access protocol allows constructs for a control plane processor to program the logical to physical mapping of the memories that are present behind an input/output processor. Thus, the memory access protocol will allow the memory behind the input/output processor to be addressed both in a logical manner (write packet to queue 50) and in a physical manner (write packet to memory location 10000). The main advantage of this approach is that the network data plane processor can access memory in a logical fashion, while the control plane processor can access memory in both a logical and physical manner. This saves the network processor from worrying about the physical intricacies of managing memory.

The memory access protocol decreases the memory bandwidth requirements between a processor and the input/output processor. For example, instructions that offload tasks from the main processor to the input/output processor, such as the 'add_value_to_counter( )' instruction, decreases the memory bandwidth requirement by a factor of two. The memory bandwidth reduction occurs since the memory access protocol eliminates the need for two memory access (a read of a counter from memory followed by a write back of the counter to memory). Similarly when a route lookup function is offloaded to the input/output processor, the memory bandwidth requirement between the main processor and the input/output processor can decrease by as much as six times assuming that six memory operations were needed to perform the standard route lookup. These memory bandwidth reductions are possible because the memory accesses occur between the input/output processor and the memories such that the main processor does not see these memory accesses.

The memory access protocol may allow for 'channelized' access between the main processor and the input/output processor. Channelized access allows multiple processor threads to separately address the input/output processor. The memory access protocol may comprise a streaming command/result interface. A streaming command/result interface allows multiple memory offload commands to be bunched together and sent to the input/output processor.

An example set of instructions from one implementation of memory access protocol is provided as follows:

ECC Commands

1. Set_ECC (Boolean_Flag)
   Notes: Specifies whether ECC should be enabled or not for each access to memory.
2. ECC_Notification( )
   Notes: A call-hack function that allows the input/output processor to inform the main processor about ECC errors.

Raw Memory Access

This set of commands allow for raw read/write commands performed on the specified physical addresses. By implementing raw addresses with the memory access protocol, a network device may be implemented without any other memory subsystem.

3. Read_Address (Address, Width)
   Address=Memory address
   Width=Width of data value at specified memory address. One implementation could enforce it as either 32 bits or 64 bits.
   Notes: Read data from memory. This command may be used instead of 'Read_Address_Range( )' command.
4. Write_Address (Address, Width, Value)
   Address=Memory address to write to.
   Width=Width of data value at specified memory address.
   Value=Value to be written.
   Notes: Write data to a specified memory location.
5. Read_Address_Range (Address, Width, Count)
   Address=Starting memory address to read from.
   Width=Width of data values starting at specified memory address.
   Count=Number of data values to read.
   Notes: Read a range of addresses starting from "Address" and ending at "Address+Count". This feature is useful for reporting. The actual number of bits which come out on the wire is width*count
6. Write_Address_Range (Address, Width, Count, Value)
   Address=Starting memory address to written on.
   Width=Width of data values starting at specified memory address.
   Count=Number of data values to written.
   Value=Value to be written.
   Notes: Write a specific value to a range of addresses starting from "Address" and ending at "Address+Count". This feature is useful for updating memory locations in route tables.
7. Memcopy_Address_Range (Address-Source, Width, Address-Destination, Count)
   Address-Source=Starting memory address to read from.

Width=Width of data values starting at specified memory source address.

Address-Destination=Starting memory address to write data.

Count=Number of data values to copy.

Notes: Copy memory locations in the range, "Address-Source to Address-Source +Count" to "Address-Destination to Address-Destination+Count".

Smart Memory Commands

This set of commands provides more sophisticated operations on values stored in memory. The commands are performed on physical addresses.

8. Increment_location (Address, Width)
   Address=Memory address of value to modify
   Width=Width of value at specified memory address
   Notes: Increment data at specified address in external memory.
9. Add_to_location (Address, Width, Value)
   Address=Memory address of value to modify
   Width=Width of value at specified memory address.
   Value=Value to be added.
   Notes: Add a value to data at specified address in external memory.
10. Decrement_location (Address, Width)
   Address=Memory address of value to modify
   Width=Width of value at specified memory address.
   Notes: Decrement data at specified address in external memory.
11. Subtract_Address (Address, Width, Value)
   Address=Memory address of value to modify
   Width=Width of value at specified memory address.
   Value=Value to be subtracted.
   Notes: Subtract a value from data at specified address in external memory.

Zone Allocator Operations

These commands allow the main processor request the input/output processor to create linked lists. Linked lists are common data structures that are used for a variety of operations on the data plane such as for maintaining free lists, calendar queues, queue linked lists, etc.

12. Zinit (Start_Address, Zone_Size, Count, Return: Zone_ID)
   Start_Address=Starting address of the linked list zone.
   Zone_Size=Size of the blocks in linked list zone.
   Count=Number of blocks allocated.
   Zone_ID=The returned zone identifier.
   Notes: This tells the input/output processor to allocate a zone. A zone is an area of memory on which a linked list is internally created. The linked list has a block of size "Zone_Size", of which a partial part is used to create pointers to the next element in the linked list.
13. Zalloc (Zone_ID, Return: Address)
   Zone_ID=The zone identifier
   Address=The starting address of the zone.
   Notes: Returns the starting address.
14. Zfree (Zone_ID, Address)
   Zone_ID=The zone identifier
   Notes: Frees the identified zone.

Synchronization Operations

These commands allow the main processor to perform atomic operations that are necessary for the implementation of semaphores and other process communication features.

15. Atomic_Test_and_Set_location (Address, Width, Value-Set, Return: Value-Previous)
   Address=Memory address of value to test & set.
   Width=Width of value at specified memory address.
   Value-Set=Value to be stored at the memory address.
   Value-Previous=Value originally stored at the memory address.
   Notes: Atomically test the value at the specified address and check that the value is zero. If it is zero, then the given value is written. If it is not zero, no write is performed. In both cases the original value from the specified memory address is returned.
16. Atomic_Memory_Exchange (Address, Width, Value)
   Address=Memory address of value to test & set.
   Width=Width of value at specified memory address.
   Value=Value to be stored at the memory address and returned with original value from that memory address.
   Notes: Returns the original value stored at the Address and writes the specified Value to the Address.

The main function of the memory interface protocol is to be able to support logical memory operations for various networking data plane applications. A memory access protocol can be used to support all data plane applications such as packet buffering, route lookups, MPLS lookups, statistics counters, policing, etc. This document specifies two very common data path applications—Statistics Counters and Packet Buffering.

Statistics Counters

Statistics counter operations mainly used during at initialization:

17. Alloc_Static_Counter_Group (Group_ID, Start_Counter_Number, Count, Initial_Value_for_Static_Counter)
   Group_ID=Specifies an identifier of the counter group.
   Start_Counter_Number=The number that identifies the first counter in the counter group.
   Count=Number of counters to create.
   Initial_Value_for_Static_Counter=Initial Counter value.
   Notes: Initialize "Count" counters for a specific Group_ID. NEMO will set all the counters for this group to the initial value mentioned. Each of the counters of this group can be referred to by a Counter_ID, which is logbase_2 (Group_ID)+logbase_2 (Count) bits long. The upper bits refer to the group ID.
18. Alloc_Dynamic_Part_Of_Counter_Group (Group_ID, Start_Counter_Number, Count, Initial_Value_for_Dynamic_Counter)
   Group_ID=Specifies an identifier of the counter group.
   Start_Counter_Number=The number that identifies the first counter in the counter group.
   Count=Number of counters to create.
   Initial_Value_for_Dynamic_Counter=Initial value of the Counter.
   Notes: This command will initialize counters as before, but it will also create a dynamic linked list for the counters. This allows the counters to be used as necessary.

Statistics counter operations mainly used during Run Time Control:

19. Alloc_counter (Group_ID, Return: Counter_ID)
   Group_ID=Specifies an identifier of the counter group.
   Counter_ID=Returned Counter identifier value. This can simply be the address of the counter.
   Notes: If the counters are all allocated statically and in advance, then the alloc_counter( ) is never invoked. If counters are dynamically assigned then the alloc_counter( ) command is called.
20. Free Counter (Counter_ID)
   Counter_ID=Counter identifier value.
   Notes: This instruction flushes the identified counter back into the free pool.

21. Read Counter (Counter_ID)
    Counter_ID=Counter identifier value.
    Notes: This reads the value of the identified counter
22. Read_Counter_Range (Counter_ID, Count)
    Counter_ID=The first counter identifier value.
    Count=The number of counters to read.
    Notes: This reads all the identified counters from Counter_ID to "Counter_ID+Count"

Statistics counter operations for application usage:

23. Add Counter (Counter_ID, Value)
    Counter_ID=Counter identifier.
    Value=Value to add to the identified counter.
    Notes: This adds the "value" to the current value of the identified counter.
24. Increment Counter (Counter_ID)
    Counter_ID=Counter identifier.
    Notes: This is a special case of "Add Counter" which add one to the identified counter
25. Subtract Counter (Counter_ID, Value)
    Counter_ID=Counter identifier.
    Value=Value to subtract from the identified counter.
    Notes: This subtracts the "value" from the current value of the identified counter.
26. Decrement Counter (Counter_ID)
    Counter_ID=Counter identifier.
    Notes: This is a special case of "Subtract Counter" which decreases the current value of the identified counter by one.
27. Set Counter (Counter_ID, Value)
    Counter_ID=Counter identifier.
    Value=A valid counter value
    Notes: Sets the identified counter to the "value".
28. Clear Counter (Counter_ID)
    Counter_ID=Counter identifier value.
    Notes: Sets the identified counter to zero.

FIFO Queue Buffering

29. Write_queue($Q_{to}$, D)
    $Q_{to}$=The queue identifier.
    D=Variable length (packet) or fixed length (cell) data element to write to the identified FIFO queue.
    Notes: Writes a packet or cell to the tail of a queue ($Q_{to}$).
30. Read_queue($Q_{from}$, ReadType, return: Response)
    $Q_{from}$=The queue identifier.
    Read Type=Destructive or non destructive read
    Response=The returned data read from the FIFO queue.
    Notes: Reads a packet or cell from the head of a queue ($Q_{from}$)

Input/Output Methods Used by Input/Output Processor in a Network Device

Referring to FIG. 3A, the input/output Processor uses a number of different modules implementing novel input/output methods to solve the difficult memory and input/output problems. Each of the input/output methods used is dedicated to streamline a particular type of memory access pattern in a networking application. All the input/output methods have the same design philosophy—the input/output methods use slow-speed memory (such as DRAMs), the input/output methods have some specific methods to operate with the slow-speed memory, and the input/output methods use some high-speed memory to either cache or manage memory access.

To create the various input/output methods for an input/output processor, each of the input/output and memory problems commonly encountered have been carefully analyzed mathematically and the associated input/output module is designed so as to give guaranteed wire-speed performance regardless of the traffic pattern of data packets on the network. Specifically the input/output processor guarantees wire-speed performance irrespective of the characteristics of the data packet destinations, the bursty or smooth nature of traffic, the size of the data packets that arrive, or any other variable aspect of the network traffic. In fact, the input/output processor can even handle adversarial traffic patterns that present the worst case scenarios. An example of input/output methods than may be implemented in an input/output processor 350 is presented in Table 3 that follows.

TABLE 3

Input/Output Methods Used by the I/O Processor

| I/O and Memory Access Type | Input/Output Method | Mathematical Analysis |
|---|---|---|
| Predominantly Reads, Few Writes | Load Balancing, Memory Partitioning | Search and Partitioning Methods |
| Writes and Reads for FIFO queues | Wide Memory Access, Deterministic Caching | Difference Equations, Adversarial Analysis |
| Unpredictable combination of Reads and Writes | Temporal Caching, Spatial Caching, Pre-fetching, Interleaving | Pigeonhole Principle, Difference Equations |
| Read, Modify and Write Counter | Temporal Caching | Lyapunov or Potential Functions, Adversarial Analysis |
| Read-Modify-Write | Memory Interleaving, 110 Pipelining, Partial Caching | Pigeonhole Principle, Constraint Sets |
| Bulk or Predictable Reads/Writes | None Needed | None Needed |
| Blind Writes | Memory Partitioning, I/O Re-mapping | None Needed |
| Scheduler | Constraint Sets | Pigeonhole Principle, Constraint Sets |

As set forth in Table 3, the eight memory access patterns commonly encountered within network router devices presented in Table 2 have been addressed by specialized methods for handling those memory access patterns as necessary. Not all of the eight different memory access patterns from Table 2 are directly addressed in Table 3 with specialized memory access methods since some of the memory access patterns can be handled adequately with the existing memory technology and methods.

Table Look-Ups performed by the Input/Output Processor

The first type of memory access pattern for network router devices listed in Table 3 is the pattern of predominantly memory reads (with only a few writes to memory) caused by table look-ups. This memory access pattern results in mainly memory read accesses to relatively static look-up tables that are stored memory. Occasional look-up table updates in the form of memory writes are relatively infrequent and can be handled with existing methods and memory technology.

Using well-known search and partitioning methods, accesses to the look-up tables may be load-balanced for high performance. Some of these methods include the use of high-speed memory to store some parts of the lookup table and specialized logic design to rapidly perform these table look-ups. Specifically, the memory used to store the look-up tables may be partitioned in such a manner than the look-ups can be performed with standard DRAM technology. Specifically, the look-up table data is partitioned in such a manner as to prevent memory bank conflicts from occurring. This may be implemented by creating redundant sets of look-up tables such that accesses to a redundant copy of a look-up table will be performed if accessing the original version of the look-up table that was recently accessed would cause a memory bank conflict to occur and thus incur a performance penalty.

Queue Writes Followed by Reads—Embodiment 1

The second type of memory access pattern for packet-switched network devices listed in Table 3 is the repeating pattern of a write to memory followed by a later corresponding read from memory that is caused by buffering data packets in First-In First-Out (FIFO) queues. Specifically, a packet-switched network device first receives a data packet on an incoming line and writes the received data packet into an appropriate FIFO queue memory buffer. Then later, the network device reads out the data packet from the FIFO queue memory buffer and then sends the data packet on toward its final destination. The preceding actions must be performed for multiple data packets arriving on different incoming lines, that will each be stored into one (or more) of multiple different FIFO packet queues, and finally sent out on one (or more) of multiple different output lines. Obviously, the buffering incoming data packets in FIFO queues is a core function of packet-switched network devices. Thus, a great amount of research has been performed in order to determine how data packet buffering can be performed with efficient memory usage.

The input/output processor of the present invention implements wide memory access and deterministic caching in order to optimize the buffering of data packets in FIFO queues such that conventional DRAMs may be used for data packet buffering even at high speeds. Referring to FIG. 3, the input/output processor implements these techniques within a packet buffering module 353 to handle all the buffering of data packets into FIFO queues for the network processor 310. The packet buffering module 353 generally operates by storing the frequently read-from head and the frequently written-to tail of a typical packet buffer FIFO queue in the local high-speed memory 360. The packet buffering module 353 stores the remainder of the packet buffer FIFO (the portion between the tail and the head) in the attached DRAM memory subsystem 370. Details on the implementation of one set of packet buffering methods that may be used can be found in paper entitled "Designing Packet Buffers for Router Linecards" by Sundar Iyer, Ramana Rao Kompella and Nick McKeown that is hereby incorporated by reference in its entirety.

One of the facets of this method is that the memory latency between the network processor and the input/output processor can be made user-programmable. Having user-programmable memory latency is very useful for system designers who can set the latency of access of memory (via the input/output processors) to any desired value so as to maximize their overall system throughput and optimize the memory for their specific designs. The packet buffering module 353 will modify its high-speed memory requirements according to the memory latency set by the designer.

As set forth above, a typical packet-switched network device must be able to handle multiple different FIFO queues. To handle the multiple different FIFO queues with slow-speed memory, the paper "Designing Packet Buffers for Router Line Cards" describes a method that requires the queue with the largest deficit of data in high-speed memory to be handled first. Specifically, the FIFO queue that has the greatest need to have its head in high-speed memory supplemented with more packets from slow-speed memory should be updated first. This method is often referred to as the Maximum Deficit Queue First (MDQF) method.

A main problem with the MDQF method is that it requires that the FIFO queue with the maximum deficit be calculated. To perform this calculation, a priority queue structure needs to be maintained which can calculate the maximum from amongst Q different FIFO queues. While it is possible to implement this for a limited number of FIFO queues, this method becomes impractical or even infeasible for large numbers of FIFO queues.

To improve upon the MDQF method, a new method described below allows a designer to limit the number of FIFO queues ($Q_{max}$) from which the FIFO queue with the maximum deficit can be calculated. By limiting the number of FIFO queues in the MDQF calculation, a very large number of FIFO queues can be handled. One implementation of the method is referred to as the "dual threshold" method since it operates using two deficit threshold values that demark three different levels of refresh priority for different FIFO queues. Specifically, the FIFO queues are divided into a first group with FIFO queues that are not candidates for refreshing, a second group with FIFO queue candidates for refreshing, and a third group with high-priority FIFO queues in urgent need of refreshing A first threshold named the lower deficit threshold ($T_{low}$, =b) is used to determine when a particular FIFO queue is a possible candidate for refreshing. Any FIFO queue with a deficit greater than the lower threshold value ($T_{low}$) is inserted into a candidate FIFO data structure as a FIFO queue that is a candidate to be replenished from the slow-speed memory. In general, the FIFO queue will be added to the tail of the candidate FIFO data structure.

A second threshold named the high deficit threshold ($T_{high}$=T) is used to determine when a FIFO queue has a great need for refreshing. Both the lower deficit threshold value ($T_{low}$) and the high deficit threshold value ($T_{high}$) may be programmable by the user. Whenever a the deficit of a FIFO queue rises above the high deficit threshold ($T_{high}$) then that FIFO queue is inserted into a priority queue structure that is first examined to select a FIFO queue for replenishment from slow-speed memory. The priority queue structure simply maintains a set of FIFO queues in sorted order wherein the sorting is based upon the size of the FIFO queue's deficit. The FIFO queue with the largest deficit will be first in the priority queue structure.

When the method needs to select a FIFO queue for replenished from slow-speed memory (such as DRAM), the method first gives priority to the FIFO queues that are in the "priority queue" structure. These FIFO queues have a deficit value greater than the high deficit threshold ($T_{high}$) such that these FIFO queues have a great need for replenishment. The first FIFO queue in the priority queue structure (the one with the greatest deficit) is selected for refreshment.

If there are no outstanding FIFO queues in the priority queue structure, then the method selects a FIFO queue from the candidate FIFO data structure and replenishes that selected FIFO queue. The selected FIFO queue from the candidate FIFO data structure may be selected arbitrarily but will generally be the FIFO queue at the head the candidate FIFO data structure.

It is easy to see that the dual threshold based algorithm is very similar to the MDQF algorithm when $T_{high}$=0 since all of the FIFO queues will be placed in the priority queue structure. Thus, if $T_{high}$=0 then for the MDQF algorithm, the priority queue structure will need to be able to find the maximum from amongst all Q of the FIFO queues in the priority structure. When $T_{high}\neq 0$, then thee dual threshold algorithm reduces the number of queues that need to be maintained in the priority queue structure. The analysis of this dual-threshold method is described here in short.

The dual-threshold method limits the number of FIFO queues in the priority queue structure such that the task of maintaining the priority queue structure is simplified. The low threshold ($T_{low}$=b) ensures that if there is a FIFO queue that has a deficit of b or more then some queue will always be serviced (either one from the candidate FIFO data structure or one from the priority queue structure). Hence the maximum sum of the deficits amongst all the Q FIFO queues is Q(b−1). This means that the maximum number of FIFO queues which can appear in the priority queue structure is $Q(b-1)/T_{high}$.

The dual-threshold method also limits the amount of a high-speed memory needed for the packet buffering method. For any FIFO queue, once the FIFO queue's deficit has exceeded the high deficit threshold $T_{high}$ then that particular FIFO queue will be added to the priority queue structure. The growth of the deficit value of a FIFO queue in the priority queue structure is limited to $b(2+\ln Q_{max})$, where $Q_{max}$ is the maximum number of queues that are allowed in the priority queue structure. However, it is known that $Q_{max}<=Q(b-1)/T_{high}$ as described above. Hence the maximum deficit is bounded by $T_{high}+Q(b-1)/T_{high}$. This value specifies a limit to the size of the high-speed memory required for each FIFO queue.

Queue Writes Followed by Reads—Embodiment 2

An alternative packet buffering module 353 for providing high-speed packet buffering services may be constructed using DRAMs memory devices that provide a fast read-out. The alternative packet buffering module 353 takes advantage of the time required to output packet onto an outgoing communication line.

One difficulty in using conventional DRAMs for high-speed packet buffering is the latency period ($T_{RC}$) between consecutive access to the same memory bank. When a network processor issues a read request to a conventional DRAM device, a significant amount of time (in the scale of high-speed communications) may pass before a response is received if there was a recent access to the same memory bank. That latency period may result in network processing missing the slot allocated for a packet.

Although the latency period for a read request to a conventional DRAM may be relatively long, the interface to a DRAM memory can be made very wide such that the effective memory bandwidth is very large. If the interface is wide enough, the effective bandwidth of the DRAM interface can easily handle full wire-speed transfers. Specifically, if the DRAM memory interface is wide enough such that the network processor cannot fully consume the contents of a single wide read faster than the latency period ($T_{RC}$) of the DRAM based memory system, then the DRAM can provide packet data to the network processor on a sustainable basis. This performed by simply having the packet buffering module issue repealed read requests to the DRAM to obtain the packet data.

Furthermore, certain newer DRAM technologies provide for a high-speed continued throughput once the initial latency period has elapsed. Thus, a long series of successive memory locations can be read at a high rate after the initial latency period.

The alternative packet buffering system takes advantage of these properties of DRAM devices and implements a simple hybrid memory system. The hybrid memory system simply stores a first set of bytes from the packet in high-speed memory 360. The hybrid memory system stores remainder of the packet in the slow-speed memory system 370. The combination of a small amount of high-speed memory, a larger slow-speed memory, and a wide interface on the slow-speed memory will allow the hybrid memory system to retrieve packets in a sustainable manner.

Two different embodiments of the hybrid memory system are presented in this section. A first hybrid memory system ensures that there is low latency and high-throughput access to the stored packets. The second hybrid memory system does not guarantee a low latency but ensures a sustainable high-throughput access to the stored packets.

In the first embodiment, the hybrid memory system stores the first N bytes of each packet in high-speed memory 360. (If there are less than N bytes in the packet then the hybrid memory stores the entire packet in the high-speed memory and pads the remaining bytes with nulls.) After storing the first N bytes, the hybrid memory system then stores the remainder of the packet in blocks of N bytes in the slow-speed memory system 370. For example, with an N value of 150 bytes, the following table lists how various different sized data packets would be divided between the two different memory systems:

| Packet Size | Amount stored in high-speed memory | Amount stored in slow-speed memory |
|---|---|---|
| 0 to 150 bytes | 0 to 150 bytes | 0 bytes |
| 151 to 300 bytes | 150 bytes | 150 bytes (padded) |
| More than 300 bytes | 150 bytes | Multiples of 150 bytes with last block padded |

When the network processor 310 requests a packet from this first hybrid memory embodiment, the hybrid memory system issues a memory request to both the high-speed memory 360 containing the first N bytes of the packet and the slow-speed memory 370 containing the remaining bytes of the packet. Obviously, the high-speed memory 360 will respond to its memory request first. Upon receiving the first N bytes of the packet, the alternative packet buffering system can provide the first N bytes of the packet to the network processor 310 immediately.

Before the network processor has fully consumed the first N bytes of the packet, the slow-speed memory system 370 will respond with the next N bytes of the packet. When the network processor fully consumes the first N bytes of the packet, the alternative packet buffering system may then begin supplying the next N bytes of the packet that were received from the slow-speed memory system 370. Simultaneously, the alternative packet buffering system issues another memory request to the slow-speed memory system 370 for the next N bytes of the packet. The alternative packet buffering system will then repeat the steps of supplying data packets to the network processor and issuing memory requests until the entire packet has been supplied to the network processor 310.

The number of bytes N that must be stored in the high-speed memory and the width of the memory interface are dependent on the response time of the DRAM ($T_{RC}$) and the communication line rate R that must be supported. Specifically, the number of bytes N that must be buffered in the high-speed memory 360 may be calculated using the equation $N=2*R*T_{RC}$. Note that twice the line rate is required since both a read and a write must occur for every packet. In a system with a ten Gigabit/second line rate (R=10 Gb/s) and a sixty nanosecond response time DRAM memory device ($T_{RC}$=60 ns), the high-speed memory will need to buffer N bytes where N=2*10 Gigabits/second*60 nanoseconds=1200 bits or 150 bytes.

In the second embodiment, the hybrid memory system first identifies the byte location closest to the beginning of the packet wherein the remaining bytes of the packet form even multiples of the N bytes each (if the packet is more than N bytes). The hybrid memory system then stores the beginning of the packet up to identified location in high-speed memory 360. (If the packet is less than N bytes then the entire packet is stored in high-speed memory.) The remainder of the packet (if the packet was more than N bytes) is made up of an even multiple of N bytes. The hybrid memory system stores those remaining packet bytes as blocks of N bytes in the slow-speed memory system 370. For example, with an N value of 150 bytes, the following table lists how various different sized data packets would be divided between the two different memory systems:

| Packet Size | Amount stored in high-speed memory | Amount stored in slow-speed memory |
|---|---|---|
| 0 to 150 bytes | 0 to 150 bytes | 0 bytes |
| 151 to 300 bytes | 0 to 150 bytes | 150 bytes |
| More than 300 bytes | 0 to 150 bytes | Multiples of 150 bytes |

When the network processor 310 requests a data packet from the second embodiment of the hybrid memory system, the second hybrid memory system issues a memory request to both the high-speed memory 360 and the slow-speed memory 370. The high-speed memory 360 will respond to its memory request first such that the initial bytes from the packet may be returned to the network processor.

After the latency period, the first N byte block will be returned from the slow-speed memory 370. The alternative packet buffering system may supply this first next N byte block of the packet to the network processor 310. Simultaneously, the alternative packet buffering system issues another memory request to the slow-speed memory system 370 for the next N byte block of the packet. The alternative packet buffering system will then repeat the same steps from the first embodiment to complete the response. Specifically, the system will repeat the steps of supplying data packets to the network processor and issuing memory requests to the slow-speed memory system 370 until the entire packet has been supplied to the network processor.

This second hybrid memory system embodiment does not always respond within the low-latency period offered by the high-speed memory system. However, this second embodiment uses less high-speed memory that the first hybrid memory system embodiment.

Both hybrid memory system embodiments of this alternative packet buffering system presents some advantages over the packet buffer system described in the previous section. For example, this alternative packet buffering system significantly reduced the number of pointers that must be maintained by the alternative packet buffering system. Furthermore, the handling of multi-casting is greatly simplified since pointers can be used to point to the same packet in memory. In the system described in the earlier section, each instance of a multicast packet would need to be placed into each queue in order to guarantee that the packet would be available when necessary.

Packet buffering comprises a core function of packet-switched network devices. Thus, a large amount of time has been spent refining and optimizing the techniques for packet buffering. A number of additional techniques for implementing packet-buffering will be provided in a later section of this document that is dedicated to the task of packet buffering.

Memory Management Performed by the I/O Processor

The third type of memory access pattern occurring in network router devices listed in Table 3 is the pattern of unpredictable memory reads and memory writes associated with memory management. Operating systems typically handle memory systems (such as DRAM-based memory systems) with associated "free memory lists." Free memory lists generally comprise a linked list of all the free (available for usage) memory locations in the memory system. The memory access patterns for linked lists have the property that memory writes are always to the tail of a linked list and memory reads are always from the head of the linked list. Thus, the elements in a linked list are always maintained as First-In First-Out (FIFO) queues.

Depending on the operating system or a dedicated computer system's application, other types of linked lists may also be maintained. As described in the previous section, packet-switched network devices such as network routers that perform packet buffering generally maintain multiple First-In First-Out (FIFO) queues for buffering the data packets that are being routed. Thus, the techniques in the previous section for handling FIFO queues may also be applied handling the linked-lists used to implement free memory lists.

Referring to FIG. 3A, the memory management functions to handle free memory list are provided by the memory management module 355 in the input/output processor 350 on behalf of the network processor 310. Since the free memory lists are essentially FIFO queues, details on how the input/output processor may provide memory management methods can be found in paper entitled "Designing Packet Buffers for Router Linecards" by Sundar Iyer, Ramana Rao Kompella and Nick McKeown that is hereby incorporated by reference in its entirety.

The linked list elements generally have some entry value and a "next pointer" that points to the next element in the FIFO queue. A problem with linked lists is that if an element X at the tail of the FIFO queue is written to slow-speed memory (such as DRAM) and then an entry value arrives later to be added to the tail of the FIFO queue as element X+1, then one must make sure that previous element X (now in slow-speed memory) points to the newly created element X+1. However, this may be difficult because element X has already been written to the slow-speed memory such that element X cannot easily be modified once again in a quick manner.

This problem may be solved with memory "pre-allocation". With memory pre-allocation, the locations in memory for the next FIFO queue element for every FIFO queue are allocated before the next entry value for that element is known. That pre-allocated FIFO queue element is pointed to with a pointer known as "next pointer." In this manner, whenever the tail element of a FIFO is written to slow-speed memory (such as DRAM), then the next pointer is used to write that tail element to that pre-allocated element location along with a new next pointer that points another newly allocated element. Thus, when a new entry value arrives to the tail of a linked list then a new element location is allocated in slow-speed memory and the new entry value is written to earlier allocated element along with pointer to the new element location that was just allocated. In this manner, the previous tail element in slow-speed memory does not need to be modified when the next new element is filled.

An alternate approach that does not use pre-allocation can be performed by keeping the tail element in high-speed memory system such as SRAM. In the alternate approach the systems waits for FIFO queue element X+1 to arrive, before element X is written to the slow-speed memory (such as DRAM). This has the effect that the width of memory access to the slow-speed memory remains the same as before, but the amount of high-speed memory needs to increase so as to allow for the additional element X+1 to be fully buffered in high-speed memory before element X can be moved from high-speed memory to slow-speed memory. From an analysis perspective, assume that "b" was the width used to write to slow-speed memory from any given linked list (as defined in the paper, "Designing Packet Buffers for Router Line Cards"). Let b be defined in units of the size of an element of a linked list. Then when calculating the size of the required high-speed memory (such as SRAM) as set forth in that paper, the value b will be replaced by b+1. This allows the high-speed memory to account for the additional linked list element that must be fully buffered in high-speed memory before the system may begin writing linked list elements to slow-speed memory.

Thus, in order to manage any type of linked list using slow-speed memory, one may use the same techniques described in the previous section on "Queue Writes Followed by Reads" as long one of the modifications set forth in the previous two paragraphs is implemented. Specifically, the system must pre-allocate memory for the next linked list element before that next linked list element before that element is filled or the amount of high-speed cache memory must be increased to fully buffer an entry value for the next linked list element before writing the previous linked list element to slow-speed memory.

A number of modifications and minor optimizations can be added to this scheme for handling linked lists. For example, while maintaining free lists (one type of linked list usage), it is a common technique to use the element location freed due to a "read from head" operation for the next incoming "write to tail" operation.

Statistic Counter Reads, Modifies, and Writes—Embodiment 1

The fourth network router memory access type listed in Table 3 is access to statistic counters. Packet-switched network devices maintain a number of different network traffic statistics. Packet-switched network devices maintain traffic statistics for the purposes of firewall service (especially state-based firewall service), intrusion detection, performance monitoring (e.g. RMON), network tracing, load balancing, network traffic engineering (e.g. policing and shaping), and a number of other different reasons. In addition, most packet-switched network devices also maintain statistic counters that facilitate network management. The input/output processor 350 optimizes the maintenance of common statistics in a statistics counter module 351 such that the input/output processor 350 can handle almost any statistics counter need by the network processor 310.

The general flow of statistics maintenance in a packet-switched network device can be characterized as follows: When a packet arrives, the data packet is first classified to determine what actions will be performed on that data packet. For example, the network device must determine whether the data packet should be accepted or dropped, whether the data packet should receive expedited service or not, and so on. Depending on the action selected by the network device, some statistics counters are updated.

Note that the type of statistic maintained is a simple integer counter that is used to count events. For example, the number of fragmented packets, the number of dropped packets, the total number of received packets, and the total number of bytes forwarded along with many other important network statistics are merely simple integer counters that are frequently incremented or decremented. The most commonly occurring counter operation involves reading the value of a counter from memory, updating (usually incrementing) the value of the counter, and then writing the counter value back to memory location associated with the counter value.

On a far less frequent basis, the value of a particular counter may be read out for analysis or reset back to a base value. Since these read-out or reset accesses occur on such a relatively infrequent basis, these accesses can generally be ignored for memory bandwidth planning purposes.

A high-bandwidth network device needs to maintain a very large number of different counters. For example, a packet-switch network router may maintain a routing table containing a count of how many times each prefix is used or a count of the number of data packets that use a particular TCP connection. Both of those specific examples require several hundreds of thousands, or even millions of counters to be maintained simultaneously in the network router, making it impractical (or at least very costly) to store them in SRAM. Instead, the network router must store those large numbers of counters in relatively slow off-chip DRAM.

In must be emphasized that the updates to the statistic counters in packet-switched network devices may occur on an extremely frequent basis. For example, in a high-speed packet-switched network device application, multiple different statistic counters may updated upon the arrival of each new data packet. Too keep up with the network traffic, these read-modify-write statistic counter operations must be conducted at the same rate as data packets arrive.

If each statistic counter is M bits wide, then a typical counter update operation is as follows:

1) Read the M-bit wide value stored from the counter memory,
2) Increment the value, and then
3) Write the updated M-bit wide value back to the counter memory.

If data packets arrive at a network device at a rate of R Gb/s, the minimum packet size is P bits, and a number C of statistics counters must be updated upon the arrival of each data packet, then the statistics counter memory may need to be accessed (either read or written) every P/2CR nanoseconds. For example, with minimum sized forty-byte TCP packets arriving on a 10 Gb/s link wherein each packet arrival triggers two counter updates then the statistics counter memory needs to be accessed every (40 bytes)/(2*2 Counters*10 Gb/sec)=8 nanoseconds. An eight nanosecond memory access rate is approximately eight times faster than the random-access speed of commercial DRAM memory devices available today. Thus, the techniques for reading and writing statistics counters must be streamlined in order to handle statistics counters in modem high-speed packet-switched data network devices.

It is a strict requirement that the statistic counters maintained by the network device be correctly updated every time a new data packet arrives. Thus, if statistic counter update operations are performed every time a data packet arrives and C different counters of bit width of M are updated per arriving data packet, then the minimum bandwidth required on the memory interface used for accessing the statistic counters memory would be at least 2RMC/P. Such a high memory bandwidth requirement becomes quite unmanageable as the number of counters C increase, the bit width M of each counter increases, and/or the network line rates R increase.

To reduce the memory bandwidth requirements for statistics counters, the present invention introduces a method wherein the system may use conventional slow-speed memory (such as DRAM) to maintain full-sized but only periodically updated counter values and a smaller amount of high-speed to maintain an associated set of small recent counter updates that have not yet been reflected in the full-sized counter value stored in slow-speed memory. Typically, the high-speed memory would be implemented with SRAM memory technology. However, other high-availability memory technologies may also be used.

Figure 3B:
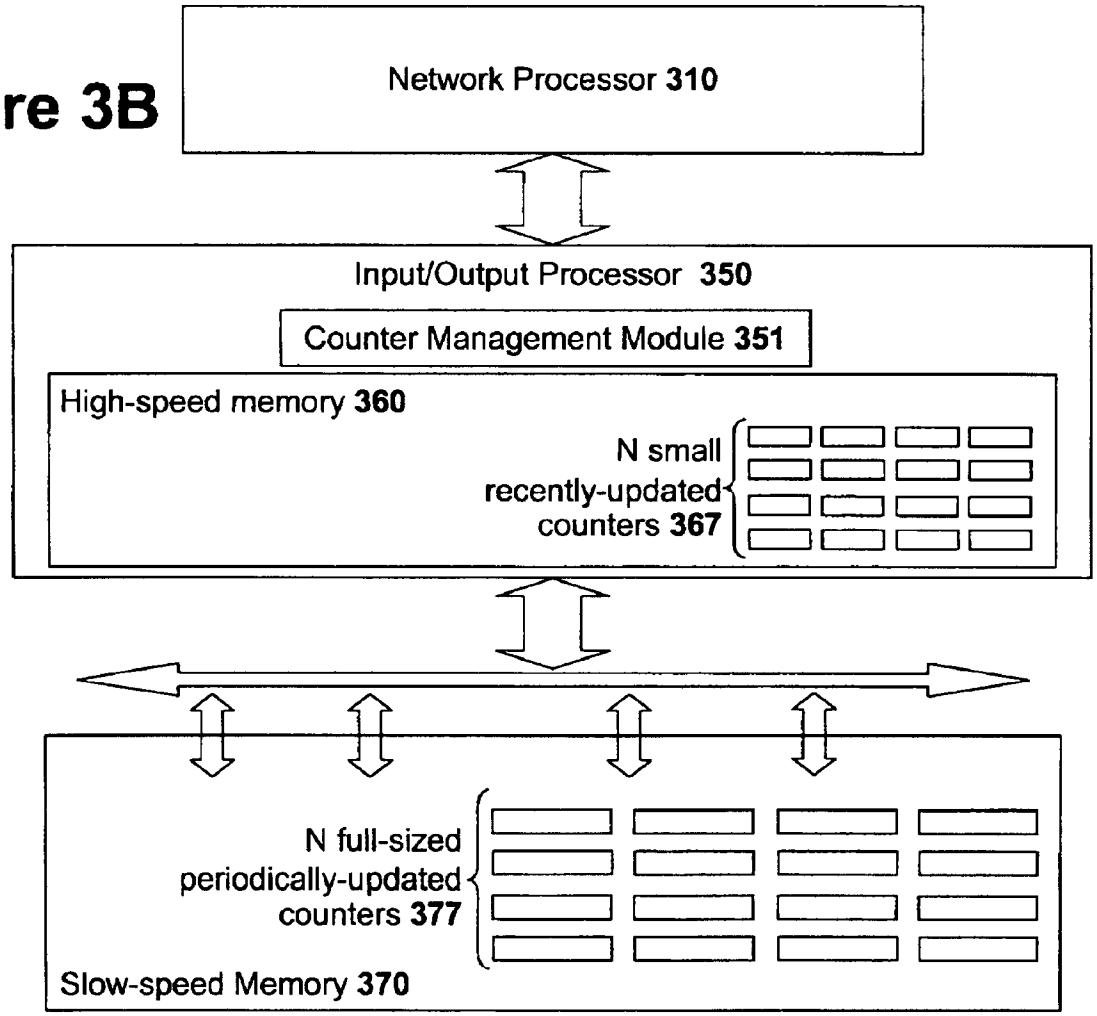
FIG. 3B illustrates a block diagram of an input/output processor with a counter management module for efficiently handling a very large number of frequently accessed counters.

FIG. 3B illustrates a block diagram of such a system constructed within the context of the input/output processor 350 of the present invention. In the example system of FIG. 3B, provision is made for handling N high-speed counters of where each counter has a bit width of M. Referring to the example FIG. 3B, slow-speed memory 370 stores N full-sized periodically updated counters 377 of bit width M. High-speed memory 360 stores N small recently updated counters 367 of bit width m (wherein m<M). The m-bit recently update counters 367 in high-speed memory 360 keep track of counter updates that are not yet reflected in the periodically updated counters 377 stored in slow-speed memory 370. Note that at any time, the correct value of a specific counter can be obtained by adding the value of the corresponding recently update counter in high-speed memory 360 to the value in corresponding periodically updated counter in slow-speed memory 370.

Note that the N small recently updated counters 367 in high-speed memory only have a bit width of m such that those N small recently updated counters 367 could overflow. To prevent such an overflow, the counter management module 351 must periodically updated the full-sized (bit width M) periodically updated counters 377 by adding the associated values in the small recently updated counters 367. By updating the full-sized periodically updated counters 377 in slow-speed memory 370 only periodically, the memory bandwidth requirements for maintaining statistics counters in the slow-speed memory 370 is significantly reduced.

In order to construct the statistics counter system of FIG. 3B, the system should be able to handle any pattern of incoming data packets without having any counters overflow. Furthermore, this should be done with the least amount of high-speed memory since high-speed memory is expensive in terms of power usage, die area, and cost (if external high-speed memory is used). To implement such a system, one embodiment of the present invention uses a 'largest counter first' (LCF) counter management method in the counter management module 351. The largest counter first method always selects the recently updated counter in the set of N recently-updated counters 367 that has the largest absolute value to update its associated periodically updated counter in slow-speed memory 370 and reset the recent update counter to zero. (If multiple statistics counters have the same largest counter value then the largest counter first method may arbitrarily select one of those counters.)

Figure 3C:
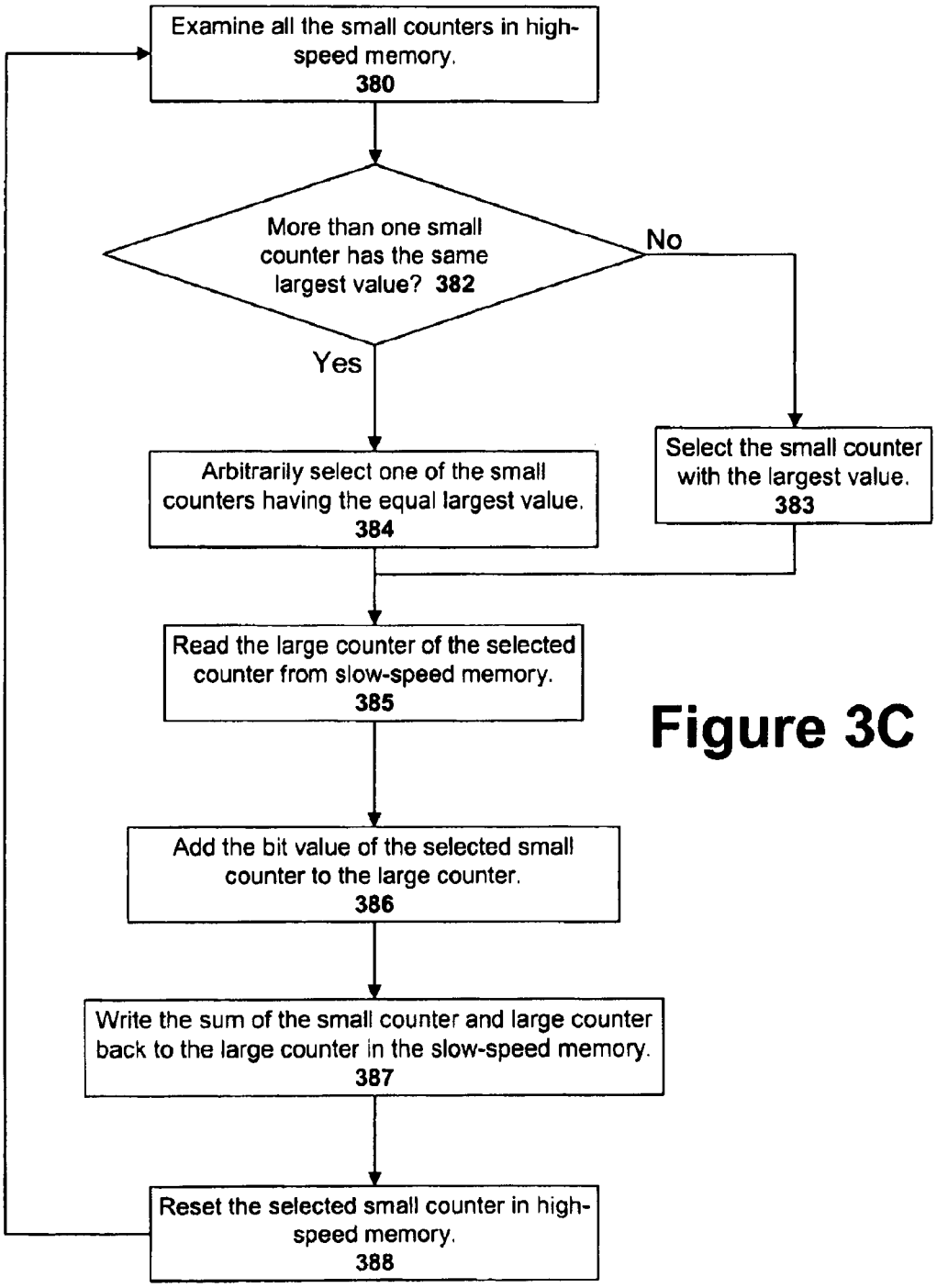
FIG. 3C illustrates a flow diagram of largest counter first (LCF) counter management method that efficiently uses both slow and fast memory to manage a large number of counters.

FIG. 3C illustrates a flow diagram that describes the operation of the largest counter first method. Referring to step 380 in FIG. 3C, the method first examines all the small counters in the high-speed memory. At step 382, the method determines if there are more than one counter with the same largest absolute value. If so, then the method arbitrarily selects on of those counters have the equal largest absolute value at step 384. Otherwise, the small counter value with the largest absolute value is selected in step 383. Then, the large counter associated with the selected small counter from high-speed is read from the slow-speed memory at step 385. Next, at step 386, the value of the selected small counter is added to the associated large counter value obtained in step 385. The sum of the small counter and larger counter are then written back to slow-speed memory at step 387. Finally, the selected small counter is reset to zero in the high-speed memory.

The largest counter first method of FIG. 3C requires the method to examine all the small counters and determine the counter with the largest absolute value. This method is very slow. Another method that may be used is a priority structure that maintains a priority structure containing the small counter values that are getting to have large absolute values. However, this method would become very cumbersome if a large number of counters are implemented since the priority structure itself could grow quite large such that maintaining it could become difficult. To improve the method of FIG. 3C, a dual threshold method is proposed for replacing steps 380 and 382 in order to determine the small counter in high-speed memory that contains the largest absolute value.

The dual threshold method allows the architect to choose the maximum number of counters ($C_{max}$) for which the counter with the maximum absolute value can be calculated. There are three key ideas of the generalized algorithm.

1. First, the dual threshold method maintains a lower threshold ($T_{low}$=1) for the small counters. Any small counter with an absolute value above the low threshold is inserted into a FIFO data structure and is a candidate to have its associated large counter in slow-speed memory updated.
2. Second, the dual threshold method maintains a high threshold ($T_{high}$=T) for the small counters. This high threshold value is programmable by the user. Whenever a small counter reaches a value with an absolute value above the high threshold, then that small counter is inserted into a priority counter structure. The priority counter structure simply maintains the set of small counters that are added to it in sorted order according, where the sorting is based on the threshold.
3. And third, when a small counter must be selected in order to refresh its associated full-sized counter in slow-speed memory, priority is given to the small counters that are in the "priority counter" structure. If there are no outstanding small counters in the priority counter structure, then a small counter from the FIFO data structure is replenished.

It is easy to see that the dual threshold based algorithm is exactly similar to the priority counter structure only method itself when $T_{high}$=1. In such an arrangement, the updating method must search the entire priority counter structure to find the counter having largest absolute value. The dual threshold algorithm reduces the number of counters that need to be maintained in the priority counter structure.

The dual threshold method limits the number of counters in the priority counter structure. The smallest low threshold ($T_{low}$=1) ensures that if there is a small counter that has an absolute value of 1 or more then some counter will always be serviced. So in every b time slots, if some counter has a non-zero value then at least one counter will have its associated full-sized counter in slow-speed memory updated. Hence the maximum sum of the absolute value of all the counters amongst all the $C_{max}$ that may be considered is $C_{max}(b-1)$. This means that the maximum number of counters which can appear in the priority counter structure is $C_{max}(b-1)/T$.

The dual threshold method also hounds the size of high-speed memory needed to maintain the priority structure. For any small counter, once that small counter reaches the threshold $T_{high}$ then that small counter will be added to the sorted priority counter structure. The growth in a counter once the counter reaches the priority counter structure is ln(bC')/ln[b/(b−1).], where C' is the maximum number of counters in the priority counter structure. However, it is known that $C' <= C_{max}(b-1)/T_{high}$ as described above. Hence the maximum count is bounded by $MAX\text{-}COUNT \equiv T_{high} + \{\ln[b(b-1)C/T_{high}]/\ln[b/(b-1)]\}$. Thus, the size of the high-speed memory needed to maintain the priority structure is bounded by $\log_2$ (MAX-COUNT).

The largest counter first (LCF) method ensures that no counter will ever overflow and that the smallest amount of high-speed memory possible is allocated. Additional details about the largest counter first counter management method can be found in the paper entitled "Analysis of a Static Counter Architecture" by Devavrat Shah, Sundar Iyer, Balaji Prabhakar and Nick McKeown that is hereby incorporated by reference in its entirety. The additional teachings in the "Queue Writes Followed By Reads—Embodiment 1" section concerning the use of the dual threshold based algorithm may be applied to the dual threshold system used for counter updates as well.

Statistic Counter Reads, Modifies, and Writes—Embodiment 2

In some applications, a simpler counter management method may be employed. Specifically, if an application requires a number of counters that cannot be handled by conventional DRAM but does not need the sophisticated system set forth above may use an alternate system that increases DRAM efficiency by eliminating bank conflicts. However, this system does not obtain the greatly increased memory bandwidth achieved by the system present above.

Figure 3D:
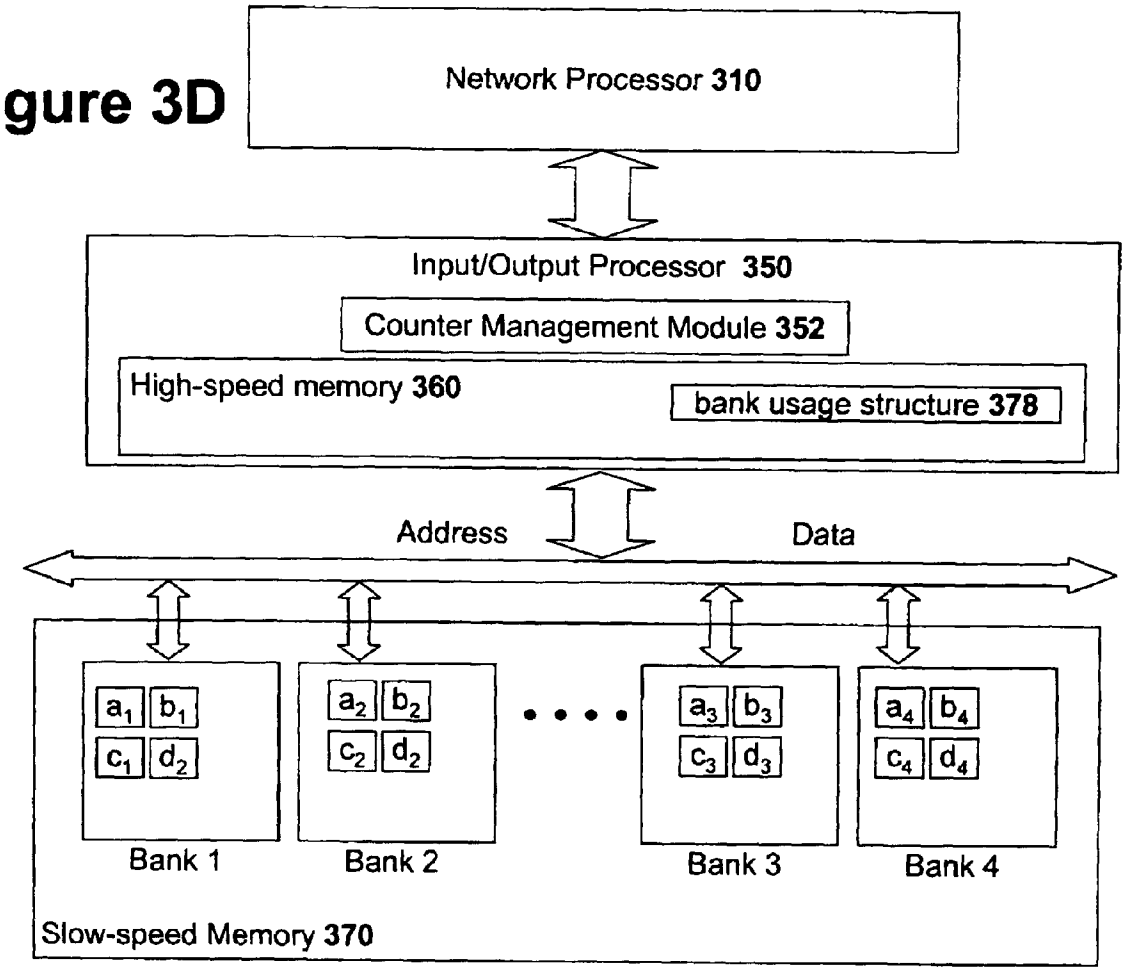
FIG. 3D illustrates a block diagram of an alternative counter management method that efficiently uses slow-speed memory in a manner that prevents bank conflicts from occurring.

FIG. 3D illustrates a block diagram of an input/output processor 350 with an alternative counter management module 352. The alternative counter management module 352 creates a set of N full-sized but partial counters in various different memory banks. In FIG. 3D, the alternative counter management module 352 has created four full-sized partial counters in four different memory banks 1 to 4. A first counter, counter 'a', is comprised of partial counters $a_1$, $a_2$, $a_3$, and $a_4$ located in memory banks 1 to 4, respectively. Counters b, c, and d are created in the same manner with partial counters in each of the memory banks.

In operation, when the alternative counter management module 352 needs to adjust a particular counter, the alternative counter management module 352 simply adjusts a partial counter for the particular counter in a bank that has not been accessed recently such that no bank conflict occurs. Any type of adjustment such as increments, decrements, adds, subtracts, or other changes can be made. To aid in this process, the alternative counter management module 352 may have a bank usage structure 378 in memory to determine which memory bank has been accessed recently.

The bank usage structure 378 may be as simple as a counter that rotates through the available memory banks in a round-robin manner. Furthermore, the hank usage structure may be implemented as a register on the input/output processor 350. In one embodiment, the round-robin type of bank usage counter 378 is used to create the address bits needed to select between the different memory banks.

When the network needs to read a particular counter value, the alternative counter management module 352 simply adds together all of the partial counters of the desired counter. For example, to read counter 'a' the alternative counter management module 352 adds together partial counters $a_1$, $a_2$, $a_3$, and $a_4$. The sum is the value of counter a.

Read-Modify-Writes Performed by the Input/Output Processor

The fifth type of network router device memory access pattern listed in Table 3 is the commonly occurring pattern of Read-Modify-Write memory accesses. Read-Modify-Write memory accesses commonly occur when maintaining a flow state as required for a number of different network device features. For example, network features such as traffic policing, network address translation (NAT), stateful firewalling, TCP Intercept, content based application recognition, server load-balancing, and URL switching maintain state information. Furthermore, most network routers maintain many statistics counters for features such as measurements, netflow, intrusion detection systems, remote management, tracing, and network based application recognition. All of these features need to read a data structure (henceforth referred to as state), modify the state, and write the state back to memory. Thus, a read-modify-write operation occurs for a number of different network features for each new data packet arrives in the network router.

To reduce the workload of the network processor, the input/output processor of the present invention performs these flow state update operations on behalf of the network processor. Specifically, the network processor simply sends a single flow state update instruction along with an identifier (or address) of the flow state value to update and any necessary parameter data (such as the amount to add to the state). The input/output processor then performs the memory accesses needed to update the flow state stored in memory. Referring to FIG. 3A, the input/output processor 350 uses the state netflow management module 357 to handle these netflow management tasks on behalf of the network processor 310.

For routers with speeds of 10 Gb/s, a read-modify-write operation needs to be done (assuming minimum sized packets) in the worst case once every 40 ns. Since there are two memory operations per packet (a read and a write), the memory that stores the state needs to be accessed every 20 nanoseconds. However, the commodity SDRAM memories (the most widely used and cheap memories) can only be accessed once every 60 nanoseconds if memory bank conflicts may occur. Thus, the netflow management module 357 employs efficient memory partitioning techniques to eliminate any memory bank conflicts from occurring. In this manner, the input/output processor may use commodity SDRAM memories for high-speed read-modify-write operations even in high-speed network devices.

The access time of the SDRAM (i.e. the time taken between consecutive accesses to any location in the memory) is dependent on the sequence of memory accesses. The most significant constraint is that two consecutive accesses to memory addresses located in the same bank must be spaced apart by $T_{RC}$=60 nanoseconds. This is known as the Random Cycle (RC) time of the SDRAM. When two consecutive memory operations access memory addresses that are in different banks then those two memory operations only need to be spaced apart by around $T_{RR}$=20 nanoseconds. This is known as the cycle time of SDRAM when there is no bank conflict.

The specific memory locations that must be accessed for read-modify-write operations are dependent upon information in the arriving packet. Thus, one cannot predict which bank will be accessed next such that the worst case DRAM access pattern wherein repeated hank conflicts may occur such that DRAMs can be accessed only every $T_{RC}$ time. In general for SDRAM devices $T_{RR}$ is less than $T_{RC}$. Therefore, if a memory access method could implement a system that would ensure that consecutive accesses to DRAM are always made to different memory banks then that memory access method would increase the effective SDRAM memory bandwidth. Specifically, a system that prevents consecutive DRAM accesses from accessing the same memory bank would allow access to the SDRAM once every $T_{RR}$ time units.

Read-modify-write operations involve two memory operations, the initial read of the state data and the subsequent write of the state data. If the memory location where a state value is maintained is fixed (as is usually the norm) then these two operations are constrained such that memory bank conflict will always occur. Specifically, the state value must be read from and quickly written back to the same memory bank where the state value being maintained.

Figure 3E:
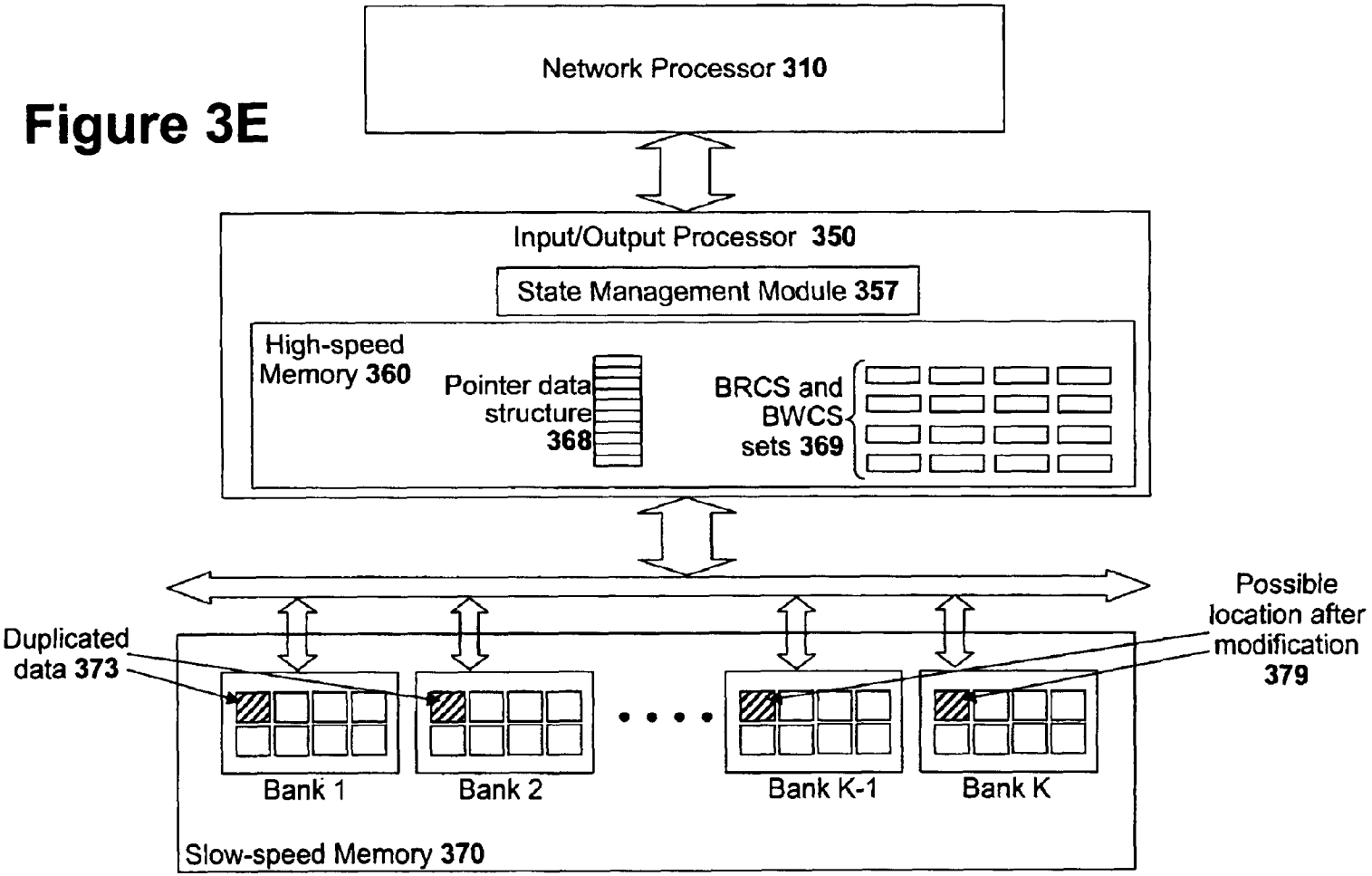
FIG. 3E illustrates a block diagram of an Input/Output Processor with a state management module for efficiently allocating memory in a manner than prevent memory bank conflicts.

Thus, to greatly improve the memory efficiency of read-modify-write operations, the netflow management module 357 should remove this "constrained" memory access. A method that the netflow management module 357 may use for removing this memory access constraint will be explained with reference to FIG. 3E. The removal of the memory access constraints is done in two parts:

1. Maintaining multiple copies of state data: In order to remove the constraint of consecutives state value reads from the same memory bank, the netflow management module 357 maintains multiple copies of state values in different memory banks. The netflow management module 357 then reads from the memory bank that is free at the time of memory access (a memory bank that has not been access recently) to obtain one of the copies of state value.
2. Changing the address and maintaining pointers: In order to remove the constraint of writing state information back to the same memory location that was just read, the netflow management module 357 writes multiple copies of the modified state to different memory banks. Specifically, the netflow management module 357 writes one copy of modified state to each distinct bank. Since the memory address of the modified state information has changed, the netflow management module 357 must maintain pointers (in) to the new multiple copies of state information in a pointer data structure 368. FIG. 3E illustrates two locations 379 in free memory banks for writing back the state data.

To fully describe the operation of a memory access method that may be implemented in the netflow management module 357, a specific example will be presented. For the example, assume that a read-modify-write operation must take place every X units of time. On a 10 Gb/s line card, this occurs once for every minimum sized packet for an X=40 nanosecond unit of time. Define a time period to the equal to the DRAM random cycle access time to be $T_{RC}$. A maximum number of read-write-modify operations that may be performed is C where C=ceiling ($T_{RC}$/X). In this equation, the 'C' refers to the number of read accesses that need to be performed in one period of $T_{RC}$ time.

In the example with $T_{RC}$=60 nanoseconds and X=40 nanoseconds, the number of read operations that may be performed is ceiling ($T_{RC}$/X)=ceiling (60/40)=ceiling(3/2)=2. Thus, two read operations may be performed in each time period of X. For the memory method, this is also the number of copies of the state for that packet that are maintained in memory since that many reads must occur in the same time period from different banks. Thus, the netflow management method maintains two distinct sets of state values.

The netflow management module 357 maintains a data structure that keeps track of a first set of memory banks known as the Bank Read Constraint Set (BRCS). The Bank Read Constraint Set is the set of memory banks that cannot be used in the present time period because data needs to be read from these memory banks. Note that at any given time the number of memory banks in the Bank Read Constraint Set needed is less than or equal to C since no more than C read accesses (one for each of the C arriving packets) need to be handled in each time period. Referring to FIG. 3E, the netflow management method maintains a data structure 369 in high-speed memory that indicates which of the memory banks are currently in the Bank Read Constraint Set.

The netflow management method also maintains a structure in high-speed memory that keeps track of a second set memory banks known as the Bank Write Constraint Set (BWCS). The Bank Write Constraint Set is the set of memory banks that cannot be used in the present time period because data needs to be written to these memory banks. During any time period, the state for each of the above "C" reads needs to be modified and written back to memory. Since C copies of each state value must be maintained in memory this results in C corresponding writes of modified state values for each of the C reads for a total of C*C or $C^2$ write accesses to memory. All these state values for the $C^2$ writes should be written back to distinct memory banks (as each bank can be accessed only once in each time period) such that $C^2$ memory banks are required to handle all of the memory writes in a time period. Since the total number of memory banks required for the memory writes is $C^2$ then the number memory banks in the Bank Write Constraint Sets (BWCS) is less than or equal to $C^2$. In the embodiment illustrated in FIG. 3E, the netflow management method maintains the list of memory banks currently in the Bank Read Constraint Set in the same structure 369 that contains the Bank Read Constraint Set.

In order to ensure that all the C read operations and $C^2$ write operations are able to get a free memory bank during the time period, the memory subsystem for read-modify-write operations must have at least $C+C^2=C(C+1)$ different memory banks for storing state information. In any given time period, the netflow management module 357 first satisfies the C read operations from different memory banks. Then, the remaining $C^2$ write operations are written to the free $C^2$ memory banks from the second part of the equation.

Since the location of the state data is changed when it is written back to a different memory bank, the netflow management module 357 must maintain a current state value pointer for all the C copies of the updated state information. FIG. 3E illustrates a pointer data structure 368 that the netflow management module 357 uses to maintain such pointers to the current state values.

The method used by the netflow management module 357 as described above can be modified in a number of ways to modify or improve performance. A list of possible modifications is set forth below.

In the analysis of the memory access method for the netflow management module 357, note that the analysis was performed using a time period that is defined to be $T_{RC}$ units. The number of state value copies required is calculated based on the number of read-modify-write accesses (X) done in every $T_{RC}$ units. However since ($T_{RC}$/X) is not always an integer, this analysis does not necessarily give the optimal solution. If the analysis is instead done for a new time period that is a multiple of $T_{RC}$, such as $yT_{RC}$, then the value $yT_{RC}$/X will always be an integer. In such a case, it is then possible to use less than C(C+1) banks, where C=ceiling ($T_{RC}$/X).

Consider the above scenario, when a time period of $yT_{RC}$ is being used by the state management module. Then when data is being written back to slow-speed memory 370, multiple writes to a single memory bank can be performed together if those writes are to contiguous locations on a DRAM bank such that burst mode is used for the writes. This technique allows one to further improve the use of the DRAM bandwidth more effectively. Ideally, the use of this technique may increase the number of read-modify-write accesses that can be obtained from a DRAM.

If the low order bits (or the possibly the entire address) of the memory location used for the C copies of a packet's state that are in C different banks are identical (except for the bank number which is different), then the C separate pointers are not required to point to the various different copies of state values. Instead, the netflow management module 357 only needs to maintain is a single state value pointer and a bitmap to describe which memory bank of the possible C(C+1) memory banks currently contains the updated version of the state data.

In many situations, the netflow management module 357 may only read the state data without modifying the state data or writing it back to memory. In such situations where the state data is only read then only the first part of the method (i.e. maintaining multiple copies of data) needs to be performed. In such cases the method degenerates to a trivial problem wherein the state data is simply replicated across different memory banks to increase the DRAM bandwidth efficiency by eliminating all memory bank conflicts for memory reads.

In certain situations, the netflow management module 357 only performs read-modify-write access on a small portion of the state data structure while the remainder is read-only. In such cases, the netflow management module 357 can simply maintain the small read-modify-write portion of the state information in high-speed memory. This arrangement will eliminate the need for the method described in this document, by providing an architectural solution to the problem.

The netflow management module 357 can easily be designed to implement both the read-modify-write improvement method and the architectural solution set forth in the previous paragraph. In this manner, a designer that uses the input/output processor of the present invention is free to choose either implementation or a combination of the two different implementations.

Bulk or Predictable Read/Writes and Blind Writes Performed by the I/O Processor

The sixth type of memory access listed in Table 3 that commonly occur in network router devices is bulk or predictable reads/writes to memory. Certain network router features such as packet capture operations need to perform large but predictable memory reads and/or memory write.

Since bulk or predictable read and write memory accesses are by definition predictable, no special input/output methods are needed to handle bulk or predictable read and write memory accesses. Thus, these bulk or predictable read and write memory accesses may be handled with conventional DRAM technology.

Blind Writes Performed by the I/O Processor

The seventh type of network router device memory access pattern listed in Table 3 is the commonly occurring pattern of blind write accesses to memory. All memories maintained by various different applications in a network device will generally need to be periodically updated. On the memory and input/output interface, these updates appear as blind writes to memory. By definition, the memory locations that are accessed by these blind memory updates are unpredictable thus making these blind memory updates difficult to predict. To handle blind writes, the present invention introduces a method for efficiently implementing live and consistent updates to memory. With the teachings of the present invention, blind memory updates can be performed in a manner such that conventional DRAMs are adequate for storing the information even at very high speeds.

In a network router, data must be looked up (read) continuously at wire-speeds (fast enough to keep up with the data rate on the communication wire). For example, a forwarding lookup database on a router line card operating at 10 Gb/s is accessed twenty-five million times per second. Depending on the application, this data may also need to be updated (which involves a write operation). There are two problems when any memory database is updated:

2. The memory interface may not have the bandwidth to process both wire speed lookups (reads) and updates (writes) at the same such that the wire-speed lookup capability might become reduced.
3. The database might be in an inconsistent state when an update is in progress. If the database is in an inconsistent state, then one has to completely stop wire-speed processing until the old memory database has completed its change to the new state.

This section describes a live update method that overcome the above two problems. The method enables live updates such that wire-speed processing is guaranteed for the database when updates are in progress and consistent updates such that an external agent always sees a consistent state of the database. The consistent state will either be the old copy or the new copy of the database, but never a partially updated copy of the database.

The live update method utilizes the fact that updates to an external memory database usually change only a small part of the memory database. Since only a small change is made, the live update method first downloads the changes to the database to the high-speed memory on the input/output processor. Then, with the aid of a smart Content Addressable Memory (CAM) (as described below) the live update method redirects memory accesses intending to access external locations whose values are being changed to the updated values in the high-speed memory. The live update method thus returns the updated values even though those values have not been stored into the main memory. Memory accesses to addresses that have not been updated continue to be retrieved from external memory.

Figure 3F:
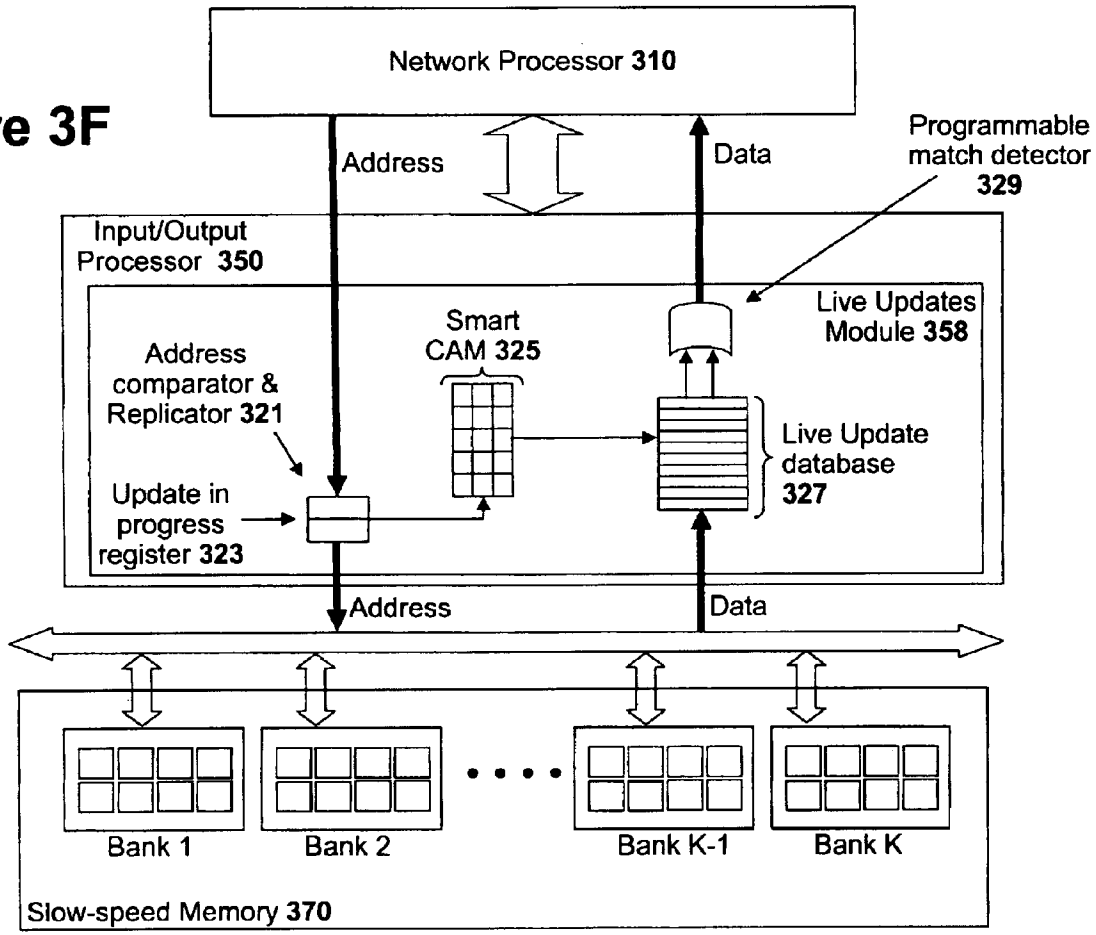
FIG. 3F illustrates a block diagram of an input/output processor with a live updates module that handles such database updates for a network processor.

FIG. 3F illustrates a block diagram of an input/output processor 350 with a live updates module 358 that handles such database updates for a network processor 310. The following paragraphs will describe the various architectural units employed by the live updates module 358 with reference to FIG. 3F. After the description of the various architectural units, the method of operation of the live updates module 358 will be presented.

Referring to FIG. 3F, the live updates module 358 uses a smart Content Addressable Memory (CAM) 325 to store and match addresses received from the network processor 310. The smart CAM 325 functions like a fully associative cache, or ternary CAM, but in addition the smart CAM 325 has the capability to match address ranges. The ability to match address ranges is especially useful in applications such as forwarding lookups wherein a number of contiguous memory locations are updated with the same value. For example, an entry in the smart CAM 325 could specify that it should match addresses from 0x0A0B to 0xFFFF (the addresses are denoted in base-16 or hexadecimal notation in this example). The smart CAM 325 should be large enough to store all the addresses that can change when modifying an old database into a new database.

As set forth above, the live updates module 358 stores the database updates in the high-speed memory 360. Thus, the live updates module 358 creates a small live update database 327 within the high-speed memory 360. Each entry in the smart CAM 325 points to an address in the high-speed memory 360 that contains an updated database value. The high-speed memory 360 is sufficiently large enough to store all of the new updated values for the addresses that change between an old database and a new database.

An address comparator and replicator 321 compares whether an address requested by the network processor 310 lies in the address range of the database that is updated. If a requested address lies in this range, then the address comparator and replicator 321 replicates the address request and sends the address request to both external memory and the smart CAM 325. There is a register in the address comparator and replicator 321, called the "update in progress register" that can be set by a programmer to denote when a live update is in progress.

Finally, a programmable match selector 329 is used to determine which value to return in response to a request from the network processor 310. The programmable match selector 329 can be programmed to give precedence to either a smart CAM 325 entry, the value retrieved from external memory, or to report a pre-programmed value, when a live update is in progress.

The process of converting an old copy of a database to a new version of the database occurs conversion is performed by downloading a set of update information to the input/output processor 350. The live updates module 358 in the input/output processor 350 then handles the rest of the database conversion. To perform a database update, the programmer performs the following steps:

1. The programmer first has the network processor 310 download the addresses and the values of the database update. The update data values are stored in a small live update database 327 within the high-speed memory 360. The addresses are stored in the smart CAM 325. The smart CAM 325 may store address ranges if consecutive locations in memory have to be updated together with the same value.
2. The programmer then downloads the lowest address and the highest address that need to be updated to the address range comparator and replicator 321.
3. Finally, the programmer sets the update in progress register 323 in the address range comparator and replicator 321.

After completing step 3, the live updates module 358 immediately begins the update process. Prior to step 3, all address requests from the network processor 310 to a database in memory are handled by the old copy of the database stored in slow-speed memory 370. But once step 3 is completed, the live updates module 358 activates the address range comparator and replicator 321 such that the address range comparator and replicator 321 compares all memory read requests received by the input/output processor 350. If a memory read request lies within the address range provided in step 2, the address range comparator and replicator 321 makes a concurrent request to the smart CAM 325. This request occurs in parallel with the request that is passed through to the slow-speed memory 370.

If the smart CAM 325 has an entry that matches the requested address, then the smart CAM 325 retrieves that data value from the small live update database 327 within the high-speed memory 360. Thus, if there is a bit in the smart CAM 325 then the programmable match selector 329 will receives the data values from both the slow-speed memory 370 and from the high-speed memory 360. The programmable match selector 329 can be made to select either of these two data values to return to the network processor 310. If the programmable match selector 329 is programmed to select the value in the high-speed memory 360 then all memory accesses within the defined address range are automatically directed to the see the small live update database 327 within the high-speed memory 360. The small live update database 327 within the high-speed memory 360 is always in consistent state since it is not activated until the programmer sets the update in progress register 323.

Referring back the three programmer steps, as step 3 is completed the live updates module 358 directs all memory requests within the defined range access the small live update database 327 within the high-speed memory 360 by using of the smart CAM 325. However, at the same time the live updates module 358 continues to update the main database in slow-speed memory 370. These 'background' updates are performed as follows.

After step 3 is completed, the live updates module 358 writes back the database update values from the small live update database 327 within the high-speed memory 360 to the slow-speed memory 370. The live updates module 358 uses any available bandwidth on the interface to the slow-speed memory 370 in order to perform these database updates. When the live updates module 358 completes the update of the main database in the slow-speed memory 370 (and the database in the slow-speed memory 370 is in a consistent state) then the live updates module 358 resets the register in the update in progress register 323 in the address range comparator and replicator 321 and flushes the entries in the smart CAM 325. The live updates module 358 may then return a signal to the network processor 310 that it is ready to perform additional database updates.

The live updates module 358 can be modified in a number of different ways described as follows. The following paragraphs present a few modifications that may be desirable in various embodiments.

The live updates module 358 in the input/output processor 350 may be modified to support database logging. In such an embodiment, the small live update database 327 within the high-speed memory 360 may act as a database log. Specifically, the live updates module 358 may to store two values in the small live update database 327 for each address. A first value would be the new updated value and the second value would be the old value of the database. When the new database has to be committed, the live updates module 358 will write the new value of the database for all the addresses from internal memory to external memory. This operation creates the new database to memory. However, if the database must be rolled back, then the live updates module 358 may write the original values of the database previously stored in the small live update database 327 to back into the slow-speed memory 370. This operation restores the original database in the main (slow-speed) memory 370.

In such an embodiment, the programmable match selector 329 can be enhanced to provide an additional feature. For example, the programmable match selector 329 may be modified to allow prioritization between the database value in external memory, the new database value stored in internal memory, or the old value stored in the small live update database 327 while creating a database log.

QOS Scheduling Performed by the Input/Output Processor

The final memory access pattern entry listed in Table 3 concerns Quality of Service (QOS) scheduling. Specifically, the input/output processor of the present invention can be used to efficiently provide improved scheduling services for a packet-switched network device. In order to provide high-speed QOS services to the network processor, the input/output processor 350 uses a packet scheduling module 359.

In one embodiment, the packet scheduling module 359 implements a parallel packet-switched architecture. In the parallel packet-switched architecture, the arriving traffic is first demultiplexed over a number of identical slower-speed packet switches. The packets are then switched to the correct output port. Finally, the packets are recombined before departing from the network device. Details on the implementation of the packet switching and scheduling methods can be found in paper entitled "Analysis of a packet switch with memories running slower than the line rate" by Sundar Iyer, Amr Awadallah, and Nick McKeown. Another paper titled, "Routers with a Single Stage of Buffering", by Sundar Iyer, Rui Zhang, Nick McKeown further elaborates this techniques in this method. In both of the papers, the sections that pertain to the push in first out (PIFO) method for packet scheduling pertain to this discussion.

Many scheduler data structures require FIFO accesses on linked lists. For example, packet schedulers need to maintain a data structure referred to as calendar queues. Calendar queues are implemented using linked lists. Thus, the teachings in this document on maintaining FIFO queues, such as the teachings in the packet buffering sections, are directly applicable to calendar queue caching.

An Example Implementation of an I/O Processor

Figure 4:
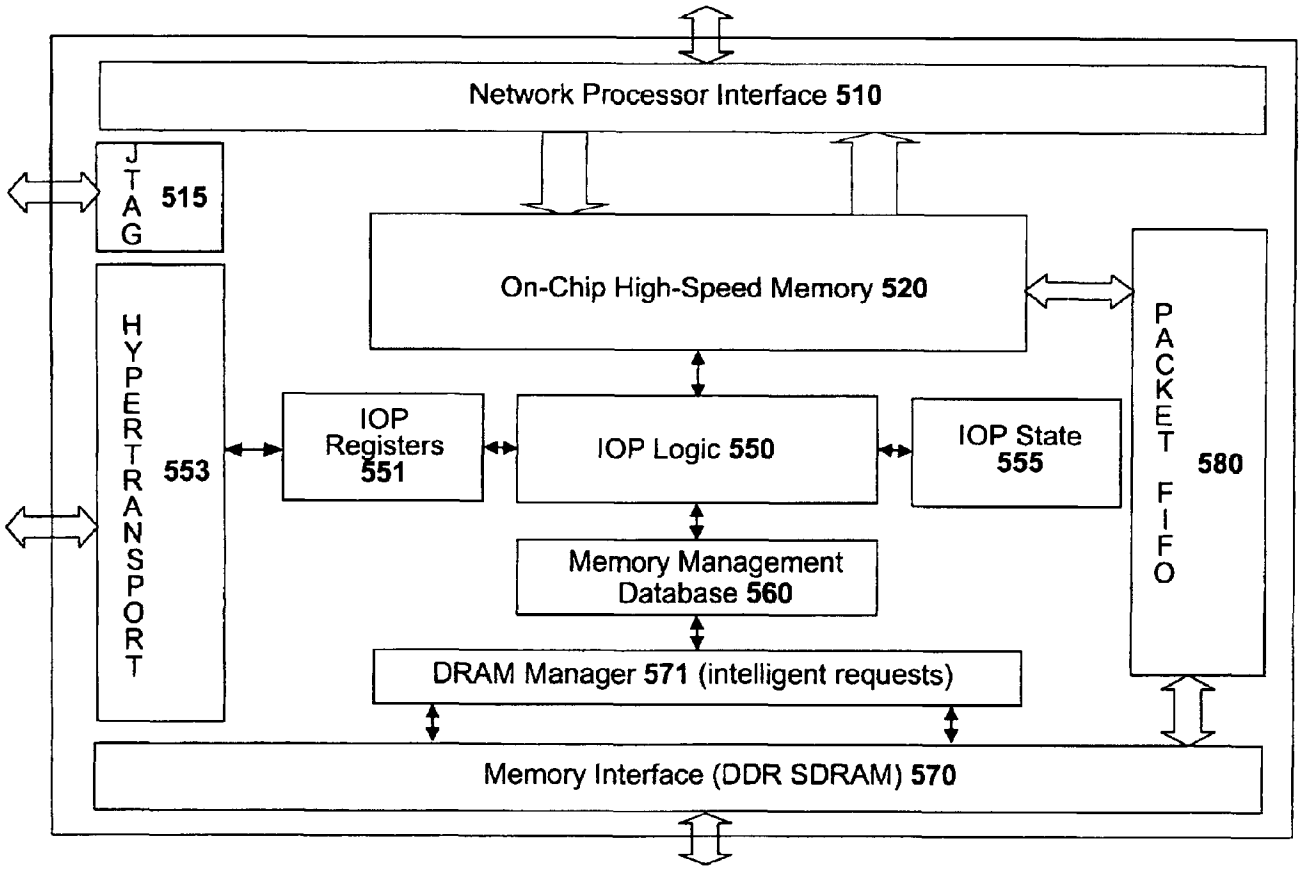
FIG. 4 illustrates a high-level block diagram of one possible implementation of the input/output processor of the present invention that may be used in a network device.

FIG. 4 illustrates a high-level block diagram of one possible implementation of the input/output processor of the present invention. Note that the teachings of the present invention may be implemented with different architectures.

Referring to FIG. 4, the input/output processor communicates with a network processor through a network processor interface 510. In one embodiment, the network processor interface 510 is implemented as a QDR-SRAM interface in order to provide compatibility with a common high-speed interface. In addition to the network processor interface 510, there is a common JTAG interface 515 for testing and debugging purposes.

The network processor interface 510 is coupled to an high-speed memory 520 that buffers requests from the network process. The high-speed memory 520 is also used to store various data that requires frequent high-speed access such as counters.

The commands from the network processor are processed by the input/output processor logic 550. The input/output processor logic 550 is coupled to set of input/output processor registers 551 that are used to program the specific activity of the input/output processor. The input/output processor registers 551 may be set and read through a hypertransport interface 553. The input/output processor core also includes an input/output processor state module 555 that maintains the state of the input/output processor. The input/output processor state module 555 is a high-speed memory used by the input/output processor logic 550.

The input/output processor core uses a memory management database 560 to maintain a map of the associated DRAM memory. As set forth in the description of the various methods implemented by the input/output processor, the input/output processor efficiently partitions and maps the associated DRAM memory such that memory conflicts are reduced and the desired data can be accessed at the optimal speed. The input/output processor accesses the associated DRAM though a DRAM manager 571 and memory interface 570.

A packet First-In First-Out memory unit 580 is used to efficiently buffer packet data that is being written to and read from the DRAM memory.

Overall Packet Buffering System

The input/output system of the present invention is ideal for creating a packet-buffering system for network devices. Therefore, a number of detailed examples of a packet buffering system will be provided. Before addressing the packet buffering details, a brief review of a packet buffering system implemented with an input/output processor is desirable.

A Basic Packet Buffering System Block Diagram

Figure 5A:
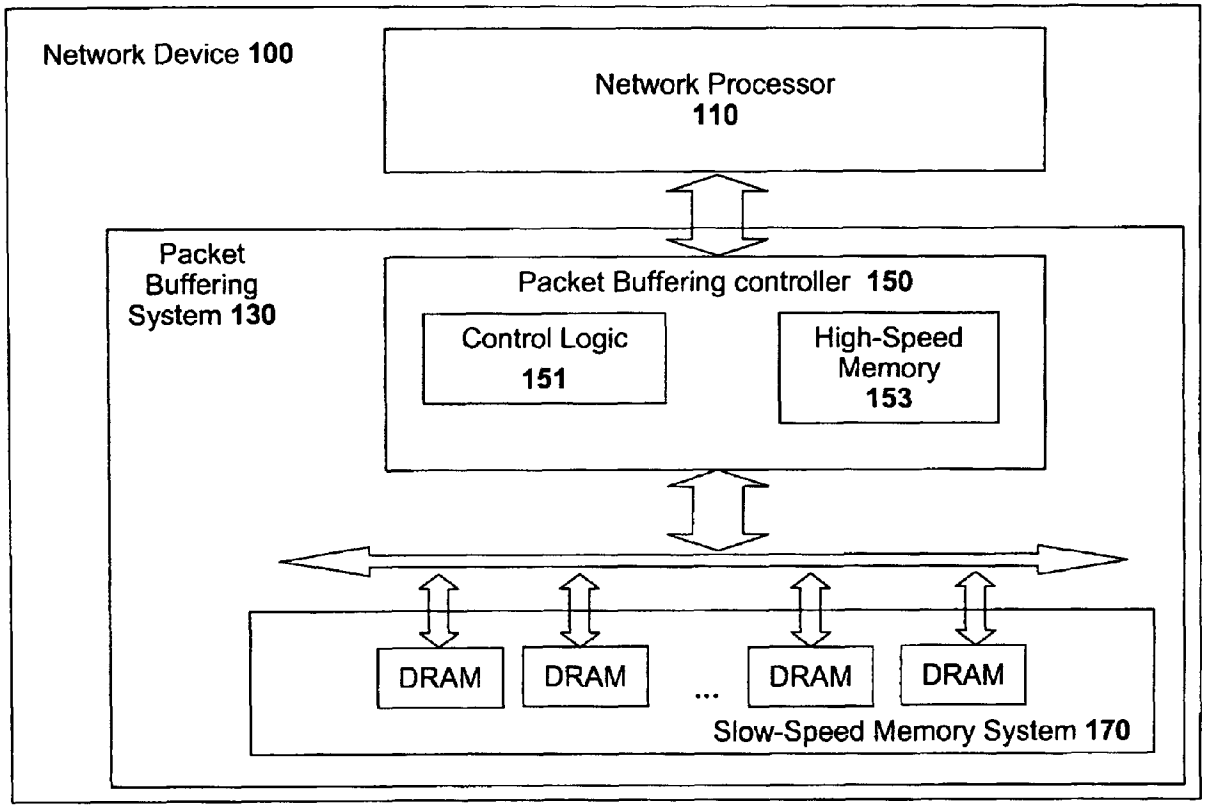
FIG. 5A illustrates a high-level block diagram of a generic network device that has been implemented with an input/output processor for performing packet buffering.

FIG. 5A illustrates a high-level block diagram of an input/output processor used to implement a packet buffering system 130. The packet buffering system 130 of the present invention implemented within the context a generic network device 100 such as a router or a switch. As illustrated in FIG. 5A, the packet buffering system 130 is coupled to a network processor 110. The packet buffering system 130 provides the network processor 110 with memory access services such that the network processor 110 is able to achieve a higher level of performance than the network processor 110 would be able to achieve with a normal memory system. Specifically, the packet buffering system 130 off-loads a number of memory intensive tasks such as packet buffering that would normally require additional processing by the network processor and a large amount of high-speed memory if the packet buffering system 130 were not present in the network device 100.

The packet buffering system 130 includes a packet buffering controller 150 which may be implemented as an Application Specific Integrated Circuit (ASIC), a Field Programmable Gate Array (KPGA), or in another manner. The packet buffering controller 150 may be considered as a memory controller that is dedicated to perform the task of packet buffering and other specific memory tasks needed for memory management. The packet buffering controller 150 includes control logic 151 that analyzes requests from the network processor 110 and responds to those requests in an appropriate manner.

To respond to memory requests from the network processor 110 very quickly, the packet buffering controller 150 has a limited amount of high-speed memory 160. The high-speed memory 160 integrated on the same die with the packet buffering controller 150 (as illustrated in the example of FIG. 5A) or off-chip as a discrete integrated circuit.

A Basic Packet Buffering System Conceptual Diagram

When designed properly, the control logic 151 of the packet buffering controller 150 will be able to respond to any packet-buffering request from the network processor 110 quickly using its logic or using data located in the local high-speed memory 160. However, in addition to quickly responding to packet-buffering requests from the network processor 110 using data in the local high-speed memory 160, the control logic 151 packet buffering controller 150 will also use a much larger but slower-speed memory system 170 to store information from the network processor 110 that does not need to be read or updated immediately. The control logic 151 always stores immediately received data in a high-speed memory and ensures that any data that may be read in the near future is also available in high-speed memory. In this manner, the packet buffering system 130 will appear as one large monolithic high-speed memory system to the network processor 110.

Figure 5B:
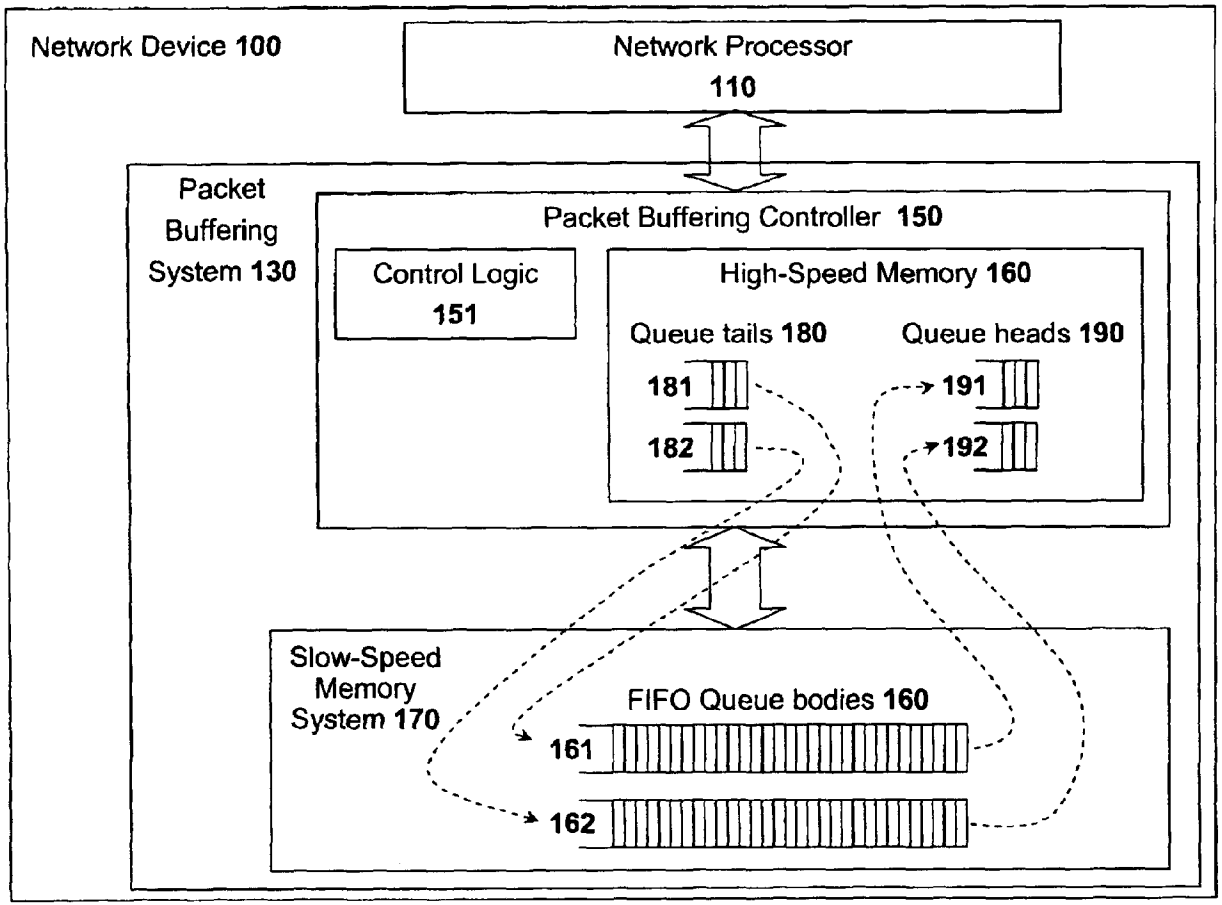
FIG. 5B illustrates the packet buffering system FIG. 5A with packet buffer FIFO queues conceptually illustrated.

For example, FIG. 5B illustrates a conceptual block diagram of a packet-buffering system 130 that implements a pair of FIFO queues that may be used for packet-buffering. (Note that the FIFO queues may also be used for any other type of application that requires information stored in FIFO queues.) In the example packet-buffering system 130 of FIG. 5B, each the two FIFO queues are divided into three separate pieces: the tails of the FIFO queues 180, the heads of the FIFO queues 190, and the main bodies of the FIFO queues 160 that are between associated FIFO queue tails and FIFO queue heads.

When the packet buffering controller 150 receives a packet, the control logic 151 writes the packet to the tail of a FIFO queue (181 or 182) located in high-speed memory 160 to provide a fast write response to the network processor 110. Initially when there are few packets in a FIFO queue, the packets will only reside in the high-speed memory in both queue tails 180 and queue heads 190.

As a FIFO queue grows large, the control logic 151 will place packets from the middle of a FIFO queue into main bodies of the FIFO queues (161 and 162) than are stored in slow-speed memory 170. However, the control logic 151 will always make sure there are enough packets in the queue heads 190 in high-speed memory 160 such that the network processor 110 can always retrieve packets from the queue head at full speed. Thus, as conceptually illustrated in FIG. 5B using dashed arrows, the control logic 151 moves packets from the FIFO queue tails (181 and 182) into the FIFO queue bodies (161 and 162) when those packets are no longer near the end of a FIFO queue tail. The control logic 151 also moves packets from the FIFO queue bodies (161 and 162) into the FIFO queue heads (191 and 192) as necessary to ensure that the network processor 110 always has high-speed access to the packets near the FIFO queue heads 190.

With the proper use of intelligent control logic 151 and a small high-speed memory 160, the packet buffering system 130 will make a large slow-speed memory system 170 (such as a DRAM memory system) appear to the network processor 110 as if it were constructed using all high-speed memory (such as SRAM). Thus, the packet buffering system 130 is able to provide a memory system with the speed of an SRAM-based memory system while mainly using high-density, low-cost, and low-power consumption DRAM integrated circuits.

To accomplish the desired goals, the intelligent control logic 151 takes advantage of the manner in which a network processor 110 typically uses its associated memory system. Specifically, the intelligent control logic 151 in the packet buffering system 130 is aware of the packet buffering memory access patterns commonly used by network processors. For example, the packet buffering system 130 is aware of both the data structures stored in the memory (such as FIFO queues) and the fact that all of the packet reads and all of the packet writes are always to the FIFO queue tails and the FIFO queue heads, respectively.

Packet Buffering System Integration Variations

It must be stressed that the example implementation in the block diagram of FIG. 5A illustrates only one possible implementation of a packet buffering system 130. Many different implementations of packet buffering systems may be created. Various different implementations of packet buffering systems may integrate the packet buffering control logic 151 within the network processor 110 or integrate both the packet buffering control logic 151 and the high-speed memory 153 within the network processor 110.

Figure 5C:
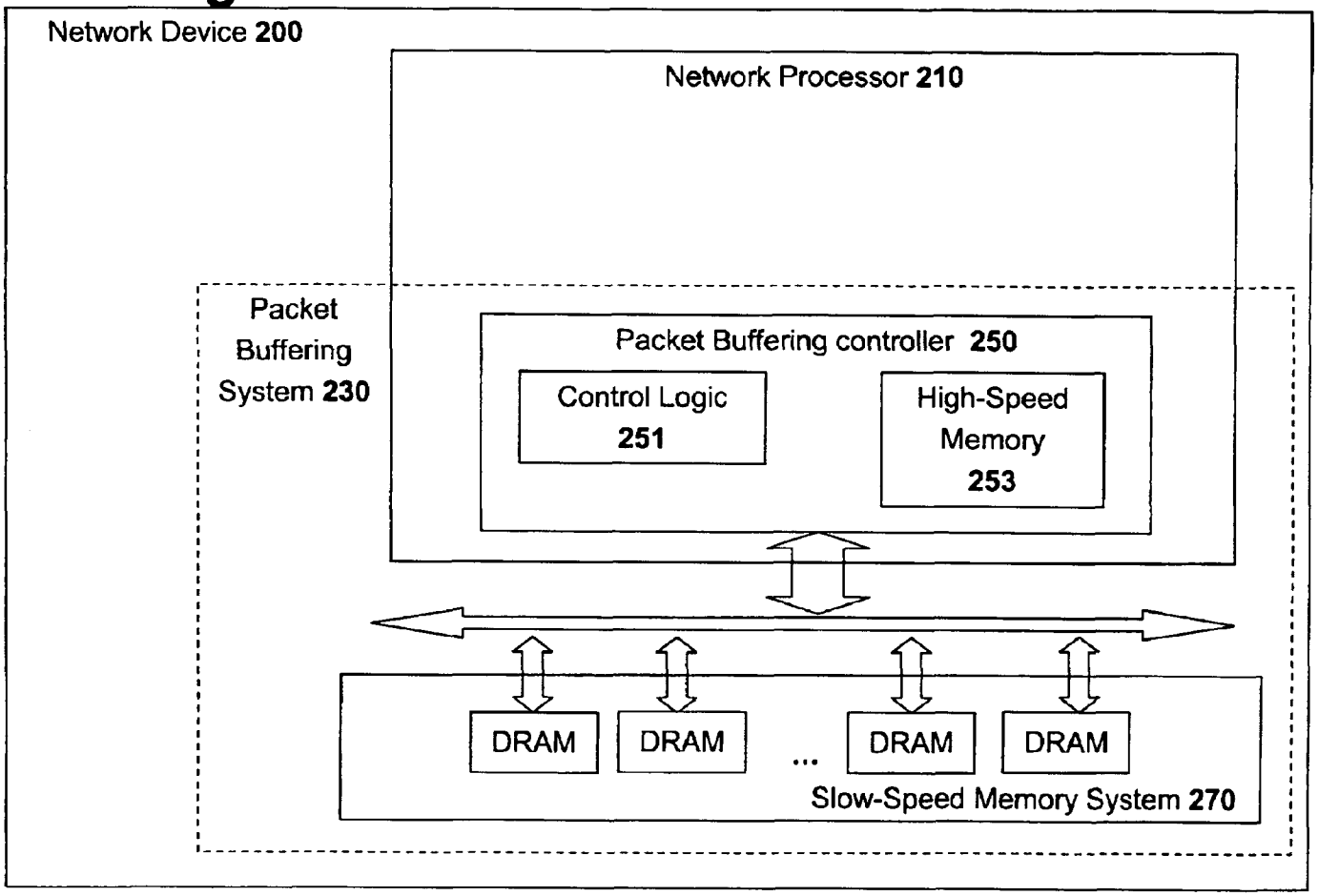
FIG. 5C illustrates an alternate implementation of a packet buffering system of FIG. 5A wherein the packet buffering controller is implemented as part of a network processor integrated circuit.

In the implementation of FIG. 5A, the packet buffering controller 150 may be implemented as part of a specialized separate packet buffering system integrated circuit 130. However, many different permutations of integrated implementations are possible. For example, FIG. 5C illustrates an alternate implementation wherein the packet buffering controller 250 (comprising control logic 251 and associated high-speed memory 253) is integrated within network processor integrated circuit 210. In such an implementation, the packet buffering system 230 is made up of the control logic 251 and associated high-speed memory 253 in the network processor 210 and the external slow-speed memory system 270 as illustrated by the dashed rectangle.

Figure 5D:
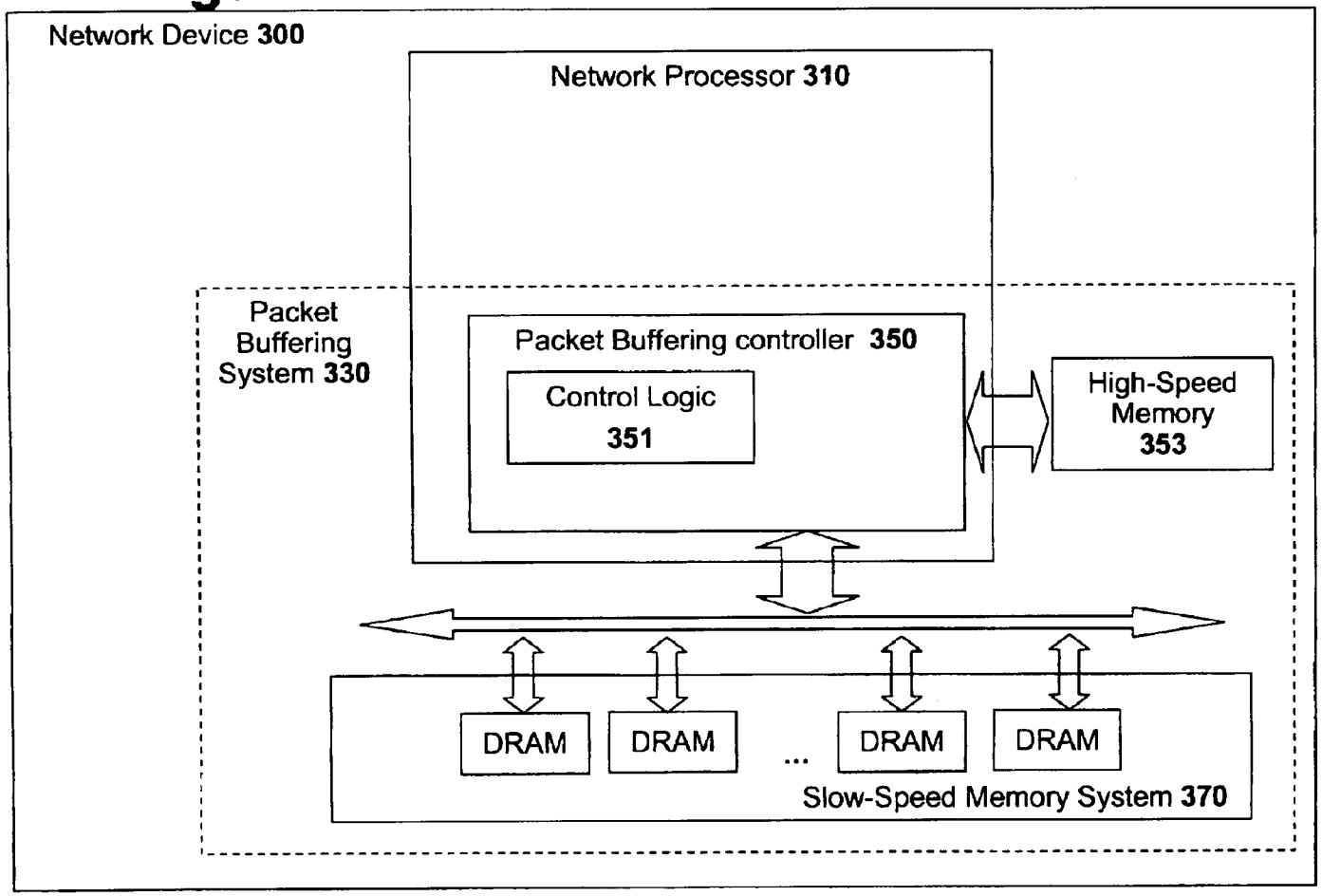
FIG. 5D illustrates an alternate implementation of the packet buffering system of FIG. 5A wherein the low-latency memory is implemented with one or more external integrated circuits.

FIG. 5D illustrates another alternate implementation of a packet buffering system with a different integration scheme. In the packet buffering system of FIG. 5D, the packet buffering control logic 351 is implemented as part of the network processor 310 but both the high-speed memory system 353 and the slow-speed memory system 370 are implemented with discrete integrated circuits. Many other implementation permutations exist.

Packet Buffering with FIFO Queues

One of the most important tasks performed by a packet buffering system is to provide First-In First-Out (FIFO) queuing services since FIFO queues are almost always used in network devices. Specifically, one of the main goals of the packet buffering system is to provide a large high-speed FIFO queue system constructed that uses large amounts of high-latency memory along with a smaller low-latency cache memory that achieves a 100% cache bit rate. In this manner, the entire packet buffer memory appears to be made from low-latency memory.

The amount of low-latency required to achieve a 100% cache hit rate in such a packet buffering system depends on the number of queues that must be maintained by the packet buffering system. The buffering system depends on the fact that when a packet is written to or read from memory, the buffering system will only need to access the tail or the head of the queue, respectively. Thus, the buffering system only needs to assure that the head of the queue is available in low-latency memory when requested by the network processor, and the head of the queue can be written to low-latency memory without overflowing the low-latency memory. The main body of a queue may be stored in high-latency memory provided that the tail (head) can be read from (written to) as necessary.

Before proceeding into the description of these various methods, it would be desirable at this point to identify and describe the basic data structures that are used in maintaining packet buffers. Packet buffers consist of a set of queues that are accessed in a First-In-First-Out (FIFO) manner. A network system may have many have many FIFO queues. In a network system with Q queues, the individual FIFO queues may be denoted by $Q_i$, ($1 \leq i \leq Q$). Each individual queue may contain multiple packets. Packets may be written in any order to the tail of these queues and read in any order from the head of these queues.

Identifying the Queue Associated with a Packet

In order to efficiently store packets, the buffering system must know the identity of the particular queue that packets are written to or read from. This section discloses a variety of methods by which the packet buffering system can determine the appropriate queue number for packets being written to the queue and packets being read from a queue.

Direct Logical Addressing of Queues

To reduce the amount of work performed by a network processor, an ideal packet buffering system allows a network processor to perform FIFO queue operations by directly using the logical queue number of the queues to be manipulated. Thus, the packet buffering system should provide a logical queue number based interface to the network processor. In such a system, the network processor could operate with a packet-buffering device by simply passing along an identifier for the logical queue along with the packet when the packet is written to the buffering system. Similarly when packets are read from the buffering system, the network processor can request a packet from a specific queue by simply specifying a packet request along with the appropriate logical queue number. This mode of operation is referred to as a "logical access" to the packet buffering system.

In order to facilitate logical access between a network processor and a buffering system, the buffering system provides a specific tailored FIFO queue application-programming interface (API) to the network processor. The FIFO queue API includes a number of different queue manipulation commands that allow the network processor to directly manipulate queues using only the queue number. A subset of the possible queue manipulation commands follows:

1. read_next_packet_from_queue (queue number)—This command allows the network processor to request the buffering system to return the packet stored at the head of one of its queues (specified by the queue number) to the network processor.
2. write_next_packet_to_queue (queue number, packet)—This command allows the network processor to write a packet to the tail of one of the queues denoted by queue number.
3. read_packets_from_queue (queue number, number_of_packets)—This command allows the network processor to request the buffering system to return a number of packets (as specified by the number_of_packets parameter) that are currently stored at the head of a queue (specified by the queue number) to the network processor.
4. write_packets_to_queue (queue number, number_of_packets, packets)—This command allows the network processor to write a number of packets (as specified by the number_of_packets parameter) to the tail of the queue denoted by queue number. Note that the packets parameter may be a pointer to a set of packets.

The above commands may be further augmented to provide additional features. Additional queue manipulation commands may be added. For example, a command to add an additional queue or purge an identified queue may be provided. A specific packet buffering system implementation may not include all of the queue manipulation commands listed above.

Two-Level Virtual Memory Addressing Of Packet Queues

In order to quickly bring a high-speed buffering system to market, it would be desirable to create a high-speed packet buffering system that requires no changes at all or only minimal changes to existing computer processors (such as network processors) for the high-speed buffering system to be incorporated. Thus, several different schemes have been devised in order to allow a high-speed buffering system to be used with the currently available network processor systems.

In many existing network processor systems, the network processor operates with logical queue numbers internally but uses normal physical memory addresses externally. For example, a network processor may perform scheduling decisions with a logical queue number internally and then later convert the logical queue number to a physical address in order to use the physical address when a packet needs to be written to external memory. In this section, the term "physical address" refers to a raw memory address used by a network processor (NP) to read a packet from (or write a packet to) the buffering memory system. The term "logical address" or "logical queue" will be used to refer to the queue number of the associated queue for the packet.

To provide high-speed packet buffering services to existing network processors without mandating a change to the way in which these existing network processors use memory, the present invention introduces a "two-level virtual memory system". This two level virtual memory system is different from existing computer architectures where there is a single level of virtual memory. In normal computer architecture, a virtual memory address (such as a page or block) is converted into a physical memory address (such as a specific address on an SRAM, DRAM or hard disk, I/O device etc). In some implementations of the packet buffering system of the present invention, memory addresses can be translated two times, hence the name two-level virtual memory system.

An example would best illustrate the two-level virtual memory system. When a packet arrives in a network device, the network processor classifies the packet and assigns the packet to a logical queue. The packet is written to the tail of the assigned queue wherein the queue number represents the logical address for that packet. In a prior art system, the network processor converts this logical address (the logical queue number) into a physical address and writes the packet to memory. This can be considered as an example of a simple virtual memory system. In contrast, the buffering system may appear just like normal memory to the network processor and mimic the behavior of a normal memory interface. However, internally, the packet buffering system re-converts the physical address back into the original logical address (i.e. the queue number) associated with the packet. The packet buffering system then converts this logical address into a physical address that the packet buffering system allocates and then writes the packet to this newly allocated physical address. This second re-conversion from a logical address to a newly allocated physical address is performed completely within the packet buffering system and is completely transparent to the network processor.

In order to implement such a two-level virtual memory system, the packet buffering system must be able to determine a logical queue number of each packet on its own since the network processor does not directly provide the queue number to the packet buffering system. Thus, packet buffering system must be able to infer the logical queue number associated with each packet read or write request. The following sections provide multiple techniques for inferring the logical queue numbers associated with packet reads and writes.

Interpreting Address and Translation

Figure 6:
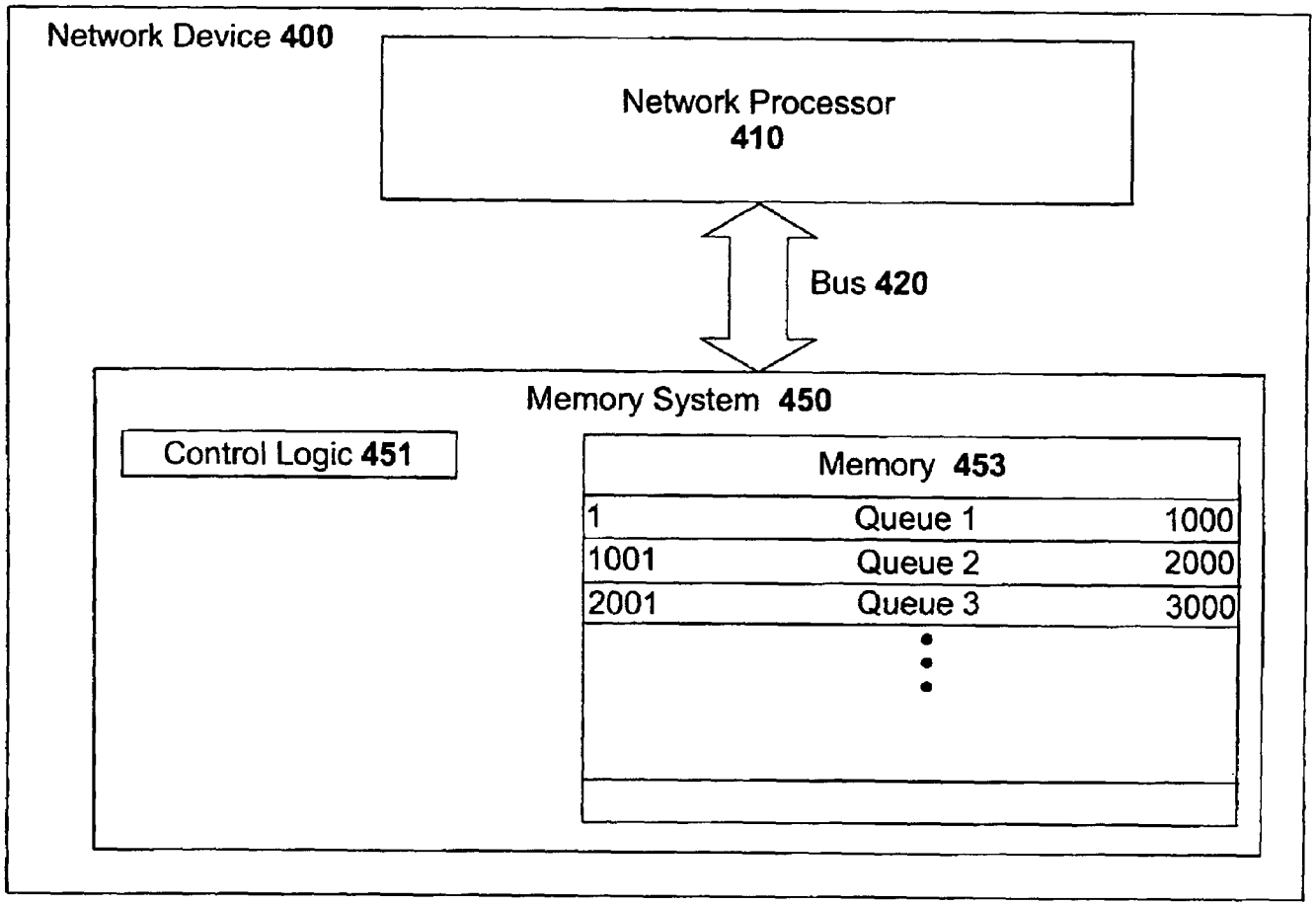
FIG. 6 illustrates a high-level block diagram of a network device that statically allocates physical memory ranges for storing packets associated with different logical queues.

In many network devices, the network processor statically allocates the memory for the packet buffer amongst its different queues. For example, FIG. 6 illustrates a high-level block diagram of a network device that allocates memory locations 1 to 1000 to store packets for queue number one. This means that all packets destined for queue number one are only stored between memory locations 1 and 1000. Similarly, the network device has allocated locations between 1000 and 2000 for storage of all packets for queue number 2. The rest of the memory is allocated in a similar manner. An example of a well-known buffering method that uses statically allocated memory ranges is a "circular buffer" implementation.

In the network device as described with reference to FIG. 6, a buffering system can calculate the queue for which the request is being made simply by examining the memory addresses used by the network processor. This is done by reading the physical memory address on the address bus and then converting the physical memory address to a logical queue number. In the example of FIG. 6, a request for a packet from address 1200 will be converted into logical queue number 2 since the address 1200 lies between the address ranges 1000 to 2000 and the buffering system would return a packet from the head of queue number 2.

To perform the translation from physical memory address to logical queue number, the buffering system contains a "programmable address translation unit." The programmable address translation unit is capable of performing arithmetic operations on physical memory addresses so as to convert the physical memory addresses into the correct queue numbers. The programmable address translation unit is capable of converting any physical memory address into a logical queue number via the means of arithmetic operations such as add, subtract, multiply, divide, shift left, and shift right operations and any other operations as deemed necessary in an implementation. The programmable address translation unit may also implement logical operations such as AND, OR, and masking operations.

In some cases the conversion of the physical address to the logical queue number can be quite straightforward. For example, it is possible that certain higher order bits of the physical address directly correspond to the queue number. In such a case, the programmable address translation unit may simply shift the high order bits to the right and mask off any other unnecessary bits. In other cases the physical address to logical queue conversion may be more complex and may require all of the above arithmetic operations.

In some embodiments, the programmable address translation unit may implement look-up table functionality. The programmable address translation unit may use a look-up table to perform address translations instead of arithmetic operations or in addition to arithmetic operations. The example of FIG. 6 can be implemented with a look-up table.

It should be noted that the reading of the physical memory address and performing the subsequent translation into a logical queue number can be used both when packets are being written to a memory system and when packets are being read from a memory system. This is because both memory writes and memory reads must both specify a physical memory address that will be operated on.

In many network devices, the network processor does not statically allocate the packet buffering memory among the different logical queues in such a straight-forward manner. Thus, other techniques need to be devised in order to infer which logical queue number amongst the number of queues is being accessed in such systems.

Interpreting Tag Data and Translation

In many network processor systems, the data packets are pre-classified and information about each data packet is written into a tag that is sent along with the payload of the packet by the network processor when the network processor writes the data to an external memory. In many systems, this tag information contains enough information to determine the appropriate queue number associated with the packet.

For such systems, a packet buffering controller may be designed with a "programmable extraction and merge unit" to extract the needed information. Specifically, the programmable extraction and merge unit would be programmed to look at the part or parts of the tag related to the packet's queue number, merge the required information from various parts of the tag and thus determine the correct logical queue number. This mode of operation has been named 'interpreting tag data and translation' since the packet buffering system has to look into the tag of the packet to identify the queue number and this tag arrives on the data bus between the network processor and the packet buffering system.

Note that this 'interpreting tag data and translation' technique can only be used to identify the logical address (i.e. queue number) when data packets are being written to a packet buffering FIFO queue in the packet buffering system. Additional methods are needed to enable the packet buffering system to determine the logical address (i.e. the queue number) when the network processors attempt to read a packet from a packet buffering FIFO queue.

Interpreting Address/Data and Searching: Supporting Packet Reads

Many legacy network processors store data packets in packet buffering systems that employ linked lists of free (available for use) memory. In such legacy network systems, the legacy network processor maintains the free memory location list and simply writes an arriving data packet (irrespective of the queue to which packet is destined to) to the next free memory location in the free memory list. Thus, in such systems, there is no direct correlation between a specific memory location and a specific logical address (queue number) as set forth in the earlier section on "Interpreting Address and Translation". Thus, additional methods of identifying a logical queue number may be required in order to create a packet buffering system that is able to map packets to logical queue addresses (queue numbers). As set forth in the previous section, in some systems the packet buffering system may determine the logical queue number of a data packet from tag data when the packet is written to memory.

In a free memory linked list based buffering system, a packet "X" stored in specific queue $Q_i$ is linked to the next packet in that queue by a memory pointer that points to the memory address of the next packet in the queue. Denote the memory pointer to the next packet as Next_Ptr (X). Generally, when a packet is written to the memory buffer, both the packet data (X) and the next pointer for the packet (Next_Ptr (X)) are written together. This section will describe how a buffering system may use the memory pointers to help identify the queue number for a packet when the packet is being read from a buffering system.

As set forth above, packets are written to the buffering system with both the packet and a memory pointer to the next packet (Next_Ptr (X)) in memory together. Note that the Next_Ptr (X) refers to the next pointer allocated by the network processor, however, the buffering system does not use the Next_Ptr(X) in making decisions on where to store the next packet for a given queue since the buffering system manages memory on its own. The packet buffering controller, however, still stores the Next_Ptr(X) along with the packet (X) when it writes packet (X) to external memory since the Next_Ptr(X) value will be needed later to identify the queue number during packet reads. When the network processor reads packets, it outputs the pointer allotted by it for the packet on the address line to the buffering system. The packet buffering system interprets this pointer on the address line, to help identify the logical queue number of the packet being requested.

To determine the logical queue number of requested packets, the memory pointer to the next packet (the 'next pointer') at the head of each queue is stored by the buffering system in an efficient search data structure along with an identifier of the logical queue number of the packet. The search data structure contains Q entries that each correspond to the pointer (as allocated by the network processor) to the packet at the head of each queue. Thus, to determine the logical queue number when a packet read request is received, the packet buffering controller compares the address for the read request with all the next pointers in the search data structure. When one of the entries in the search data structure matches, then the buffering system establishes the queue number of the packet that is being read. Thus, the packet buffering system accesses the packet at the head of the identified logical queue and returns that packet (call it "X") to the network processor. After packet "X" is returned, the next pointer of that packet, "Next_Ptr(X)" is extracted and used to overwrite, in the search data structure, the pointer to the packet that was returned.

Figure 7:
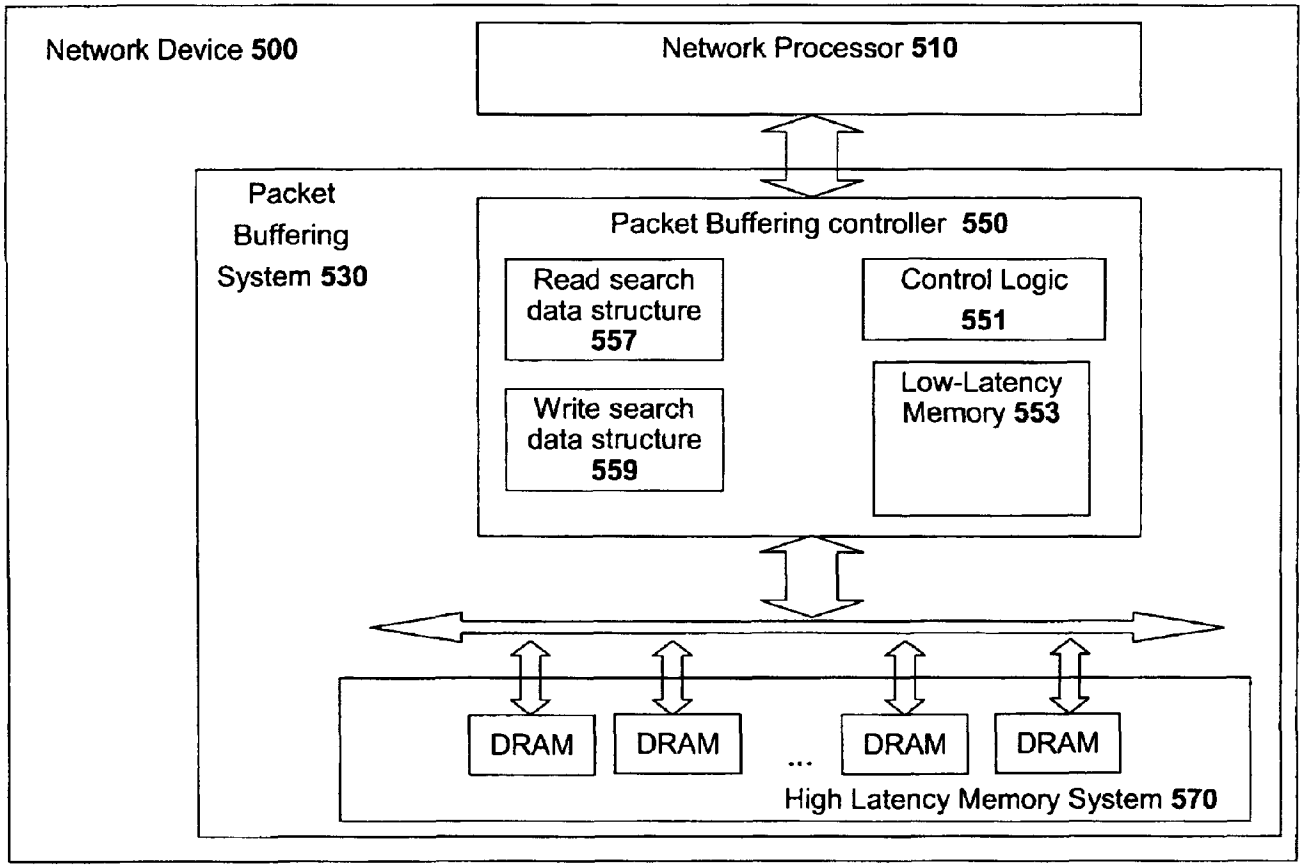
FIG. 7 illustrates a high-level block diagram of a packet buffering system that keeps track of packet queue head pointers with a read search data structure and packet queue tail pointers with a write search data structure.

FIG. 7 illustrates a high-level block diagram of a packet buffering system that implements the "Interpreting Address/Data and Searching" technique. In the packet buffering system of FIG. 7, the packet buffering controller 550 includes a read search data structure 557 that is used to store the head pointers for all of the logical queues. Although the read search data structure 557 is illustrated separate in FIG. 7, the read data structure may be implemented within the low-latency memory 553 of the packet buffering controller 550.

A number of different methods may be used to implement the search data structure 557. In one particular embodiment, a Content-Addressable Memory (CAM) device is used to store the next pointers of the head of line packets of each queue. A content-addressable memory provides a high-speed method of identifying the logical queue number of a packet that is being read. Many alternate data structures other than a CAM are also possible. In general any data structure that can do an exact match comparison will suffice.

Interpreting Address/Data and Searching: Supporting Packet Writes

The method described above can also be used to identify the logical queue number associated with a data packet that is being written to memory. Specifically, a buffering system can maintain all the "next pointers" of the packets to the tails of all the queues.

The implementation of tail pointer management is similar to the implementation of head pointer management. As with the head pointers, the tail pointers are maintained in a search data structure such as a CAM. Referring back to FIG. 7, a write search data structure 559 may be used to store the tail pointers. When a new packet and its associated next pointer are written to memory, the buffering system searches the write search data structure 559 for the address of the new packet. Since the new packet is being written to the tail of one of the queues, there should be one address in the write search data structure that will match the address of the newly arriving packet (If the address is not found within the write search data structure then the packet may be the first packet of a new queue as will be described later.). That matching address in the write search data structure 559 will have an associated queue number that specifies the logical queue that should receive the packet. The next pointer that accompanied the newly written packet is then used to replace the entry in the write search data structure 559 that matched.

The method of identifying logical queue numbers for packet reads or packet writes described above using the next pointer value does not specify how the queue number for the very first packet that arrives for any FIFO queue can be identified. Recall that the very first packet for a FIFO queue will not have any other packet pointing to it. Thus, when the very first packet for a new FIFO queue arrives, the network processor may simply allocate some location in memory for that first packet such that the buffering system will not be able to identify the logical queue number for that packet by simply looking at the write address for that packet. Such first very first packets for new FIFO queues can be handled as follows:

1. Initially, the search data structures (such as a content-addressable memory or CAM) for both the read side and the write side are empty.
2. When a very first packet for a new FIFO queue is received, the network processor will write that packet "X" along with its next pointer "Next_Ptr(X)" to address location "A(X)" allocated by the network processor for a new FIFO queue.
3. The packet buffering controller will compare A(X) with all the entries in the write side of the search data structure. Since A(X) is the very first packet for a new FIFO queue, no entry in the search data structure will match A(X).
4. Such a search data structure miss is interpreted by the packet buffering system as the arrival of a data packet to the head (as well as tail) of a brabd new FIFO queue.
5. Thus, the buffering system writes A(X) to the search data structure on the read side and writes "Next_Ptr(X)" to the search data structure on the write side. The buffering system also associates a new logical queue number to this packet for the new FIFO queue.

In this manner, the packet buffering system learns of the existence of all queues maintained by the network processor. The process is adaptive and the buffering system knows of a logical queue only when the packets to a given queue are added by the network processor.

Of course there could be other ways in which this information can be conveyed to the packet buffering system if the network processor is configured to co-operate with the packet buffering system. In one embodiment, the network processor could reserve some specific areas in memory for the first packet of every queue and convey that information to the packet buffering system at boot time. The packet buffering system can then use this information by translating the address of the first arriving packet for a queue and identify the queue number for that packet. In another embodiment, the buffering system can use the mechanism of "Interpreting Tag Data and Translation" (if that is an option) to identify the first packet of a new queue. Other mechanisms are also possible to solve this problem.

Thus, as set forth above, the technique of 'Interpreting Address/Data and Searching' can be used to identify the logical queue number both when data packets are being written to a FIFO queue and when data packets are being read from a FIFO queue in the buffering system. This technique of identifying the FIFO queues associated with an incoming packet only requires small search data structures in the packet buffering controller and relatively simple control logic.

Packet Buffering System Enhancements

A number of different techniques may be implemented to enhance the packet buffering system. This section provides a number of techniques that may be implemented to improve the performance of the packet buffering system.

Memory Mapped Queue Registers

It is possible for the network processor to convey to the buffering system the logical queue numbers for which a packet is destined to (or requested from) by the use of memory mapped queue registers. In such a system, the buffering system and the network processor co-operate so that separate queue registers are allocated for packets destined to different queues. These queue registers have unique addresses in the network processor's memory management subsystem.

For example, in one embodiment, the buffering system and network processor can co-operate in such a way that memory addresses Y to Y+Q can be reserved for writing to each of the queues, where Y is some memory address, the exact value of which can be configured by the network processor, and Q is the number of queues. Thus, if a processor writes a packet to memory location Y+10, then it is implied that that packet is destined for queue number 10. Queue reads can be performed in the same manner using the same memory addresses. Specifically, when the network reads from location Y+10, then it is implied that that packet should be fetched from queue number 10. Thus, the buffering system would just use the write or read signal to determine whether to add a packet to the queue or remove a packet from the queue, respectively.

Instead of using the same memory addresses for reading from the queues, the system may allocate a separate set of memory addresses for reading from packet queues. For example, a different set of memory locations between locations Z and Z+Q, may be reserved for reading packets from different queues. Again, Z is some memory address, the exact value of which can be configured by the network processor. Thus, a read from memory location Z+20 denotes that the buffering system must return the head of line packet from queue 20.

Burst Mode Writes and Reads to Queue Registers

There are many modifications possible to the memory-mapped queue register system as described above. For example, the there can be a block of addresses reserved for reading from or writing to a particular queue. This is to allow a series of quick consecutive reads or writes to that queue. For example, suppose a network processor needs to write n packets to the same logical queue. It would therefore be desirable to allow the network processor to burst and write all n consecutive packets to the n consecutive locations reserved for that queue in the packet buffering system. In an implemented system, there would be a limited number of consecutive memory mapped register locations for each queue specifying a maximum number of bytes that can be written consecutively.

This mode of writing to memory consecutively is generally referred to as "burst mode" writing and is common amongst many memory interfaces today. Burst modes are very useful for maximizing the bus bandwidth. In burst mode capable system, the network processor and buffering system may co-operate so that the memory mapped registers are between the range Z and Z+mQ. In the above example, addresses between Z+(i−1)m to Z+im, are reserved for queue number i. Thus the memory mapped registers are spread out so as to support a burst mode on the interface between the network processor and packet buffering controller.

Note that in an implementation, it is not necessary for there to be in reality as many registers as the number of queues. The registers are only "virtual" in the sense that the buffering system should be able to identify the queue numbers of the packets from the register addresses. Where a packet actually gets stored is an internal function of the packet buffering system and it does not have to physically have registers proportional to the number of queues.

Scratch Memory

In some network devices, the network processor immediately writes arriving packets to memory along with an identifier (ID) for each packet. Later the network processor classifies the hastily written packets and provides the logical queue number for the packet. Thus, it is possible that the queue number for a packet is not known immediately when a packet arrives, but is only available later after a classification has been performed. A buffering system that operates using logical queues cannot immediately store such packets into its normal packet buffer since the algorithms that the buffering system uses to manage its packet buffer relies on the knowledge of the logical queue number.

Figure 8:
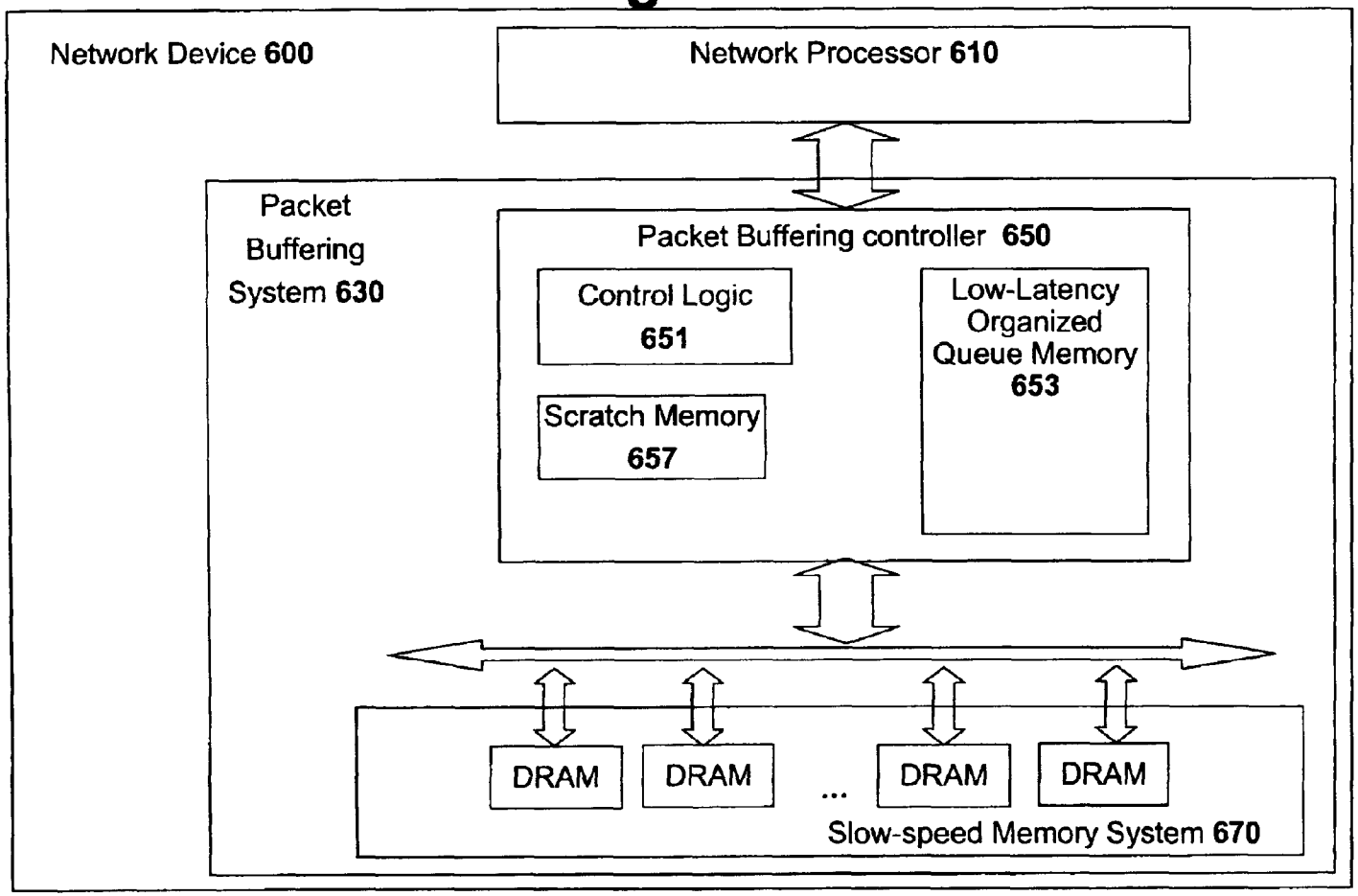
FIG. 8 illustrates a packet buffering controller that includes a scratch memory for temporarily storing data.

In order to facilitate such an implementation, a queue-based buffering system may use a small area of low-latency memory called the "scratch memory" that is used to store packets whose queue numbers are not yet known. Thus, every time a packet arrives, the network processor writes the packet and the ID for the packet into the buffering system. The packet buffering system correspondingly writes the packet into a scratch memory. FIG. 8 illustrates a packet buffering controller 650 that includes a scratch memory 657.

The packet buffering controller 650 stores the packet in the low-latency scratch memory 657 and stores the ID of the packet and a pointer to the packet (i.e. the address of the packet in the scratch memory) in a search structure. The search structure may be implemented with a content addressable memory or any other search structure that can handle exact matches. Later on, after the network processor has classified the packet and identified the queue number, the network processor will send information to the buffering system about the logical queue number for a specific packet ID. At that stage the buffering system will move the corresponding packet from the scratch memory 657 to the appropriate logical queue in the buffering system's internal low-latency memory 653 and remove the ID from the search structure. Normally, this means that the packet will be moved from the scratch memory 657 into the low-latency organized queue memory 653. Alternatively the packet may itself be physically left in the scratch memory and a pointer to it may be passed on to the memory management structures which manage the low-latency organized queue memory 653.

Note that there are various ways in which packet identifiers may be allocated. For example, it is possible for either the network or the buffering system to allocate the ID for a new incoming packet.

Asymmetric High-Speed Memory

In the paper entitled "Designing Packet Buffers for Router Linecards" it was shown that the low-latency memory systems for ingress and egress can be considered as symmetrical systems, and hence the amount of high-speed memory needed for the ingress low-latency memory is the same as the egress low-latency memory. However, it is possible to optimize the amount of low-latency memory needed for the ingress system, to no more than Qb bytes, (where b is the degree of parallelism of the high-latency memory system bus in bytes, and Q is the number of queues maintained by the packet buffering system as defined in paper entitled "Designing Packet Buffers for Router Linecards".).

This optimization may be performed since the buffering system only needs to make sure that the ingress low-latency memory system does not overflow before it fills up. In particular it can be shown that an algorithm, which replenishes the high-latency memory, which is work conserving when there are at least b bytes in any queue, will suffice at for the ingress low-latency memory system. In particular the earliest critical queue first (ECQF) algorithm as described in the paper "Designing Packet Buffers for Router Linecards", will suffice for the ingress low-latency memory system irrespective of the algorithm used for the egress ingress low-latency memory system. This observation can be used to significantly reduce the amount of expensive low-latency memory needed for the ingress low-latency memory system.

DRAM Over-speed

An increase of the high-latency memory access rate and high-latency bandwidth over the minimum required can be used to reduce the amount of expensive low-latency (SRAM) memory needed to construct the buffering system. For example, consider a system wherein packets arrive at a rate R bits/sec and leave the buffering system at a rate of R bits/sec. In a minimal implementation, the high-latency memory must be able to run at least twice the line rate, 2R, wherein R bits/s of the bandwidth are used for the write bandwidth and R bits/s of the bandwidth are used for the read bandwidth. However, in certain implementations with efficient memory design, the bandwidth between the buffering system and the external high-latency memory can be speeded up by a factor "s" (s>1) such that the total DRAM bandwidth is 2sR and the access time also is speeded up by a factor "s". The extra DRAM bandwidth and faster access time attained can be used to reduce the amount of expensive low-latency high-speed memory required.

Let a timeslot denote the time that it takes to receive a byte at a rate R. When there is no speedup on the high-latency interface of the packet buffering controller, then in "t" timeslots, no more than t/b queues could be serviced by the high-latency memory scheduler, where "b" is the number of bytes being written or read in parallel from the DRAM for each queue. However with a speedup factor of "s", as many as st/b queues can be serviced (i.e. t/(b/s) queues can be serviced). Thus the variable "b" can be replaced by "b/s" for the sake of analysis, when there is a speedup factor of "s".

The amount of high-speed memory needed in the egress low-latency memory as derived in the paper "Designing Packet Buffers for Router Linecards", was Qb(2+ln Q) bytes. Based on the observation in the previous section on asymmetric high-speed memory, the ingress SRAM only needs Qb amount of memory. Hence the total amount of high-speed memory needed without speedup is Qb(2+ln Q)+Qb=b[Q (230 ln Q)+Q] bytes. Replacing b by b/s for a buffering system which has speedup, the system is changed such that the total amount of high-speed memory required for both the ingress and egress low-latency memory when there is a speedup of s can be reduced to b/s [Q(2+ln Q)+Q]=b/s [Q(3+ln Q)].

Merged Head and Tail Low-Latency Memory System

In the original description of the packet buffering techniques set forth in the paper entitled "Designing Packet Buffers for Router Linecards", two different low-latency memory systems were described. A first low-latency memory system was described as an ingress low-latency memory system for managing the tails of the FIFO queues. A second low-latency memory system was described an egress low-latency memory system for managing the heads of the FIFO queues. In that description, there were certain data packets that were transferred directly from the ingress low-latency memory system to the egress low-latency memory system such that those data packets were never buffered in the slow-speed memory system. This shortened path from the ingress memory system directly to the egress memory system is referred to as a "cut-through" path.

Packets that follow the cut-through path are written into the low-latency memory systems twice, a first write into the ingress low-latency memory system and a second later write into the egress low-latency memory system. However, it is possible to eliminate the need for two separate low-latency memory system writes by having a single shared low-latency memory system where the packets are stored. With a single shared low-latency memory system, the efficiency of the cut-through path is improved by eliminating the transfer of data packets from the ingress low-latency memory system to the egress low-latency memory system.

To implement the more efficient cut-through path, the packet buffering system can simply transfer the pointers of packets that must use the cut-through path from the ingress queuing structure to the egress queuing structure. The packet buffering system leaves the actual data packets untouched in the same location of the shared low-latency memory system. The ingress queuing structure and egress queuing structure may implement standard memory management functions for packets residing in the buffering system. Specifically, standard memory management functions may be used to maintain the location of data packets, the associated linked lists, free lists, etc.

Efficient Use of External Memory

In certain embodiments of the packet buffering system, the packet buffering controller always allocates external memory in fixed sized memory blocks of "b" bytes. Thus, each packet buffering queue occupies an amount of memory that is always a multiple of "b" bytes in the external high-latency memory. When the number of bytes for a packet buffering queue is not an exact multiple of "b" bytes, the extra bytes may be stored in the low-latency memory. This method of operation is very different than most of the existing packet buffering systems. While existing packet buffering systems also read and write data packets to external memory in fixed sized blocks, those existing packet buffering systems pad the packet data with null data or zeroes when the packet data is not an exact multiple of the fixed sized block since the packets must immediately be written to memory when data packets arrive.

Also, multiple packets can be fitted into one block of "b" bytes, when the packet sizes are smaller than "b" bytes. This means that many packets will be efficiently stored in consecutive locations in memory, thus allowing a further reduction in the size of the control data structures and pointers needed to manage different packets.

The above embodiments allow the external memory to be used in an efficient fashion. In certain cases this efficient use of memory can increase the external memory utilization (i.e. the amount of memory used to store actual packet data) from as low as 50% to close to 100%.

Caching at Less Than 100% Hit Rate

In the packet buffering system described in the paper entitled "Designing Packet Buffers for Router Linecards", the high-latency memory controller for the buffering system accesses external memory at least once every $T_{RC}$ time units wherein $T_{RC}$ is the random cycle time of the high-latency memory. During that memory access, the buffering system accesses the external high-latency memory units and either reads or writes b bytes in parallel. However if b is large then the amount of associated low-latency memory (which scales linearly with b) required to ensure a 100% cache bit rate, may become impractical.

In such a case it is possible that these b bytes be shared amongst packets associated with different logical queues. For example it is possible to write b'=b/2 bytes to two separate logical queues with a time period of $T_{RC}$ provided that the bytes are written to two separate banks. The advantage of this method is that the value of "b" can be reduced arbitrarily, at the cost of increasing the probability of bank conflicts on the high-latency memory. An increased probability of a bank conflict on the high-latency memory means that there is an increased probability of a cache miss when the network processor requests a packet from the buffer chip. However, since the buffer chip has adequate bytes for every queue, the probability of such a cache miss is very low. This technique allows the packet buffering system to be able to decrease the value of "b" for the system. Since the amount of memory needed high-speed for the buffering system scales linearly with "b", this technique allows the buffer chip to support more number of queues for a fixed high-speed packet buffer size, at the slight penalty a very low probability of a cache miss.

Access Re-ordering and Over Allocation

When standard DRAM is used to implement the high-latency memory system in a packet buffering system, there are various DRAM artifacts that must be taken into consideration. One common DRAM artifact is a significant access penalty known as a "read-write turnaround penalty" on the DRAM bus that forces the DRAM memory controller to stall for a few cycles when a read is followed by a write or writes is followed by a read.

Since a packet buffering system should potentially support a packet read and packet write for every packet time slot, the sequence of accesses to external memory appears as $R_1W_1R_2W_2R_3W_3R_4W_4 \ldots$ That is, the memory accesses on the DRAM bus may appear as a read of b bytes, followed by a write of b bytes, followed by a read of b bytes, followed by a write of b bytes, and so on. Thus, this sequence of accesses results in a very low DRAM bus utilization due to the "read-write turnaround penalty" since the DRAM controller needs to stall after every memory access.

In a preferred embodiment, the memory accesses are re-ordered to minimize this penalty. For example, a preferred implementation would re-order the memory accesses in the previous example into the following sequence of accesses: $W_1W_2W_3W_4R_1R_2R_3R_4$. With that reordered sequence, the DRAM bus only needs to turnaround once (between access W4 and R1). Thus, the external DRAM utilization can be made much higher.

In the above re-ordered memory access sequence, the memory access that is delayed most is $R_1$ and it is delayed by three time slots. Suppose that the memory access $R_1$ corresponded to a request from queue number 5. Then it is possible that queue number 5 may face a cache miss because the read request $R_1$ arrived later. However, it is possible to alleviate this problem by over allocating bytes to the egress low-latency memory by more than the minimal Qb(2+ln Q) bytes needed for maintaining a 100% cache bit rate. Thus, the combination of over-allocation and access pattern re-ordering on the DRAM bus can be used to maintain 100% cache hit rate and at the same time be able to derive very high utilization on the external DRAM bus. The exact amount of over allocation required is dependent on how much re-ordering needs to be done on the external DRAM bus.

Memory with a Programmable Access Time

The packet buffering controller may be configured in such a way that it can be made to retrieve packets exactly at a pre-defined access time. In such an implementation, every time the network processor makes a request for a packet (or cell or byte) at time t, the packet (or cell or byte) will be made available by the buffer chip at exactly time t+x; where x is the programmable access time of the buffer chip.

In one particular implementation of the buffer chip, the value of x can vary from SRAM like access time (which at the time or writing is of the order of 4 ns), to a maximum access time of Qb/R seconds, where Q is the maximum number of queues supported by the buffer chip, b is number of bits transferred in parallel to the DRAM per queue by the buffer chip, and R is the line rate measured in bits/sec.

Memory with a Programmable Bounded Access Time

In the preceding section describing a memory with a programmable access time, the buffer chip ensures that the data is returned to the network processor at exactly time t+x (for a request made at time t). This occurs even though it is possible that the data is available to be returned to the network processor before time t+x. In an alternate embodiment, the buffer chip may be programmed to return data to the network processor as soon as possible provided that the buffer chip responds within at least x time slots of its being requested. This mode of operation is referred to as the "programmable bounded access time" mode of the buffer chip.

Parallel Packet Buffer

Most existing packet buffer implementations usually read or write packets (or bytes or cells) one at a time. The packet buffering system of the present invention describes a method where the buffer chip waits till it receives multiple packets (or bytes or cells) for the same queue. The collected packets for a queue are periodically bunched together and then written in parallel. Thus, all reads and writes to the external memory occur in parallel for a given queue and the method of operation described above is different than that of standard packet buffers.

Statistical Mode

In some cases the amount of memory required for the buffering system may become extremely large such that it is infeasible to cache packets either in on-chip or off-chip low-latency memory. In such cases the buffering system may revert into a statistical mode wherein packets are always stored in an external high-latency memory. Of course in this mode, the buffering system cannot prevent bank conflicts since multiple consecutive packets may need to be read from the same bank/(s) depending on the memory access pattern.

The buffering system may alleviate these bank conflict problems by using the high-speed low-latency cache memory (which was used previously to cache packets) as a temporary storage area for packet reads and packet writes. Specifically, the low-latency cache memory may be used to hold packets before writing them to the external high-latency memory (if there are memory bank conflicts) for packet writes. Similarly, the low-latency cache memory may be used as a storage area to queue packet requests before the packets can be read out from the external high-latency memory for packet reads.

A similar technique can be used with the interface to the network processor. Different data packets may face different delays when the data packets are read out from the slow-speed memory (possibly caused by memory bank conflicts while operating in statistical mode). Thus, the high-speed memory may be used as a space to re-order the data packet responses. In this manner, buffering system will send back packet response in the correct order to the network processor.

Enhancements and Optimizations Based on the Knowledge of Interfaces:

In the methods described above, the packet buffering system was only aware of the fact that there were Q queues. The packet buffering system was not aware of how these Q queues were derived nor the maximum arrival rate for the queues such that the packet buffering system was not able to use this knowledge in its internal design.

However, in most existing network devices, packets arrive to the network processor on various different interfaces having various different speeds that sum up to a total line rate of R. Depending on the manner in which packets are classified, a given queue may receive packets from only a subset of interfaces. Thus, the maximum arrival rate of packets for a given queue may be much less than R. Similarly, the maximum departure rate of packets from a given queue may be less than R.

In such a network system, certain worst-case traffic patterns as described in the paper entitled "Designing Packet Buffers for Router Linecards" cannot occur. Thus, the packet buffering system can use this knowledge to further reduce the size of the high-speed memory.

Consider for example, a simple packet buffering system where the total line rate is R and the total number of queues is Q. Furthermore, suppose that half the number of queues receive packets from half the number of interfaces at speed R/2 and the other queues receive packets from the remaining interfaces at rate R/2. Let the same be true when the packets are being read also. In such a packet buffering system, the external memory may be statically divided between the two sets of queues. Similarly, the egress low-latency memory can also be divided into two parts. The packet buffering module that replenishes the egress high-speed memory may be instantiated in two separate parts for each of the half set of queues separately. The size of the egress high-speed low-latency memory for each set of Q/2 queues is Y units, where $Y=b/2(Q/2)(2+\ln Q/2)$. So the total size of the egress high-speed memory for both the set of Q/2 queues is $2Y=Qb/2(2+\ln Q/2)$. This is less than the size of the egress high-speed low-latency memory for a system of Q queues which is $Qb(2+\ln Q)$. Similarly, the total ingress high-speed memory can be reduced to Qb/2 units.

Additional Features Beyond Packet Buffering

Although the core goal of the packet buffering system is to provide a very efficient yet inexpensive packet buffering, the packet buffering system can be used to implement additional features beyond simple packet buffering. This section describes additional features that may be implemented with a packet buffering system.

Lookup and Classification Functions

To provide additional functionality and reduce the workload of the network processor, a buffering system may provide some limited packet processing features. For example, a buffering system may implement packet lookup and/or packet classification functions. The packet lookup and classification functions may be able to identify the queue to which a packet belongs. In such a system, the packet buffering system would also store the packet into the appropriate logical queue without any direction needed from the network processor.

Service level classification is one packet processing feature that may be implemented in a buffering system. Internet protocol (IP) packets contain type of service (TOS) bits that identify a particular service level that should be given to the packet. A sophisticated packet buffering system could be implemented which examines the type of service (TOS) bits. classifies the packet according to its type of service, and then place the packet into an appropriate queue for that type of service.

A buffering system may also implement various packet look-up functions. Many packet classification systems require that a network device use a portion of a packet as index value into a look-up table in memory. Such memory-based look-up tasks are natural functions to implement within a buffering system that is largely comprised of memory. Examples of memory table look-ups that may be performed by a buffering system include the complete route lookup, the MAC address lookup, the MPLS lookup, or, in some cases, an access control lists (ACLs) look-up. In some cases the lookup function may simply be a hash of certain fields in the packet header. These various look-up functions may be used to identify the queue number for a given packet.

Packet Dropping Overview

Various data communication protocols allow data packets to be dropped when necessary. In such protocols, the data packets may be dropped even though the packet buffer of a network device is not completely filled. Packets may be dropped in order to provide a crude flow control mechanism as a response to severe congestion.

There are number of different established packet dropping policies that are used when dropping packets. Examples of packet dropping policies include the random early discard (RED) system, the weighted random early discard (WRED) system, and the CHOose and Keep for responsive flows (CHOKe) system. An embodiment of the buffering system of the present invention may include an implementation of any or all of these packet dropping policies. Other packet dropping policies may also be implemented. These packet dropping policies may be implemented either within the buffering system or externally in a network processor.

Packet dropping may occur at different times during a packet's journey through a network device. Packets may be dropped upon arrival to a buffer buffering system with a technique known as called 'tail drop' since the packets are dropped before the packets are added to the tail of a FIFO queue. Alternatively, a packet may be dropped after the packet has buffered in memory in a technique known as 'head drop' since the packets are dropped from the head of the FIFO queue just before the packet is transmitted out. In some rare cases, packets may be dropped while waiting in a memory buffer with a technique known as 'body drop' since the packets are removed from somewhere in the body of a FIFO queue.

Embodiment of the buffering system of the present invention may implement any or all of these three different packet dropping techniques. In a tail drop implementation, the buffering system makes a packet dropping decision before placing a packet onto a queue. Ideally, no memory operation will be performed when tail dropping occurs. In a head drop implementation, the buffering system will drop packets from the head of a FIFO queue. Since the head of line packet for all queues is always stored by the buffering system in the low-latency memory, such packets are simply dropped by discarding the packet from the internal low-latency memory. Finally, a buffering system embodiment that implements the body drop technique will likely drop packets from the high-latency memory used to store packets in the main body of a FIFO queue. Each of these three different packet dropping techniques has its own intricacies.

Tail Drop Packet Dropping

Implementing a tail drop system within a buffering system is relatively straight-forward. For example, a packet dropping policy may be immediately applied to arriving packets to determine which packets need to be dropped such that the dropped packets may not even be sent to the buffering system. In some cases if the packet has already been written to the buffering system and the network processor then decides to drop the packet later, then the buffering system will have to discard the previously written packet from the ingress low-latency memory to drop the packet. The buffering system may intelligently drop the packet based on the occupancy of the queue corresponding to that packet or some other parameter associated with that queue. For example, a queue that is designated to carry packets that have a low priority will be a candidate for dropping a packet, during times of congestion.

Head Drop Packet Dropping

The buffering system should also be able to drop packets from the head of a queue to implement 'head drops.' When a head drop occurs, the packet that is at the head of a queue (and hence will be in the egress low-latency memory of the buffering system) will be dropped when requested by the network processor from the egress low-latency memory. Again, a head drop can be performed in an intelligent manner by the packet buffering system based on its knowledge of the occupancy of the queues, the queue service rates and other parameters.

Performing a head drop can cause problems if not implemented carefully. For example, difficulties may arise when a number of packets that have previously been written to the high-latency memory are also cached in the egress low-latency memory. When such packets are dropped, this will have in effect wasted the external available memory bandwidth between the buffering system and the high-latency memory. This wastage of high-latency memory bandwidth can negatively affect the high-latency memory replenishment algorithm. Specifically, if a packet read from a queue occurs shortly after a head drop from that queue, a cache miss in the egress low-latency memory may result since there is insufficient time to replenish the egress low-latency memory from the high-latency memory.

There are number of ways of solving this problem this possible cache miss problem. Two specific solutions are hereby presented:

1. Over Allocation: Over allocation is the process of keeping more packets in the low-latency memory than what is strictly necessary. For example, the packet buffering system can be designed to store more than b(2+ln Q) packets for each queue in the egress low-latency memory. Having these extra packets will help alleviate the problem of head drops.
2. DRAM Over-speed: Another way to alleviate the problem of cache misses because of head drops is to design the system with a higher bandwidth and access rate on the interface to the high-latency memory system. The higher bandwidth and access rate to the high-latency memory enables the buffering system to retrieve packets at a rate equal to the sum of the rates at which packets are being read and being dropped from the head of the queues.

Body Drop Packet Dropping

Finally, a body drop occurs when packets are dropped from the middle of a given packet queue. This is possible when implementing packet dropping policies such as CHOke. If desired packet to be dropped resides either in the ingress low-latency memory or egress low-latency memory, then the packet is silently dropped from the low-latency memory of the buffering system.

However, a body drop will likely involve dropping a packet that currently resides within the high-latency memory. One technique of dropping packets that reside in the high-latency memory is to wait until the packet is read from the high-latency memory before and then dropping the packet at that time. In order to perform such delayed packet dropping, the buffering system may maintain a queue of identifiers of outstanding packets-to-be-dropped. When a packet listed in that packets-to-be-dropped queue is read from the high-latency memory, the packet is dropped and the corresponding identifier is removed from the packets-to-be-dropped queue. Body drops may also be performed in an intelligent manner as described above.

Memory Management

Along with the maintenance of packet data queues, the packet buffering system may also maintain additional data structures needed by a network processor. For example, the packet buffering system may maintain data structures such as free memory lists, queue linked lists, calendar queues, and other memory-based data structures for the network processors. This section describes how the packet buffering technique can be used to implement such data structures.

Managing linked lists is very similar to managing FIFO queues. The only significant difference in managing any form of link lists is that the previous element is linked to the next. Thus, elements in a linked list are always maintained as FIFO queues. Each element usually has some entry value and a next pointer that points to the next element in the FIFO.

1. Algorithm Description: The problem with linked lists is that if an element X is written to off chip memory (DRAM) and element X+1 comes later and is added to the tail of a FIFO, then the system must ensure that element X points to the new element X+1. However this will be a problem because element X has already been written to off chip high-latency memory and such that it cannot easily be modified once again. This problem is solved via memory "pre-allocation". Thus for every linked list, locations in memory are always pre-allocated. Call the pre-allocated location "P". Then whenever the tail element of a FIFO is written to off chip high-latency memory (such as DRAM), then it is written with the next pointer of that tail element pointing to location P. In this manner, when a new element (X+1) arrives to the tail of the linked list, that element is simply written to location P directly. Of course when the new element (X+1) arrives another pre-allocated value is used for its next pointer.
2. A second approach that does not use pre-allocation is the following. In this approach the system waits for element X+1 to arrive before element X is written to DRAM. This has the effect that the width of memory access to DRAM remains the same as before, but the size of the high-speed memory required needs to increase so as to allow for the additional element X+1 to arrive before element X can be written to high-latency memory. From an analysis perspective, suppose that "b" was the width that the system uses to write to high-latency memory (DRAM) from any given linked list (as defined in the paper, "Designing Packet Buffers for Router Line Cards"). Let b be in units of the size of an element of a linked list. Then, when calculating the size of the high-speed memory (SRAM), b is replaced by b+1; in order to account of the additional linked list element that must be buffered before the system can start writing element X to the high-latency memory (DRAM).

Thus, as set forth above, in order to manage any linked list using high-latency memory (DRAMs) the linked list is handled as a FIFO by applying the same method as that used for FIFO management provided that the system implements one of the two modifications listed above.

There are many other techniques that can be added to this scheme. For example, while maintaining free memory lists, it is a common technique that the location freed due to a "read from head" operation can be used for the next incoming, "write to tail" operation.

Intelligent Memory Allocation and Management

The packet buffering controller may allocate and manage the size of the external memory allocated for each queue. In one embodiment, the packet buffering controller contains a "programmable queue memory manager" that can be configured to manage the external memory to be shared amongst the different packet queues. Three different modes have been proposed for packet queue memory allocation: Static Allocation, Dynamic Allocation, and a combination of Static and Dynamic allocation.

In a Static Allocation mode, each queue is allocated a pre-defined amount of external memory to store its packets. The amount of pre-defined external memory allotted for each queue can be programmed into configuration registers on the packet buffering controller. One advantage of the static allocation approach is that every packet queue is assured of a minimum amount of memory. However, since the memory is statically partitioned up front, each packet queue can only utilize a subset of the external memory.

In a Dynamic Allocation mode, the packet buffering controller shares the external memory amongst packets of all different queues on a first-come-first-serve basis. The advantage of dynamic allocation is that packets from any queue can utilize the available external memory fully. However, one potential problem with the dynamic allocation mode is that if there is any one queue that becomes congested, then the entire external memory may become filled with packets for that congested queue. Thus, without careful flow control or packet dropping, one congested queue may prevent other queues from being able to use the external memory.

A final memory allocation mode uses a combination of the static and dynamic allocation modes. In the combined allocation mode the packet buffering controller allows part of the external memory to be statically allocated and part of the memory to be dynamically shared amongst all the queues. Thus, each queue can be guaranteed a minimum amount of space for the external memory (with the static memory allocation) but the packet buffering controller may use the remainder of the memory that is dynamically allocated to be shared amongst all queues. In such an implementation, packets arriving for a queue are always first allocated memory from the static allocated memory section for that queue if it is available. Only when the statically allocated memory for that queue is full, are packets allocated to the dynamically allocated part.

The packet buffering controller may also support more complex memory allocation policies depending on the occupancies of the queues, the type of queues, other statistics, etc.

Permanently Cached Memory

The packet buffering controller may allow part of its low-latency memory to be cached permanently. Specifically, that part of the memory is never written to the high-latency memory (such as DRAM). In a sense the permanently cached memory can be used as a low-latency high-speed memory by the network processor to perform reads and writes which have a random access.

Monitoring, Statistics and Reporting

Since the packet buffering controller sees every packet that passes through a particular network device, the packet buffering control can be programmed to maintain and report statistics about the packet flow through the network device. For example, the packet buffering controller may keep track of information related to the state of its packet queues, the occupancy of the internal and external memory, the occupancy of the individual queues, average latency faced by packets in individual queues, and other relevant operating statistics.

Since certain statistics may provide critical information on the performance of the network device, the packet buffering controller can also be made to implement interrupts that report such critical information. The interrupts may report critically important statistics to the network processor (via the memory or alternate interface to the network processor) or a separate management processor—such as a processor on the control plane (via a separate management interface such as PCI or PCI Express etc.) Examples of critical information that may be reported include whether the memory is full or almost full, whether packets are being dropped above a certain threshold rate, and soft errors on the external memory. The statistics maintained by the packet buffering controller may not only track the current state of the memory subsystem, but also track the history of the memory subsystem.

Packet Scheduling

Until now the packet buffering system was designed to accept packets in any order and to read packets out in any order as described by the network processor. However, it is possible for the buffering system to perform the packet scheduling task and implement packet scheduling algorithms such as round robin (RR), weighted round robin (WRR), deficit round robin (DRR), etc. If the packet buffering system implements packet scheduling, then the packet buffering controller may mandate the order in which packets must be read out of the packet buffer. This leads to many enhancements—

1. The task of packet scheduling requires knowledge about of the state of the packet queues, the occupancy of the queues, etc. This information is already available and maintained by the buffering system. The buffering system can maintain accurate and comprehensive statistics about the packet buffer as described in the section, "Monitoring, Statistics and Reporting". Since these statistics also track the history of the memory subsystem, the scheduler can make more informed and better scheduling decisions than a network processor.
2. If the packet buffering system does implement packet scheduling, then it knows the order in which the packets are read out from the buffering system.

This knowledge of the read order can be used by the scheduler to use the low-latency memory more efficiently such that less than Qb(2+ln Q) bytes is required for low-latency egress memory. In one embodiment the packet buffering system can reduce the high-speed memory required to as little as Qb bytes.

3. Since the buffering system mandates the read order of packets (rather than the network processor) this means that the bus utilization on the interface between the network processor and the buffering system can be significantly improved. In particular, the network processor does not need to specify a read packet command nor specify what packets need to be read. A continuous stream of packets can be sent from the buffering system to the network processor on a separate data bus thus increasing the bus efficiency on that bus to almost 100%.
4. If the packet buffering system is made aware of which queue(s) are derived from which physical interface(s) on the chip, then the packet buffering system can pass that information to the scheduler. This will allow the scheduler to implement complex scheduling operations such as a get_next_packet_from_interface( ) operation that will identify and return the correct next packet from amongst a set of queues that are tied to a given interface. The scheduler can also use this knowledge of the mapping between queue(s) and interface(s) to implement the scheduling algorithm in a more efficient manner.

In addition to scheduling the buffering system may perform other related tasks such as packet policing, shaping etc.

Packet Buffering System Programming and Configuration

The packet buffering system of the present invention may be used in many different network devices such as switches, routers, etc. The memory size and memory speed requirements for each particular network device will vary. Therefore, it would be desirable to create a general purpose packet buffering system that may be customized for a particular application by configuring some parameters. Thus, the packet buffering system must have some type of interface that can be used to configure the packet buffering system.

Programmable Memory Controller

In a preferred embodiment, the packet buffering controller is a user programmable memory controller that may be configured to operate in many different modes for many different applications. Ideally, the programmable memory controller has the functionality to mimic different kinds of SRAM interfaces such that the packet buffering controller of the present invention could be used with various different network processor designs that are accustomed to various different memory interfaces. For example the total number of queues, the access time, the pipeline depth, the use of ECC bits on the bus, the SRAM bus protocol, and other interface parameters should be programmable into the memory controller on the packet buffering system so that the packet buffering system can mimic almost any existing memory interface on a network processor.

When the packet buffering system of the present invention is inserted into an existing board in a slot occupied by a conventional SRAM memory (or any other high cost memory), the packet buffering system must be able to exactly mimic the functionality of the existing conventional memory device. Thus, the packet buffering system will need to be programmed with knowledge of the number of queues, the method by which the queue numbers of the packets may be derived, etc. This programming of the packet buffering controller may occur during a boot phase of the network device. The following sections will describe various techniques that may be used to program the packet buffering system.

Programming via a Dedicated Programming Interface

One method of providing a programming interface for packet buffering system is to provide a dedicated programming interface to the packet buffering system. In some implementations, an existing board memory board that is being emulated may already contain a well-established programming interface that may be used such as PCI, Hypertransport, or any other interface that can be used to program the packet buffering controller.

Programming Inline via the Memory Interface

The memory interface between the buffering system and the network processor can itself be used to program the packet buffering system. In such an embodiment, a predefined block of memory addresses on the packet buffering system are reserved for programming the packet buffering system. This reserved block of memory addresses can also be made available as memory-mapped locations to the network processor. In an embodiment that uses the memory interface for programming the packet buffering controller, the network processor downloads at boot time the instructions used to program the packet buffering controller to these memory-mapped locations. After programming the packet buffering system, the network processor may then begin to use the packet buffering system in its normal mode (reading packets from and writing packets to the FIFO queues).

Automatic Programming via Flash Memory

In some cases the network processor may not be geared towards being able to program the buffering system. Specifically, in network devices wherein the network processor is a hard-coded ASIC, the network processor may expect to use all the memory addresses in its SRAM address space to write and read packets, thus preventing the buffering system from being programmed via the memory interface. Similarly, in the embodiments wherein the buffering system is designed as a drop in replacement, the network processor may not support a programming interface such as PCI or hyper-transport.

In such cases, it is necessary for the packet buffering system to be pre-programmed or be able to program itself without any assistance from an external device. One method of allowing the packet buffering system to be pre-programmed is to provide an area of programmable flash memory. The flash memory could be internal to the packet buffering controller. With internal flash memory, the packet buffering system automatically downloads the program from its internal flash memory and programs itself at boot time. In an alternate implementation, the flash memory is kept external. With an external implementation, the packet buffering system would have a special "flash memory to buffering system" interface that the buffering system uses to download the program at boot time.

FPGA Implementation

To quickly create a packet buffering controller without spinning an Application Specific Integrated Circuit (ASIC), the packet buffering controller may be implemented with a field programmable gate array (FPGA) version of the buffering system. With a FPGA implementation, it is easy to customize the packet buffering controller, program the number of queues, program the interfaces, an other aspects for each specific line card separately and enable a drop in replacement on existing line cards. An FPGA version of the packet buffering controller chip may also use a flash memory for programming as described since is it not trivial to create many similar but slightly different versions of the same logical design. The advantage of a flash memory when using an FPGA is that the whole logic for the FPGA need not be changed and downloaded into the FPGA, every time there is a change in a configuration parameter such as number of queues, pipeline access delay etc.

Configuring the Total Number of Queues

One of the key aspects of performing packet buffering chip is to determine the total number of queues that need to be supported. Knowing the number of queues allows the packet buffering system to allocate its memory resources in an efficient manner.

The packet buffering system may determine the total number of queues in multiple ways. In some embodiments, the packet buffering system may simply be informed about the total number of queues that must be supported. The packet buffering system may have the number queues pre-programmed into it using flash memory (internal or external) or other nonvolatile memory. Alternatively, packet buffering may be informed of the number of queues during boot time. The buffering system needs special mechanisms to be able to receive this information. For example, the total number of queues may be written to a register in the buffering system. The source of this information may be the associated network processor, a control plane processor, or any other device. The queue number may either be conveyed directly or indirectly via a series of operations.

The packet buffering system may also learn the number of queues in an adaptive manner. For example, in the section "Interpreting Address/Data and Searching", a method of determining the appearance of a new queue was disclosed. Specifically, if the network processor attempted to write a packet to an address that was not stored in the read search data structure then the packet buffering system would allocate a new queue for that packet.

Testing for Memory Emulation

When a network processor is aware of the presence of a packet buffering system (as opposed to a normal memory system), the network processor can run tests that are specific to the packet buffering system at boot time. However, when a packet buffering system is made available as a "drop-in replacement" for a normal memory system, the network processor may be unaware of the fact that a packet buffering system is present such that it may treat the packet buffering system as a high-access, low-latency memory such as SRAM. This lack of knowledge about the packet buffering system may cause problems that need to be addressed. For example, in most network devices, the network processor will perform tests on the memory interface at boot time to ensure that the memory is operating properly.

The memory tests performed by a network processor on memory may comprise a series of reads and writes on the memory interface that are not FIFO queue reads and FIFO queue writes. Typically, the memory test writes and reads may be sequential writes followed by sequential reads; or some other pattern of writes and reads. If the packet buffering system in a network device does not respond properly to the tests, then the network processor may presume that the memory system is damaged (even if the packet buffering system is operating properly).

To prevent this situation, the packet buffering system may include a memory test emulation unit. The memory test emulation unit should be programmed with the knowledge of any memory tests performed by the network processor such that the memory test emulation unit may provide the proper responses. The memory test emulation unit may be informed of the memory access pattern, the start and end addresses, and any other details of this memory access pattern used by the network processor to test the memory system. The memory test emulation unit uses the information about the memory test access patterns to provide a proper response to the memory tests. For example, the memory test emulation unit may pre-fetch the memory locations that will be read back by the network processor into low-latency memory so as to emulate a standard high speed low latency memory.

For example, the memory test pattern may simply consist of the network processor writing to all even memory locations in sequence, reading hack from the even memory locations, and then comparing the value written with the value read back to ensure that the write and read values match. This even memory location test could be followed by a similar test on the odd memory locations. If the memory test emulation unit is informed about this test pattern then the memory test emulation unit can easily pre-fetch a part of the even memory locations, (when the even locations are being tested) and store it in its high-speed low latency memory such that the even memory locations that are accessed in sequence are always available when requested by the network processor while testing. Similarly, the memory test emulation unit can do the same when the odd memory locations are being tested.

Packet Buffering Board Design and Packaging

As set forth early in this document, it may be desirable to provide an intelligent buffering system to existing network devices without requiring significant changes (or no changes at all). For most existing network devices, the physical and electrical interface to the packet buffer has already been designed and the network processor expects to use the packet buffer in a specific way. Thus, the packet buffering system may wish to emulate the electrical and physical characteristics of existing packet buffers implemented with conventional memory. In addition to such backwards-compatible designs, there are many other methods of packaging the packet buffering systems that provide unique advantages. This section sets forth various embodiments for packaging the buffering system.

Hybrid Memory Device

In a first packaging embodiment, it is possible to uses the teachings of the present invention to create a new kind of discrete hybrid memory device. The hybrid memory can be considered to be a high density SRAM or a low-latency DRAM i.e. this new memory can give the fast access time of an SRAM and the high density of a DRAM. To provide backwards compatibility, the interface of the hybrid memory may be the same as a standard SRAM interface.

Such a hybrid memory device can be created by taking a standard DRAM memory core and adding a small amount of the buffer cache (which will be SRAM) to the core along with the necessary packet buffering control logic. The interface of the hybrid memory will be a standard SRAM interface. The packet buffering control logic implements the replenishment algorithms that move data between the internal SRAM cache and the internal DRAM core such that needed packets are always available in the SRAM cache of the hybrid memory when requested.

Virtual SRAM SIMM or Virtual SRAM DIMM

Figure 9A:
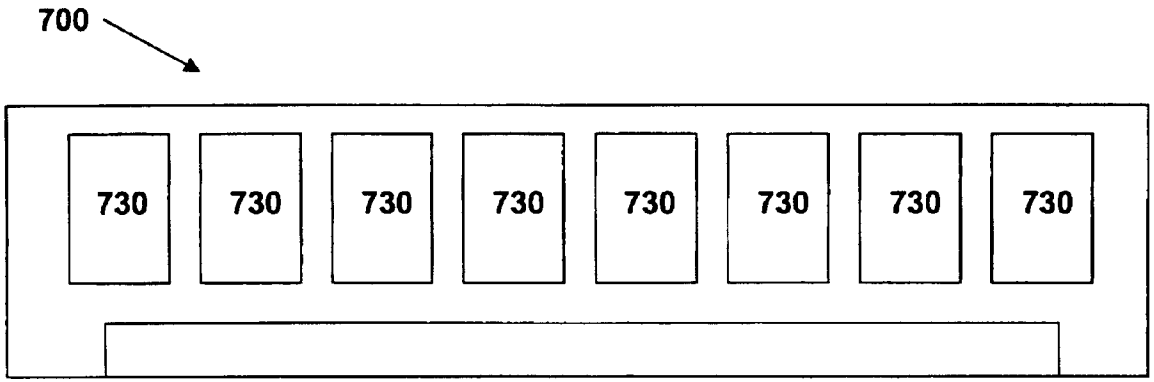
FIG. 9A illustrates the form factor of a typical Single In-line Memory Module (SIMM) device.

SRAMs are often packaged as Single In-line Memory Modules SIMMs) and Dual In-line Memory Modules (DIMMs). For example, an SRAM SIMM may contain eight identical SRAMs mounted on one side of a small printed-circuit board. FIG. 9A illustrates an example of such an SRAM SIMM 700 comprising eight SRAM chips 730. A similarly configured SRAM DIMM may comprise sixteen identical SRAMs wherein eight SRAMs are arranged on one side of the DIMM, and the other eight SRAMs are arranged on the other side of the DIMM. An SRAM SIMM or DIMM has the property that all the chips within the SIMM or DIMM may share the address bus, while having separate data busses. SIMMs or DIMMs are popular ways to increase the width and density of the memory subsystem available. Many network devices that require large amounts of low-latency memory for high-speed packet buffering use such SRAM SIMMS and SRAM DIMMs.

Figure 9B:
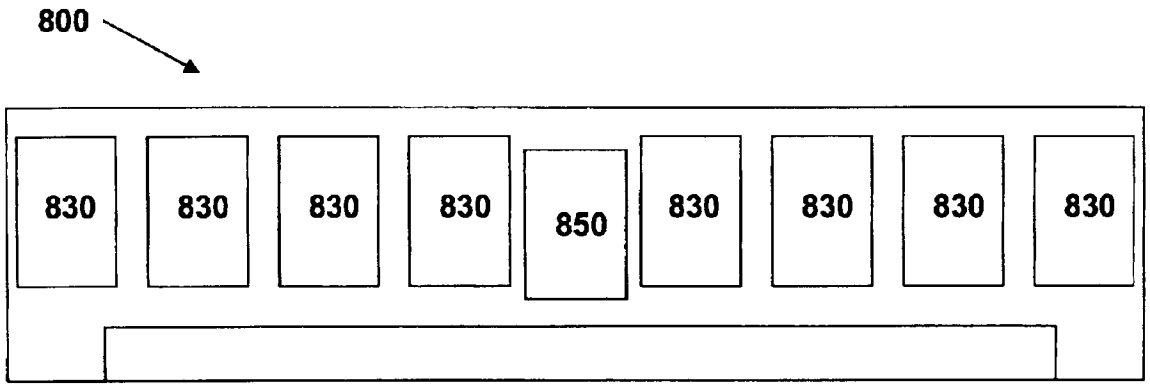
FIG. 9B illustrates a packet buffering system implemented within the form factor of the Single In-line Memory Module (SIMM) device illustrated in FIG. 9A.

With the teachings of the present invention, a single intelligent buffering controller and multiple DRAM chips can be made to appear as a very large SRAM memory bank for packet buffering purposes. Thus, it is possible to package an intelligent buffering controller along with several DRAMs to create a "virtual SRAM SIMM" for packet buffering applications. For example, FIG. 9B illustrates one example of a virtual SRAM SIMM constructed with an intelligent buffering controller 850 and eight DRAM chips 830. Similarly, an intelligent buffering controller can be packaged along with several SRAMs mounted on both sides of the printed circuit board to create a "virtual SRAM DIMM". Note that any number of DRAM chips may be used on the virtual SRAM SIMM printed circuit board.

Such a virtual SRAM SIMM would have the advantage of being less expensive and providing greater amounts of packet storage capacity. When creating a virtual SIMM the address and data bus from the network processor to the virtual SIMM are connected only to the intelligent buffering controller on the SIMM. The intelligent buffering controller is coupled to the multiple DRAM memories on the printed circuit board in a manner that is not visible to the network processor.

SRAM Multi-chip Module

Another packaging option instead is to construct a virtual SRAM Multi-Chip Module (MCM). A multi-chip module is an enclosed packaged electronic device that incorporates more than one integrated circuit die. A virtual SRAM multi-chip module would contain an intelligent buffering controller chip and multiple DRAM chips. Similar to the virtual SIMM or virtual DIMM described above, the virtual SRAM multi chip module contains the same combination of chips as above; it is only the packaging that changes when creating a multi-chip module.

Note that the number of DRAM chips that reside behind the buffering system may need to be reduced in order to fit the DRAM chips along with the packet buffering controller into a single virtual SRAM multi chip module. This reduction in DRAM memory may be required since multi-chip modules are usually smaller in size than SIMMs or DIMMs

Programmable Virtual/Real SIMM DIMM/Multi-chip Module

In the previously described virtual SIMM or DIMM and virtual SRAM multi chip modules, there is no direct path between the DRAMs and the network processor. Instead, the network processor is only connected to the intelligent packet buffering controller and that intelligent packet buffering controller performs all accesses to the DRAMs.

However, it may be desirable to have the network processor be able to directly access the DRAM memory devices for various reasons. Hence, it is possible to design the virtual SIMM/DIMM as well as the multi chip module in such a way that the network processor can also directly address the DRAM memory devices in the background. This gives the network line card designer maximum flexibility in using the memory subsystem. Thus. if the network processor addresses the intelligent buffering controller then the memory subsystem appears like a virtual SRAM SIMM, virtual SRAM DIMM or virtual SRAM multi chip module. Alternatively, if the network processor directly addresses the DRAMs that are normally behind the buffering controller, then the memory subsystem appears like a standard DRAM SIMM, a DRAM DIMM, or DRAM multi-chip module.

Use of External SRAM

In each of the packaging mechanisms described above, the intelligent buffering controller contains on-chip low-latency (such as SRAM) memory. However, it may be desirable to put the high-speed memory for the buffering system off-chip. This is especially true when on chip high-speed memory occupies a large amount of the space on the die for the packet buffering system.

Figure 9C:
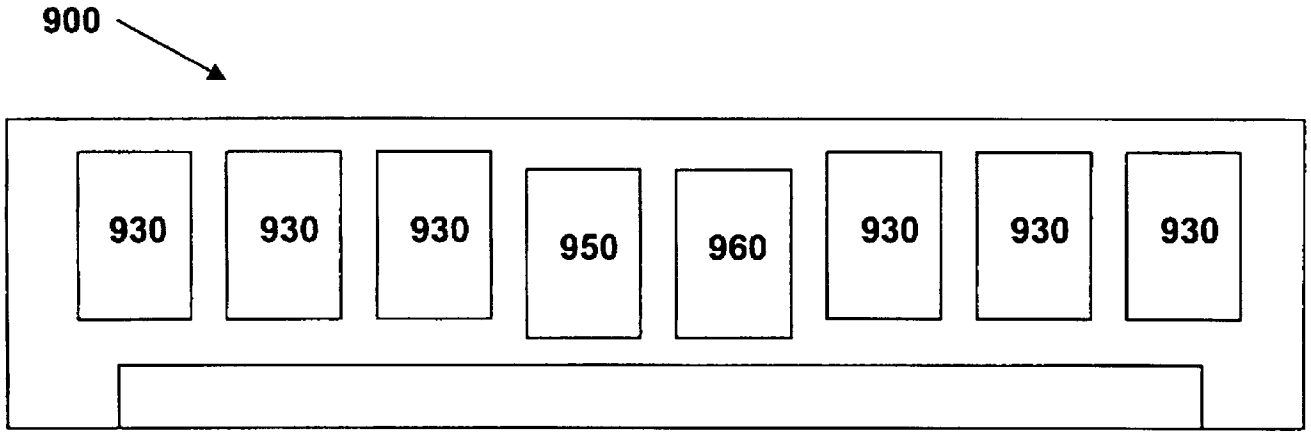
FIG. 9C illustrates a packet buffering system that uses a discrete SRAM implemented within the form factor of the Single In-line Memory Module (SIMM) of FIG. 9A.

FIG. 9C illustrates an example virtual SRAM that comprises one intelligent buffering controller 950, one low-latency (such as SRAM) memory 960, and six DRAMs 930. The SIMM illustrated in FIG. 9C provides the access time of an SRAM and has the density corresponding to that of six DRAMs. The external low-latency (such as SRAM) memory 960 design as set forth in FIG. 9C may also be used when packaging the chip in either of the virtual SRAM DIMM and virtual SRAM multi-chip module options.

Intelligent Memory Expansion Board

One or more packet buffering controller(s) and a large number of DRAMs and or external SRAMs (if the needed SRAM memory is too large to fit onto the single buffering die) may be mounted onto single printed circuit board referred to as an 'intelligent memory expansion board'. The intelligent memory expansion board may be dedicated to having only packet buffering controllers and the associated memories for these packet buffering controllers.

Such an intelligent memory expansion board can be made available as a separate line card to an existing switch or router system. Similarly, such an intelligent memory expansion board may be provided as an expansion daughter card that may be used within existing network line cards. The line card or the daughter card may be designed with standard or proprietary interfaces, which can supports very large, read and write bandwidth. Such stand-alone intelligent memory expansion board is a useful way to package and make available additional memory that provides SRAM speed performance with DRAM density for network designers.

Packet Buffering Interface

The design of the interface between the packet buffering controller and the network processor is very critical. Every effort should be made to maximize throughput on that interface. This section describes various techniques that may increase the bus efficiency, support multiple threads or contexts on a network processor, and simplify the programming complexity on a network processor.

Stream Based Interface

In most network devices, the network processor communicates with memory in blocks of a fixed size. For example, when the network processor receives a packet (which may vary in size), the network processor may split the variable sized packet into multiple fixed sized cells. The network processor then writes these fixed-sized cells to memory. Similarly, when packets are read from memory, the network processor reads the variable size packet in fixed sized cells.

This process of breaking up variable sized data packets and writing these packets as fixed sized cells causes some inefficiency on the network processor's memory interface. In the worst case, when packets are split into fixed sized cells of constant size of "x" bytes, it is possible to receive data packets that are "x+1" bytes such that the data packet will occupy two "x" byte cells. In such cases, the memory bus utilization can be as low as 50%. In one embodiment, the packet buffering controller alleviates this potential memory bus inefficiency problem by allowing the network processor to read and write streams of data in a raw format without mandating the network processor to split variable size packets into fixed size cells.

The stream based interface may be improved even further by allowing the network processor to bundle together multiple packets so as to write or read bundled packets together from the buffer chip. This bundling of packets across a stream interface further increases the bandwidth efficiency on the interface between the network processor and the packet buffering controller.

Indirect Reads

In order to further increase the bus utilization between the network processor and the packet buffering controller, the network processor may send 'indirect read' commands to the packet buffering controller. In order to perform an indirect read, the network processor sends a command to the packet buffering controller that specifies a number of different data packets need to be retrieved from the packet buffering system. The packet buffering controller then analyzes the indirect packet request and bundles together the multiple requested data packets into a response. The packet buffering controller then streams the bundled data packets in a single response to the network processor.

The use of such indirect reads can greatly increase the utilization of the bus between the network processor and the packet buffering controller since the packet buffering controller is able to determine how it can most efficiently bundle together multiple packets in its response. This mode of operation is called "indirect reads", because a single "write" operation (the request from the network processor specifying the needed packets) is later followed by a burst of data corresponding to the packets to be read. Note that the single request from the network processor replaces multiple packet reads such that the bus utilization is greatly increased.

Elimination of Polling

When the network processor performs an indirect read of packets as described in the previous section, the network processor does not need to poll the packet buffering system to determine when the requested packet data for the indirect read is ready. Specifically, the network processor may simply start reading the packets from the packet buffering system after a fixed pipeline latency since the packet buffering controller guarantees that every packet is always available in the high-speed memory when it is requested. The exact parameters of this guaranteed delivery is defined by the physical characteristics of the bus between the network processor and the buffering controller. This elimination of polling further increases the utilization of the bus between the buffer chip and the network processor.

Just-In-Time Scheduler and Retrieval of Packets

Very large data packets may cause difficulties in the queue caching system of the packet buffering controller. For example, when a network processor requests a very large data packet from a particular FIFO queue and the data packet is larger than the size of the cache area allocated for that FIFO queue, then the packet buffering system may have difficulty responding to the data packet request. Specifically, if data packet is larger than the available low-latency memory for packet caching, then only part of the packet can reside in low-latency memory and the remaining part of the packet resides in the high-latency memory (such as DRAM).

In such a case, the buffering controller retrieves the initial part of the packet from the low-latency memory and returns that initial part of the requested data packet to the network processor. However, the packet buffering controller simultaneously retrieves the remaining part of the packet from the high-latency memory (such as DRAM). The buffering controller performs this retrieval from the high-latency memory with the highest priority such that this request for the packet remainder supersedes any other read or write operations that are pending on the bus between the packet buffering controller and the external high-latency DRAM. The packet buffering controller manages and ensures that the remaining part of the packet is sent to the network processor exactly in time so that the network processor does not experience any loss of bandwidth or delay on the bus between the network processor and the packet buffering controller. This high-priority packet request is performed by a just-in-time scheduler in the packet buffering system, so as to retrieve and return packets to the network processor at the correct time.

Independent Addressing via Thread and Context Support

Network Processors (NPs) sometimes employ multiple different processing threads or contexts to the network processor perform tasks. Each of the multiple threads or contexts in a network processor may process data packets independently of the other concurrent processing threads or contexts. Such multi-threaded or multiple process network processors should be supported by the packet buffering controller.

To accommodate multiple different processing threads or contexts, a packet buffering controller may maintain a separate register set for each of the separate processing threads or contexts on the network processor. By providing a separate register set for each processing thread or contexts, the packet buffering controller allows each processing thread or context on the network processor to address the packet buffering controller in a completely independent manner. Each of the different processing threads or contexts receives a complete and uniform view of the packet buffering system and can read packets from or write packets to all of the FIFO queues.

Note that this independent addressing and context support should be made to support all of the various features in a packet buffering controller. For example, the queue registers in the "memory mapped register set", as described in an earlier section of this document, should be much larger and rolled out to accommodate a memory mapped register set for each of the different processing threads or contexts.

High Speed Point to Point Interface

In certain embodiments, the packet buffering controller may include a point-to-point interface to the network processor in addition to having a standard memory interface to interface with the network processor. The point-to-point interface to the network processor may comprise the hypertransport serial interface or any other standard or proprietary high-speed point-to-point interface.

The high-speed point-to-point interface may be used by the network processor to send and retrieve packets from the packet buffering system. Point-to-point interfaces provide a number of advantages that may be desirable over standard memory interfaces. Advantages that a point to point interfaces offer include:

(a) The clock on a point-to-point interface can be made to run significantly faster than many standard memory interfaces, (b) The number of data pins required on a network processor can be significantly reduced because the data pins on the point-to-point interface carry data faster, (c) The number of address pins on a network processor can also be significantly reduced. In certain embodiments, the need for any address pins on the network processor's interface may be completely eliminated if the address for the packet is embedded in the data stream carried by the a point-to-point communication link.

Note that various embodiments of the packet buffering system can be constructed with high-speed point-to-point interface. For example, some embodiments may not have any conventional memory interface but instead rely completely on the high-speed point-to-point external interface. A packet buffering controller die may be designed to include both a conventional memory interface and a high-speed point-to-point interface. Such dual interface embodiments may provide both interfaces externally. Alternatively, different integrated circuit packaging embodiments may to created provide external access only for the conventional memory interface or only for the high-speed point-to-point interface.

Multiple Packet Buffering Devices

In many network devices a single packet buffering system may suffice. However, it may be necessary to scale the memory subsystem in order to support more FIFO queues, provide greater memory bandwidth, etc. To scale up the memory system for a network device, multiple packet buffering systems can be used. This section describes different ways in which multiple packet buffering systems may connect and interact to scale the performance of a memory subsystem. In the following section, assume that each packet buffering system supports Q queues and supports a memory bandwidth of R such that it can read and write packets at a rate R.

Connection in Hierarchy: Scaling the Number of Queues

Figure 10:
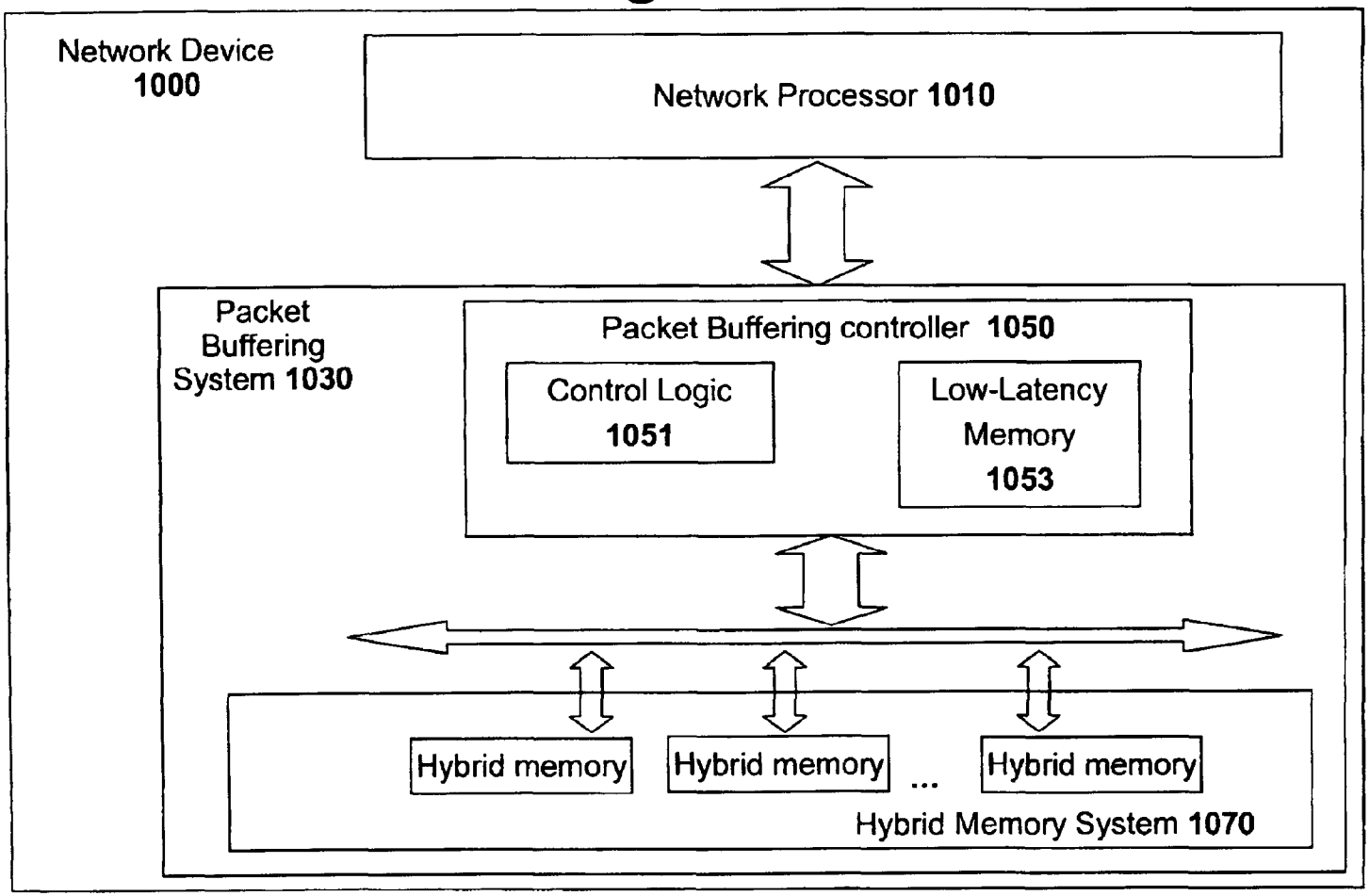
FIG. 10 illustrates a block diagram of a packet buffering system that uses a hybrid memory system instead of a normal high-latency memory system (such as DRAM).

The buffering system as described in this document may in fact use the hybrid memory described in the previous section, instead of standard high-latency memory device such as DRAM. Specifically, FIG. 10 illustrates a block diagram of a packet buffering system 1030 that uses a hybrid memory system 1070 instead of a normal high-latency memory system (such as DRAM). This leads to a design where both the main packet buffering system and the lower level external hybrid memory are intelligent and aware of the common memory access patterns for performing packet buffering. Thus, in such a system, there are two levels of intelligent memory.

In a packet buffering system with two levels of intelligent memory, the system can leverage the capabilities of the external hybrid memory to provide significant improvements in the capabilities of the packet buffering system. For example, the packet buffering system can support a larger number of queues for a fixed size of high-speed memory or decrease the amount of high-speed memory required for a fixed number of queues when the packet buffering system has a slow-speed hybrid memory available. Furthermore, the packet buffering system can also benefit from the better bus utilization and lower latency on the interface to the external intelligent hybrid memory, to provide further enhancements to the network processor.

Connection in Parallel: Scaling the Memory Bandwidth

Figure 11:
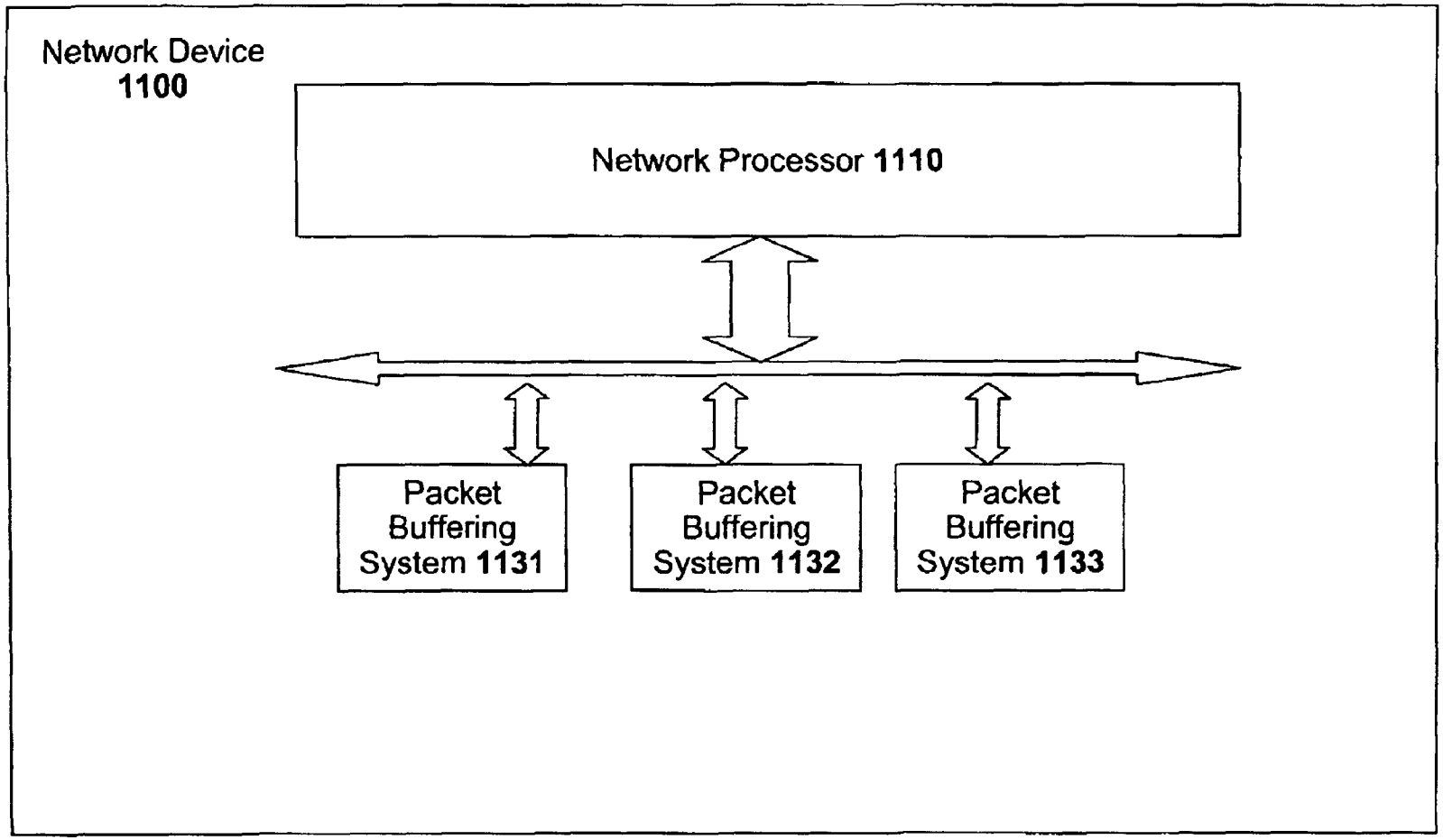
FIG. 11 illustrates a block diagram of network device that contains three packet buffering systems configured in a parallel arrangement for supporting a large number of individual packet buffering FIFO queues.

Suppose that a network processor needs a packet buffering system with Q queues, and a total bandwidth of 2R (i.e. it needs to write packets at a rate R and read packets at a rate R for a total rate of 2R). In such a case, two (or more) packet buffering systems may be connected in parallel to the network processor. FIG. 11 illustrates a block diagram of a network device 1100 that uses three packet buffering systems 1131, 1132, and 1133 in a parallel configuration.

In such a parallel packet buffering system implementation, the network processor spread the data among the different parallel packet buffering systems. For example, in a system with two packet buffering systems in a parallel configuration, the network processor can choose to write one half of the data from each packet or cell to each of the two packet buffering devices. Similarly when the network processor reads data, half of it is derived from each of the buffering devices. In this mode the address bus on both the packet buffering devices are tied together and driven by the network processor, while the data busses on the buffering devices connect to separate pins on the network processor. Note that this technique may be used in systems with more than two packet buffering devices may be connected in parallel such as the system illustrated in FIG. 11.

Connection in Series: Scaling the Size of the External Memory

Suppose that a network processor needs a packet buffering system with Q queues, and a total bandwidth of R (i.e. it needs to write packets and read packets at a rate R) but needs to double the amount of external memory allocated for buffering. In such a case two or more packet buffering systems can be connected in series to provide a large amount of memory dedicated to packet buffering.

Figure 12:
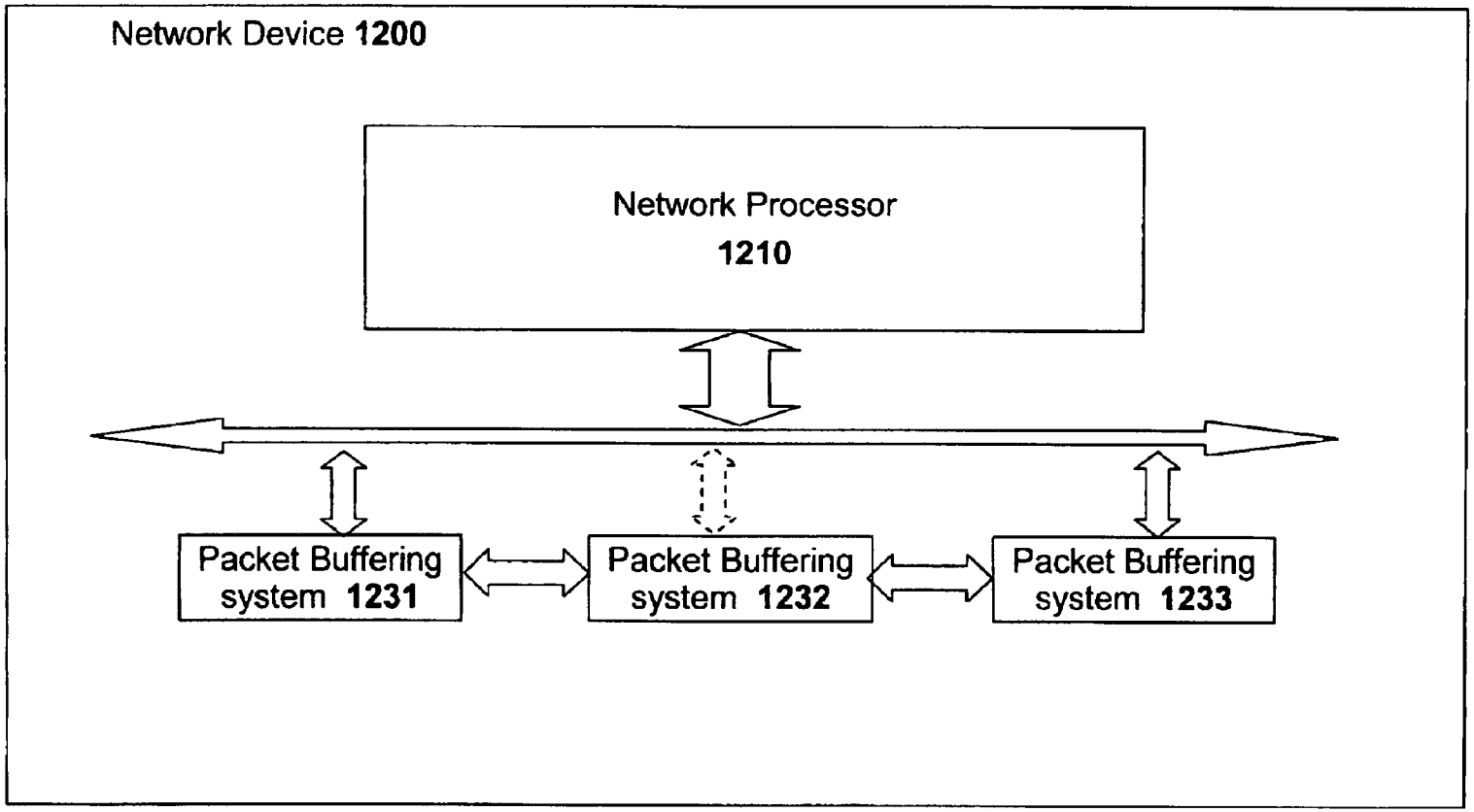
FIG. 12 illustrates a block diagram of network device that contains three packet buffering systems configured in a series arrangement to support very large packet buffering FIFO queues.

FIG. 12 illustrates an example of three packet buffering systems 1231, 1232, and 1233 coupled together in a series configuration. The network processor would write packets to packet buffering system 1231 and read packets from packet buffering system 1233. During normal operation, the network processor 1210 would not need to directly communicate with packet buffering system 1232 for packet buffering services since packet buffering system 1232 would receive packets from packet buffering system 1231 and transmit packets to packet buffering system 1233. However, the network processor 1210 may communicate with packet buffering system 1232 for configuration and status reasons.

To describe how packet buffering systems may operate in series, an example is hereby provided with two the packet buffering systems that are denoted as chip-1 and chip-2. In such a series configured packet buffering system, the packet flow is as follows:

1. Packets are always written by the network processor to chip-1. Packets are always read by the network processor from chip-2.
2. Chip-1 always transfers an arriving packet for a queue immediately to chip-2, if there is space for that specific queue on chip-2. Chip-1 directly connects to chip-2 such that packets can be directly transferred from chip-1 to chip-2.
3. Chip-2 behaves like any standard packet buffering system. Chip-2 is unaware of the presence of chip-1. Specifically, Chip-2 maintains the head and tails of its queues in high speed memory and stores the body of its queue in external high-latency memory.
4. When the external memory for a queue in chip-2 becomes full and the head and tail for that queue are also fully occupied then chip-2 sends a "flow-control" signal to chip-1. This flow-control signal informs chip-1 not to send any more packets to the filled queue in chip-2.
5. For all queues in chip-1, for which it has received a "flow-control" signal from chip-2, chip-1 stores on these packets. Just like any buffering system, chip-1 creates the heads, tails and body for the queues for which it has received a "flow-control" signal.
6. Examples:
   a. For example, suppose that there is space available in queue number 10 in chip-2. Suppose that there are 1000 packets for queue number 10. Then, for example, it is possible that packets 1-10 are in the high-speed memory (SRAM) head of chip-2, packets 11-990 are in the slow-speed memory of chip-2, and packets 991-1000 are in the high-speed memory (SRAM) tail of chip-2. There are no packets for queue-10 in chip-1.
   b. Now suppose that there is no space available for queue number-5 in chip-2. That means that chip-2 has sent a "flow-control" signal informing chip-1 not to send any more packets for queue-5 to it. Suppose there are 1500 packets for queue-5. Then it is possible that packets 1-10 are in the high-speed memory (SRAM) head of chip-2, packets 11-990 are in the external high-latency memory of chip-2, packets 991-1000 are in the high-speed memory (SRAM) tail of chip-2, packets 1001-1010 are in the high-speed memory (SRAM) head of chip-1, packets 1011-1490 are in the external high-latency memory of chip-1, and packets 1491-1500 are in the high-speed memory (SRAM) tail of chip-1.
7. When a queue becomes less filled, Chip-2 may retract the "flow-control" signal from chip-1 for the formerly filled queue provided that there is free memory space in chip-2 for that queue.

The packet buffering systems must be augmented to be able to support a series configuration. Specifically, at least three features are required to support the series configuration.

1. Each buffering system should have the capability to be the master on the bus that is used to write data from one buffering system to another. This enables a packet buffering system to drive the bus and write packets to the next packet buffering system in the series.
2. Each of the buffering systems should have an interface that allows the buffering system to transmit and receive the flow control signals.
3. Each of the buffering systems should have the ability to be programmed to inform the buffering system where it appears in the daisy-chained serial connection. Specifically, each of the packet buffering systems must be informed if it is it the first device, the last device, or one of the devices in the middle of the series chain.

It is easy to see that in such a system more than two buffering systems can be connected in series. When there are N buffering systems connected in series, the network processor always writes to the first buffering system and reads from the last buffering system.

More complex arrangements of the buffering system are possible. For example. a system may be created wherein multiple packet buffering systems are connected together both in series and parallel. Furthermore, such a system may use external hybrid memory (instead of the standard high-latency memory). Various other permutations are possible.

The foregoing has described a high-speed memory control system and Input/Output (I/O) processor. It is contemplated that changes and modifications may be made by one of ordinary skill in the art, to the materials and arrangements of elements of the present invention without departing from the scope of the invention.

We claim:

1. A method of improving performance for a computer processor, said method comprising:

[receiving in an input/output processor data and a memory access instruction from said computer processor, said memory access instruction identifying a type of memory storage task from a group of more than one different memory storage task;

analyzing said memory access instruction in said input/output processor to identify said type of memory storage task;

if said type of memory storage task comprises a counter adjustment then updating a value containing recent adjustments to said counter in a higher-speed memory, and updating a full version of said counter in a slower-speed memory if an overflow of said value containing recent adjustments to said counter occurs; and if said type of memory storage task comprises a write to a FIFO queue then storing said data in a queue tail of said FIFO queue in said higher-speed memory, and moving data from said queue tail to a queue body of said FIFO queue in said slower-speed memory if said queue tail is filled]

*receiving in an input/output processor, data and multiple memory access instructions from said computer processor;*

*said received multiple memory access instructions indicating memory access type pattern from a group of more than one different memory access type patterns that includes a first memory access type pattern and a second memory access type pattern;*

*analyzing said received multiple memory access instructions in said input/output processor to identify said memory access type pattern;*

*using the input/output processor to perform a first high frequency memory write task and a first low frequency memory write task in response to identification of the first memory access type pattern, wherein data written using the first low frequency memory write task is accessed less frequently than data written using the first high frequency memory write task;*

*using the input/output processor to perform a second high frequency memory write task and a second low frequency memory write task in response to identification of the second memory access type pattern, wherein data written using the second low frequency memory write task is accessed less frequently than the second high frequency memory write task;*

*if the memory access type pattern is the first memory access type pattern,*

*performing the first high frequency memory write task in a higher-speed memory; and*

*performing the first low frequency memory write task in a slower-speed memory; and*

*if the memory access type pattern is the second memory access type pattern,*

*performing the second high frequency memory write task in the higher-speed memory; and*

*performing the second low frequency memory write task in the slower-speed memory.*

2. The method as claimed in claim 1 wherein said higher-speed memory comprises static random access memory (SRAM).

3. The method as claimed in claim 1 wherein said slower-speed memory comprises dynamic random access memory (DRAM).

[4. The method as claimed in claim 1 wherein said a FIFO queue further comprises a tail of said FIFO queue in said higher-speed memory.]

[5. The method as claimed in claim 1, said method further comprising:

if said type of memory storage task comprises a counter read then generating a sum by adding said value containing recent adjustments to said counter to said full version of said counter in said slower speed memory, and returning said sum.]

[6. The method as claimed in claim 1, said method further comprising:

if said type of memory storage task comprises a read from said FIFO queue then responding with data from in a queue head of said FIFO queue in said higher-speed memory, and moving data from said queue body of said FIFO queue in said slower-speed memory to said queue head in said higher-speed memory.]

*7. The method of claim 1 including not performing the first low frequency memory write task unless required to keep the first higher-speed memory available during the memory task.*

*8. The method of claim 1 wherein the second memory write task is an adjustment to a counter,*

*wherein performing the second high frequency memory write task is storing an adjustment value in the higher-speed memory, and*

*wherein performing the second low frequency memory write task is storing a counter value in the slower-speed memory.*

*9. The method of claim 8, wherein the counter is updated to the slower-speed memory when there is an overflow of the adjustment value.*

*10. The method of claim 8, wherein the counter is updated to the slower-speed memory when there is an overflow of the adjustment value during the memory task.*

*11. The method of claim 1, wherein the first memory write task is to write to a First In First Out (FIFO) queue,*

*wherein performing the first high frequency memory write task is storing data in a queue tail of the FIFO queue in the higher-speed memory, and*

*wherein performing the first low frequency write memory task is storing data in a queue body of the FIFO queue in the slower-speed memory.*

*12. The method of claim 11, performing the first low frequency memory write task when required to keep the memory allocated for the FIFO queue in the higher-speed memory available.*

*13. The method of claim 11, including performing the first low frequency memory task when required to keep the memory allocated for the FIFO queue in the higher-speed memory available.*

*14. The method of claim 1, wherein the second memory write task is to read a counter,*

*wherein performing the second high frequency memory write task is updating an adjustment value in the higher-speed memory, and*

*wherein performing the second low frequency memory write task is storing the counter value in the slower-speed memory.*

*15. The method of claim 14 including performing the second low frequency memory write task of storing the counter value in the slower-speed memory when an overflow of adjustment values occurs.*

*16. The method of claim 1, wherein the first memory task is to read a First In First Out (FIFO) queue,*

*wherein performing the first high frequency memory write task is reading a queue head, and*

*wherein performing the first low frequency memory write task is reading the queue body of the FIFO queue.*

*17. The method of claim 1, wherein the first memory write task is read-modify-write of a state data,*

*wherein performing the first low frequency memory write task is storing the state data in a different location for a consecutive update, and*

*wherein the consecutive updates are in different memory banks in the slower-speed memory.*

*18. The method of claim 1, wherein the second memory write task is an adjustment to a value,*

*wherein performing the second high frequency memory write task is updating the adjustment of the value in the higher-speed memory.*

*19. The method of claim 18, wherein performing the second low frequency memory write task is updating to slower-speed memory the value when there is an overflow of the adjustment value in the higher-speed memory.*

*20. The method of claim 1,*

*wherein at least one memory write task includes multiple memory accesses in response to a single memory access instruction.*

*21. A method of improving performance for a computer processor, said method comprising:*

*receiving in an input/output processor data and a memory access instruction from said computer processor;*

*said memory access instruction identifying a type of memory task from a group of more than one different memory task;*

*analyzing said memory access instruction in said input/output processor to identify said type of memory task;*

*dividing the memory task into a first memory task and a second memory task;*

*performing the first memory task in a higher-speed memory to provide access to low latency data;*

*performing the second memory task in a slower-speed memory to provide access to high latency data;*

*if said type of memory storage task comprises a counter adjustment then updating a value containing recent adjustments to said counter in a higher-speed memory, and updating a full version of said counter in a slower-speed memory if an overflow of said value containing recent adjustments to said counter occurs; and*

*if said type of memory storage task comprises a write to a FIFO queue then storing said data in a queue tail of said FIFO queue in said higher-speed memory, and moving data from said queue tail to a queue body of said FIFO queue in said slower-speed memory if said queue tail is filled.*

* * * * *